United States Patent
Hasegawa et al.

(10) Patent No.: US 8,204,625 B2
(45) Date of Patent: *Jun. 19, 2012

(54) GAIT CREATION DEVICE OF LEG-TYPE MOBILE ROBOT

(75) Inventors: Tadaaki Hasegawa, Wako (JP); Nobuyuki Ohno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1043 days.

This patent is subject to a terminal disclaimer.

(21) Appl. No.: 12/096,987

(22) PCT Filed: Oct. 31, 2006

(86) PCT No.: PCT/JP2006/321693
§ 371 (c)(1),
(2), (4) Date: Jun. 11, 2008

(87) PCT Pub. No.: WO2007/069401
PCT Pub. Date: Jun. 21, 2007

(65) Prior Publication Data
US 2009/0312867 A1    Dec. 17, 2009

(30) Foreign Application Priority Data
Dec. 12, 2005 (JP) .................. 2005-357490

(51) Int. Cl.
*G05B 19/04* (2006.01)

(52) U.S. Cl. ......... 700/253; 700/245; 700/254; 700/260

(58) Field of Classification Search .......... 180/8.1, 180/8.6; 318/568.12; 700/245, 253, 254, 700/258, 260; 701/23
See application file for complete search history.

(56) References Cited

U.S. PATENT DOCUMENTS

| | | | | |
|---|---|---|---|---|
| 7,734,377 B2 * | 6/2010 | Hasegawa | | 700/252 |
| 7,840,309 B2 * | 11/2010 | Hasegawa | | 700/258 |
| 2002/0022907 A1 * | 2/2002 | Takenaka et al. | | 700/245 |
| 2005/0104548 A1 * | 5/2005 | Takenaka et al. | | 318/568.12 |
| 2005/0228539 A1 * | 10/2005 | Takenaka et al. | | 700/245 |

FOREIGN PATENT DOCUMENTS
JP    10-217161    8/1998
(Continued)

OTHER PUBLICATIONS
Harada et al., "Real-Time Planning of Humanoid Robot's Gait for Force Controlled Manipulation", Proc. of 2004 IEEE Int. Conf. on Robotics and Automation, pp. 616-622, 2004.*

(Continued)

*Primary Examiner* — Khoi Tran
*Assistant Examiner* — Stephen Holwerda
(74) *Attorney, Agent, or Firm* — Rankin, Hill & Clark LLP

(57) ABSTRACT

A provisional desired motion trajectory of an object is determined based on a moving plan of the object. Then, it is determined whether a robot leg motion can satisfy a necessary requirement. The requirement is related to a position/posture relationship between the object and the robot, and a determination of whether the requirement can be satisfied is made at a future, predetermined step. A restrictive condition related to robot leg motion is satisfied at each step up to the predetermined number of steps. If the requirement is satisfied, then a desired gait is generated on the basis of the provisional desired motion trajectory. Otherwise, a desired gait is generated on the basis of a desired motion trajectory of the object according to a corrected moving plan.

11 Claims, 22 Drawing Sheets

FOREIGN PATENT DOCUMENTS

| | | |
|---|---|---|
| JP | 10-230485 | 9/1998 |
| JP | 2004-209614 | 7/2004 |
| JP | 2006-175567 | 7/2006 |

OTHER PUBLICATIONS

Harada et al., "A Humanoid Robot Carrying a Heavy Object," in Proc. of 2005 IEEE Int. Conf. Robotics and Automation, pp. 1712-1717, 2005.*

Yoshida et al., "Pivoting Manipulation of a Large Object: A Study of Application Using Humanoid Platform," in Proc. of 2005 Int. Conf. on Robotics and Automation, pp. 1040-1045, 2005.*

XP-002996820, Motion Generation of Humanoids based on Object Trajectory Description, Kei Okada et al., (English abstract).

XP-002996819, Pushing Manipulation by a Humanoid Robot, K. Harada et al., (English abstract).q.

* cited by examiner

OBJECT REACTION FORCE MOMENT

TRAJECTORY OF OBJECT REACTION FORCE MOMENT ABOUT DESIRED ZMP OF CURRENT TIME GAIT, NEXT TIME GAIT, AND NEXT BUT ONE TIME GAIT

CURRENT TIME GAIT | NEXT TIME GAIT | NEXT BUT ONE TIME GAIT

TIME

OBJECT REACTION FORCE MOMENT

TRAJECTORY OF OBJECT REACTION FORCE MOMENT ABOUT DESIRED ZMP OF NORMAL GAIT

1ST TURNING GAIT | 2ND TURNING GAIT tx

TIME

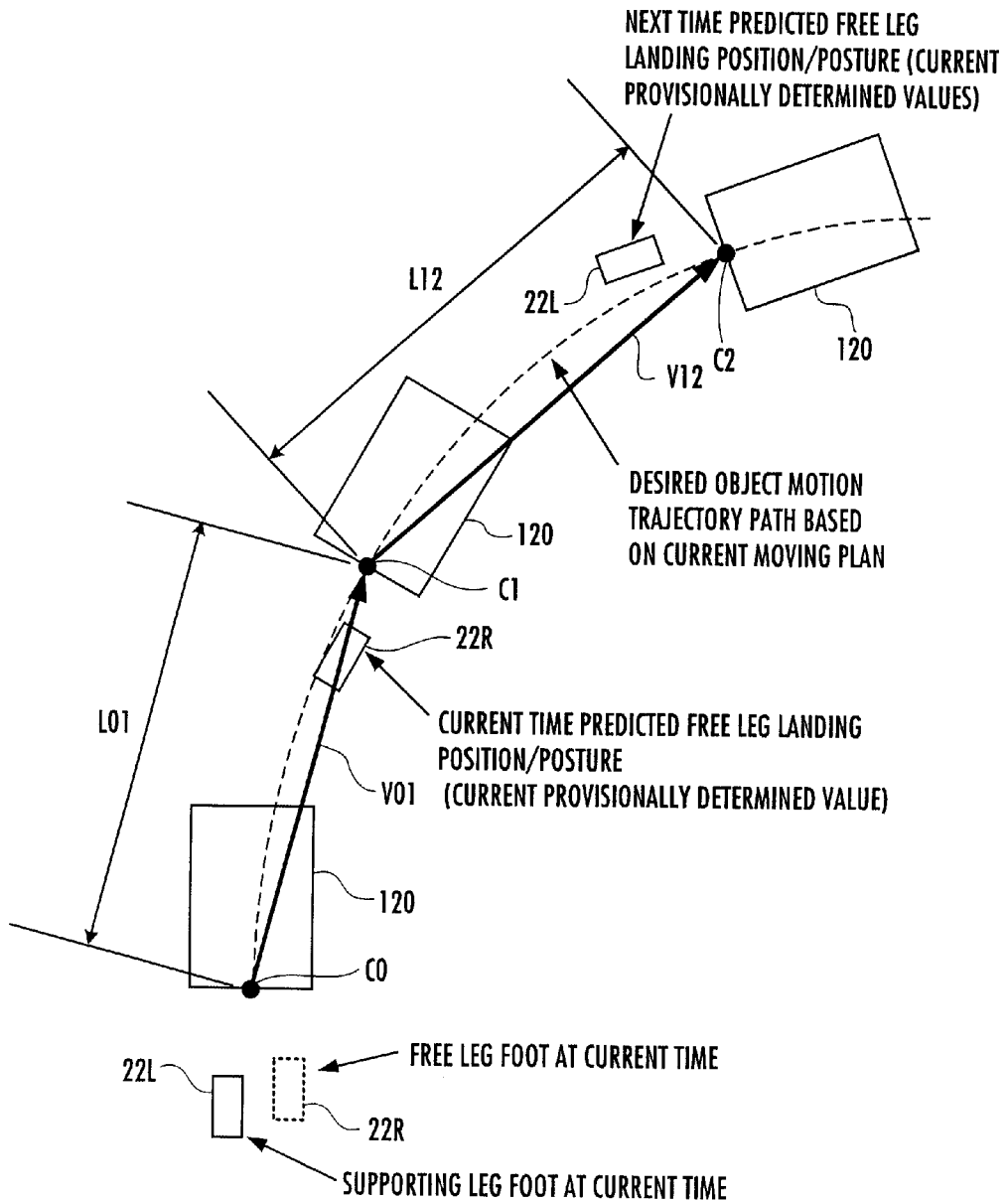

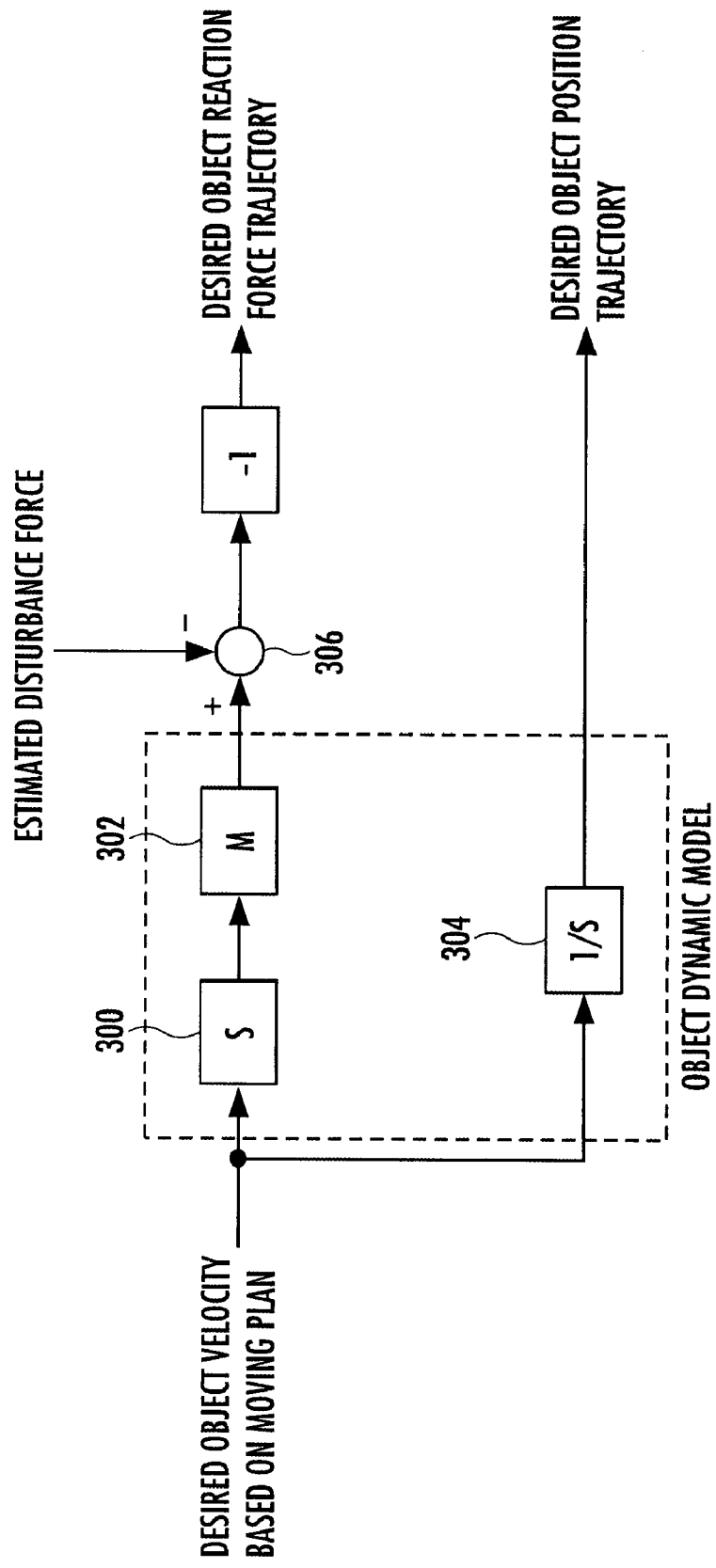

GAIT CREATION DEVICE OF LEG-TYPE MOBILE ROBOT

TECHNICAL FIELD

The present invention relates to a device for generating a desired gait for making a leg-type mobile robot perform an operation of moving an object.

BACKGROUND ART

To make a leg-type mobile robot, such as a bipedal mobile robot, perform an operation of, for example, moving a certain object by pushing, a desired gait for the robot is usually generated on the basis of a desired motion of the object according to a plan for moving the object (such as a plan that specifies the timing and the method for moving the object). Then, the motion of the robot is controlled such that the motion of the robot follows the generated desired gait (refer to, for example, Japanese Laid-Open Patent Application Publication No. H10-230485). When making the robot perform an operation of moving the object, the robot is subjected not only to a reaction force (external force) from a floor in the moving environment but also to a reaction force (external force) from the object, which is different from a case where the robot moves alone. For this reason, in order to secure stability of a posture of the robot, the desired gait is generated such that the so-called ZMP (Zero Moment Point) lies within a ground contact plane (within, more generally, the so-called supporting polygon) of the robot, taking also an influence attributable to the reaction force from the object into account.

Meanwhile, when linearly moving the object forward from the front of, for example, a bipedal mobile robot, a desired gait of the robot is usually generated such that the position-posture relationship between the robot and the object will be an appropriate position-posture relationship during the period of each step of the robot. In other words, the desired landing position/posture of the leg on a free leg side of the robot are determined such that a mean moving velocity of the object by the robot in the period of each step of the robot is equal to a mean moving velocity of the object in the period based on the plan for moving the object. In this case, the desired landing position/posture of the leg on the free leg side of the robot must be set within a range that satisfies a restrictive condition, such as a range within which the leg of the free leg side can be mechanically moved with respect to the leg of a supporting leg side. However, as long as the velocity command value of the object in the moving plan is set to be smaller than a feasible maximum moving velocity of the robot, restrictions by the restrictive condition hardly apply, as a matter of practice.

On the other hand, when moving the object at an angle with respect to the longitudinal direction of the robot or rotationally moving the object or moving the object sideways with respect to the robot, the following inconveniences are encountered if desired gaits are generated for the robot as described above.

For example, when the bipedal mobile robot is to move the object to the right of the robot by pushing the object, the right leg of the legs of the robot can usually make a relatively large step out in a direction in which the object is to be moved, whereas the left leg cannot actually make a large step out in the direction in which the object is to be moved because an influence of a restrictive condition for preventing interference or the like with the right leg. Hence, even if a desired gait for the robot is generated such that the position/posture of the robot will have an appropriate position-posture relationship with respect to desired position/posture of the object in the period of one step during which the right leg becomes a free leg, there are many cases where it is impossible to generate desired gaits for the robot such that the position/posture of the robot will establish an appropriate position/posture relationship with respect to desired position/posture of the object in the period of the next one step. As a result, it becomes difficult to move the object in exact accordance with a moving plan. This inconvenience applies also when rotationally moving the object or moving the object at an angle relative to the longitudinal direction of the robot.

Thus, according to the method for generating desired gaits such that the position/posture relationship between the robot and the object in the period of one step for each step of the robot, the leg on a free leg side is susceptible to a restrictive condition for preventing interference or the like of the leg on the free leg side with the leg on the supporting leg side, depending on a moving direction of the object relative to the robot. This inconveniently leads to, for example, frequent occurrence of a situation requiring a correction of a moving plan or the need for setting moving plans for each moving direction relative to the robot so as to adapt the moving plans to feasible motion modes of the legs of the robot.

The present invention has been made with a view of the above background and it is an object thereof to provide a gait creation device of a leg-type mobile robot which is capable of generating desired gaits of a robot that minimize situations in which a moving plan is required to be corrected and allow an object to be moved according to a moving plan as much as possible, regardless of the moving direction of the object relative to the robot.

DISCLOSURE OF INVENTION

In general, when moving an object by a leg-type mobile robot, frequently, it is not required to make a moving velocity or a moving position at each instant of the object follow an instantaneous desired value based on a moving plan, and it is adequate as long as the moving velocity or the moving position follows a desired value based on the moving plan for each period of a plurality of steps of the robot. There are also many cases where even if it is difficult to generate a desired gait such that the robot adapts itself to a desired motion of the object based on a moving plan while satisfying a restrictive condition for preventing interference or the like between legs, for each step of the robot, it is possible to generate a desired gait such that the robot adapts itself to a motion of the object based on the moving plan by the ending time of the period. For example, when moving the object in a certain moving direction, if the leg on the free leg side for a first step is immune to the influence of a restrictive condition and it is possible for the leg on the free leg side to step out relatively farther in the moving direction, then it is frequently possible to move the object to a desired position based on the moving plan at expected landing time of the leg on the free leg side of at least a second step by increasing the step-out amount of the leg on the free leg side of the first step within the range of the restrictive condition even when the leg on the free leg side of the second step is susceptible to the influence of the restrictive condition and the step-out amount is limited to a narrow range.

The gait creation device of a leg-type mobile robot in accordance with the present invention explained below is constructed on the basis of the finding described above.

To fulfill the aforesaid object, according to the present invention, there is provided a gait creation device of a leg-type mobile robot for generating a desired gait to make a leg-type mobile robot, which is equipped with a plurality of legs extended from a body thereof, perform an operation of moving an object, comprising:

a future object motion provisionally determining means which determines a first provisional desired motion trajectory of the object in a predetermined period in the future which includes a period of a plurality of steps of the robot on the basis of at least a moving plan for the object when generating a desired gait anew for the robot to follow; and a determining means which determines whether a motion of a leg of the robot that satisfies a necessary requirement is possible for the object, which moves according to the determined first provisional desired motion trajectory, on the basis of at least the first provisional desired motion trajectory and the necessary requirement, the necessary requirement being such that a predetermined requirement related to a position/posture relationship between the object and the robot when the object is moved is satisfied at least at the step of a predetermined number of steps of two or more of the robot in the future and a predetermined restrictive condition related to the motion of the leg of the robot is satisfied at each step up to the step of the predetermined number of steps, wherein, when a determination result of the determining means is affirmative, the desired gait of the robot is generated such that the necessary requirement is satisfied with respect to the object, which moves according to the first provisional desired motion trajectory, or when the determination result of the determining means is negative, the moving plan is corrected, a second provisional desired motion trajectory of the object in the predetermined period is determined anew on the basis of at least the corrected moving plan, and the desired gait of the robot is generated such that the necessary requirement is satisfied with respect to the object, which moves according to the second provisional desired motion trajectory.

According to the present invention, if the determination result of the determining means is affirmative, then it means that, when the object moves according to the determined first provisional desired motion trajectory, it is possible to accomplish a motion of a leg of the robot that satisfies the necessary requirement in that the predetermined requirement related to the position/posture relationship between the object and the robot is satisfied at least at the predetermined number of steps of two or more of the robot in the future and the predetermined restrictive condition related to a motion of a leg of the robot is satisfied for each step up to the predetermined number of steps. In this case, therefore, a desired gait of the robot is generated such that the necessary requirement is satisfied for the object, which moves according to the first provisional desired motion trajectory (more precisely, such that the necessary requirement is satisfied for the object when it is assumed that the object will move according to the first provisional desired motion trajectory). This makes it possible to generate a desired gait of the robot that causes the position/posture of the robot in the future at least at the step of the predetermined number of steps will be the position/posture that match the position/posture of the object, which moves according to the first provisional desired motion trajectory based on the moving plan (the position/posture that satisfy the predetermined requirement). In this case, the motion trajectory of the object defined by the desired gait (the motion trajectory of the object when the robot is operated in exact accordance with the desired gait) does not necessarily agree with the first provisional desired motion trajectory at intermediate instant time up to the step of the predetermined number of steps.

If the determination result of the determining means is negative, then it means that it is impossible to implement a motion of a leg of the robot that satisfies the necessary requirement that the predetermined requirement related to the position/posture relationship between the object and the robot is satisfied at least at the step of the predetermined number of steps of the robot in the future and the predetermined restrictive condition related to a motion of the leg of the robot is satisfied for each step up to the step of the predetermined number of steps when it is assumed that the object will move according to the determined first provisional desired motion trajectory. In other words, in such a case, it is impossible to generate a desired gait of the robot which allows the object to move according to the moving plan by the step of the predetermined number of steps. In this case, therefore, the moving plan is corrected, a second provisional desired motion trajectory of the object in the predetermined period is determined anew on the basis of at least the corrected moving plan, and a desired gait of the robot is generated such that the necessary requirement is satisfied for the object, which will move according to the newly determined second provisional desired motion trajectory. This makes it possible to generate a desired gait of the robot that causes the position/posture of the robot in the future at least at the step of the predetermined number of steps to be the position/posture that match the position/posture of the object, which will move according to the second provisional desired motion trajectory based on the corrected moving plan (the position/posture that satisfy the predetermined requirement). In the desired gait generated in this case also, the motion trajectory of the object defined by the desired gait does not necessarily has to agree with the second provisional desired motion trajectory at intermediate instant time before reaching the step of the predetermined number of steps.

In the present invention, a necessary requirement is established as described above, and the moving plan for an object is corrected only if the determination result is negative. This arrangement makes it possible to generate a desired gait of a robot that minimizes situations requiring a correction of a moving plan and allows the object to move according to a moving plan as much as possible, regardless of the direction in which the object moves relative to the robot.

The predetermined requirement includes, for example, a requirement that defines a position/posture relationship between the body of a robot and an object or a requirement that defines a position/posture relationship between the predicted landing position/posture of the leg on a free leg side and an object. The predetermined restrictive condition includes, for example, the condition on a range within which the leg on the free leg side of the robot can move with respect to the leg on the supporting leg side, a condition on a range of an operating velocity of a joint of the leg on the free leg side, and a condition on an area in which a ZMP exists.

When correcting a moving plan, a provisional desired motion trajectory of an object may be determined according to a corrected moving plan each time such a correction is made, and the determining means may determine on the basis of the provisional desired motion trajectory and the necessary requirement. In this case, the moving plan may be corrected until a determination result given by the determining means turns affirmative, and a provisional desired motion trajectory of an object determined on the basis of the final corrected moving plan may be used as the second provisional desired motion trajectory.

According to the present invention, if the predetermined requirement includes the requirement that defines the relationship between the predicted landing position/posture of the leg on the free leg side of the robot and the position/posture of the object and the predetermined restrictive condition includes a restrictive condition that defines a relative landing position/posture of the leg on the free leg side of the robot with respect to the leg on the supporting leg side, then the determining means preferably determines whether a motion of a leg of the robot that satisfies the aforesaid necessary requirement can be implemented or not as described, for example, below.

The determining means comprises: a means which determines first provisional predicted landing position/posture of the leg on the free leg side of the robot up to a step of a predetermined number of steps on the basis of the determined first provisional desired motion trajectory of the object and the predetermined requirement such that the requirement is satisfied at each step up to the step of the predetermined number of steps; a means which determines second provisional predicted landing position/posture obtained by restricting the first provisional predicted landing position/posture at each step up to the step of the predetermined number of steps by the predetermined restrictive condition; and a means which determines whether the first provisional predicted landing position/posture and the second provisional predicted landing position/posture at the step of the predetermined number of steps agree or substantially agree with each other and if they do not agree, then this means correcting the second provisional predicted landing position/posture at least at one step before the step of the predetermined number of steps on the basis of a difference between the first provisional predicted landing position/posture and the second provisional predicted landing position/posture at the step of the predetermined number of steps within a range in which the predetermined restrictive condition is satisfied, and the gait creation device determines whether the motion of the leg of the robot that satisfies the necessary requirement can be implemented by determining whether the second provisional predicted landing position/posture at the step of the predetermined number of steps can be corrected to the position/posture that agree or substantially agree with the first provisional predicted landing position/posture at the step of the predetermined number of steps within the range, in which the predetermined restrictive condition is satisfied, by the correction at least at the one step.

This arrangement makes it possible to easily determine whether a motion of a leg of the robot that satisfies the necessary requirement can be implemented. When determining the second provisional predicted landing position/posture obtained by restricting each of the first provisional predicted landing position/posture (the first provisional predicted landing position/posture at each number of step up to the predetermined number of steps) by the predetermined restrictive condition, if the first provisional predicted landing position/posture satisfy the predetermined restrictive condition, then the first provisional predicted landing position/posture may be determined as the second provisional predicted landing position/posture. If the first provisional predicted landing position/posture do not satisfy the predetermined restrictive condition, then the second provisional predicted landing position/posture may be determined such that the second provisional predicted landing position/posture for each number of steps agrees with or becomes closest to the first provisional predicted landing position/posture within the range, in which the predetermined restrictive condition is satisfied, for each number of steps up to the step of the predetermined number of steps.

In a case where the determining means is constructed as described above, preferably, a means is provided which determines anew the predicted landing position/posture of the leg on a free leg side at the step of each number of steps up to the step of the predetermined number of steps such that the landing position/posture of the leg on the free leg side at least one step before the step of the predetermined number of steps are different from the first provisional predicted landing position/posture and that the necessary requirement is satisfied when the determination result of the determining means is affirmative and the first provisional predicted landing position/posture and the second provisional predicted landing position/posture at the step of the predetermined number of steps do not agree or substantially agree with each other.

In other words, if the determination result of the determining means is affirmative and the first provisional predicted landing position/posture and the second provisional predicted landing position/posture at the step of the predetermined number of steps do not agree or substantially agree with each other, then the predicted landing position/posture of the leg on the free leg side up to the step of the predetermined number of steps can be determined anew such that the necessary requirement is satisfied by setting the predicted landing position/posture of the leg on the free leg side at least one step before the step of the predetermined number of steps to be different from the first provisional predicted landing position/posture. Thus, generating a desired gait on the basis of the newly determined predicted landing position/posture makes it possible to generate a desired gait of a robot that causes the future position/posture of the robot at least at the step of the predetermined number of steps to be position/posture that match the position/posture of an object which moves according to a first provisional desired motion trajectory based on the moving plan (position/posture that satisfy the predetermined requirement).

Further, when the determining means is constructed as described above, the gait creation device preferably comprises a means that determines, when a determination result of the determining means is negative, third provisional predicted landing position/posture of the leg on the free leg side of the robot up to the step of the predetermined number of steps so as to bring the predicted landing position/posture of the leg of the free leg side of the robot at the step of the predetermined number of steps close to the first provisional predicted landing position/posture at the step of the predetermined number of steps within the range in which the predetermined restrictive condition is satisfied;

a means which estimates a first predicted moving path of the object that satisfies the predetermined requirement with respect to the determined third provisional predicted landing position/posture;

a means which estimates a second predicted moving path of the object that satisfies the predetermined requirement with respect to the first provisional predicted landing position/posture; and a means which corrects a velocity command value of the object in the moving plan on the basis of a movement distance of the object in a first predetermined period when it is assumed that the object is moved according to the first predicted moving path, the time of the first predetermined period, a movement distance of the object in a second predetermined period when it is assumed that the object is moved according to the second predicted moving path, and the time of the second predetermined period.

With this arrangement, it is possible to properly correct a moving plan of an object by correcting a velocity command value of the object in the moving plan on the basis of a movement distance of the object in the first predetermined period when it is assumed that the object is moved according to the first predicted moving path, the time of the first predetermined period, a movement distance of the object in a second predetermined period when it is assumed that the object is moved according to the second predicted moving path, and the time of the second predetermined period, or in other words, to correct the moving plan so as to allow a desired gait that satisfies the necessary requirement to be generated according to the corrected moving plan. For example, an average moving velocity of the object when it is assumed that the object is moved according to the first predicted moving path can be determined from the movement distance of the object in the first predetermined period and the time of the first predetermined period (the time from the start to the end of the first predetermined period), and an average moving velocity of the object when it is assumed that the object is moved according to the second predicted moving path can be determined from the movement distance of the object in the second predetermined period and the time of the second predetermined period (the time from the start to the end of the second predetermined period). In this case, the former average moving velocity means an average moving velocity of the object that is ideal to satisfy the necessary requirement, and the latter average moving velocity means an average moving velocity of the object according to the first provisional desired motion trajectory. Hence, the moving plan can be properly corrected by correcting a velocity command value of the object in the moving plan on the basis of, for example, a ratio of the aforesaid average moving velocities. More specifically, for example, the ratio of the former average moving velocity to the latter average moving velocity may be multiplied by a velocity command value of the object in the moving plan thereby to correct the moving plan.

Incidentally, the first predetermined period and the second predetermined period may agree or may not agree. However, the end time of these first predetermined period and second predetermined period is desirably time that lies, for example, within a period from the time at which the leg of the free leg side of the step of the predetermined number of steps lands to the time at which the leg of the free leg side lands next. Furthermore, the first predetermined period is desirably, for example, a period for the predetermined number of steps (a period of a predetermined number of times the period for one step). Meanwhile, the second predetermined period may be, for example, a period between the current time at which a new desired gait is about to be generated and time within the period from the time at which the leg of the free leg side of the step of the predetermined number of steps lands to the time at which the leg of the free leg side lands next, and does not have to be a period of a predetermined number of times the period for one step.

In this case, preferably, the means for correcting the velocity command value of the object in the moving plan uses the movement distance of the object in the first predetermined period in a case, where it is assumed that the object is moved along a path obtained by projecting the first predicted moving path in the direction of the second predicted moving path, in place of the movement distance of the object in the first predetermined period when the direction of the first predicted moving path does not agree with the direction of the second predicted moving path.

More specifically, if a first provisional desired motion trajectory of the object is a trajectory that causes the direction of a velocity vector of the object to temporally change, as in a turning motion trajectory, (if a moving path of the object defined by the first provisional desired motion trajectory is not linear), then usually, the first predicted moving path of the object that satisfies the predetermined requirement with respect to the third provisional predicted landing position/ posture and the second predicted moving path of the object that satisfies the predetermined requirement with respect to the first provisional predicted landing position/posture (a path along the moving path of the object defined by the first provisional desired motion trajectory) do not agree. Further, in this case, the first predicted moving path approaches to the second predicted moving path at the step of the predetermined number of steps; therefore, if a motion of a leg of the robot is made on the basis of the third provisional predicted landing position/posture thereby to move the object, then the direction of an actual object moving path at each number of steps of the robot tends to deflect in the direction of the second predicted moving path. Hence, the movement distance of the object in the first predetermined period when it is assumed that the object is moved along the path obtained by projecting the first predicted moving path in the direction of the second predicted moving path provides a highly reliable estimated value of the actual movement distance of the object when the motion of the leg of the robot is made on the basis of the third provisional predicted landing position/posture. Thus, when correcting a velocity command value of an object in a moving plan, the moving plan can be corrected further properly by using the movement distance of the object in the first predetermined period in the case where it is assumed that the object is moved along a path obtained by projecting the first predicted moving path in the direction of the second predicted moving path in place of the movement distance of the object in the first predetermined period.

BEST MODE FOR CARRYING OUT THE INVENTION

The following will explain a gait creation device of a leg-type mobile robot according to an embodiment of the present invention with reference to the accompanying drawings. A bipedal mobile robot will be taken as an example of a leg-type mobile robot.

FIG. 1 is a schematic diagram providing a general view of a bipedal mobile robot as a leg-type mobile robot according to the embodiment.

As shown in the figure, the bipedal mobile robot (hereinafter referred to as "the robot") 1 is equipped with a pair of right and left legs (leg links) 2, 2 extended downward from a body (a base body of the robot 1) 3. The two legs 2, 2 share the same construction, each having six joints. The six joints are comprised of, in the following order from the body 3 side, joints 10R, 10L (the symbols R and L being the symbols meaning that they correspond to a right leg and a left leg, respectively, and the same applying hereinafter) for swinging (rotating) a hip (waist) (for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2, and the body 3 is installed at the uppermost top of the two legs 2, 2 through the intermediary of the three joints 10R(L), 12R(L) and 14R(L) of the hip of each leg 2. A control unit 60 and the like, which will be discussed in detail hereinafter, are housed in the body 3. For the sake of convenience of illustration, the control unit 60 is shown outside the body 3 in FIG. 1.

In each leg 2 having the construction described above, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arms (arm links) 5, 5 is attached to both sides of an upper portion of the body 3, and a head 4 is disposed at a top end of the body 3. Both arms 5, 5 share the same construction, each of them having seven joints. More specifically, each arm 5 is provided with a shoulder joint composed of three joints 30R(L), 32R(L), and 34R(L), an elbow joint composed of one joint 36R(L), a wrist joint composed of three joints, namely, 38R(L), 40R(L) and 42R(L), and a hand portion (hand) 44R(L) connected to the wrist joint. The head 4 is not directly associated with the topic of the present invention, so that detailed explanation thereof will be omitted.

The construction described above imparts six degrees of freedom to the foot 22R(L) of each leg 2 relative to the body 3. During a travel, such as walking, of the robot 1, desired motions of the two feet 22R and 22L can be implemented by driving 6*2=12 joints of the two legs 2, 2 together ("*" in this description denotes multiplication for scalar calculation, while it denotes an outer product in vector calculation) at appropriate angles. This arrangement enables the robot 1 to arbitrarily move in a three-dimensional space. Furthermore, each arm 5 has seven degrees of freedom relative to the body 3 and is capable of performing a desired operation, such as pushing a carriage, which will be discussed later, by driving 7*2=14 joints of the two arms 5, 5 together at appropriate angles.

As shown in FIG. 1, a publicly known six-axis force sensor 50 is provided under the ankle joints 18R(L), 20R(L) and between the ankle joints and the foot 22R(L) of each leg 2. The six-axis force sensor 50 detects primarily whether the foot 22R(L) of each leg 2 is in contact with the ground and a floor reaction force (ground contact load) acting on each leg 2, and it outputs detection signals of components in three directions Fx, Fy and Fz of a translational force of the floor reaction force and components in three directions Mx, My and Mz of a moment to the control unit 60. A six-axis force sensor 52 similar to the six-axis force sensor 50 is interposed between the hand portion (hand) 44R(L) of each arm 5 and the wrist joints 38R(L), 40R(L), and 42R(L), and detection signals of components in the three directions of a translational force and components in the three directions of a moment of an external force acting on the hand portion 44R(L) are output from the six-axis force sensor 52 to the control unit 60. Furthermore, the body 3 is equipped with a posture sensor 54 for detecting an inclination angle of the body 3 relative to a Z-axis (vertical direction (gravitational direction)) and an angular velocity thereof, and a rotational angle (yaw angle) of the body 3 about the Z-axis and an angular velocity thereof, detection signals thereof being output from the posture sensor 54 to the control unit 60. The posture sensor 54 is provided with a three-axis-direction accelerometer and a three-axis-direction gyro sensor, which are not shown, and the detection signals of these sensors are used to detect posture angles (inclination angles and yaw angles) of the body 3 and angular velocities thereof and also used to estimate its own position/posture of the robot 1. Although detailed structures are not shown, each joint of the robot 1 is provided with an electric motor 64 (refer to FIG. 2) for driving the joint and an encoder (rotary encoder) 65 (refer to FIG. 2) for detecting a rotational amount of the electric motor 64 (a rotational angle of each joint). Detection signals of the encoder 65 are output from the encoder 65 to the control unit 60.

Furthermore, although not shown, an elastic member, such as a spring, is interposed between each foot 22R(L) and the six-axis force sensor 50, and an elastic member, such as rubber, is bonded to the bottom surface of the foot 22R(L). These elastic members constitute a compliance mechanism, which elastically deforms when each leg 2 is subjected to a floor reaction force.

FIG. 2 is a block diagram showing the construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg 2, the six-axis force sensor 52 of each arm 5, the posture sensor 54 (an accelerometer and a rate gyro sensor), etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates a desired gait, calculates a joint angle displacement command (a command value of a displacement angle of each joint or a rotational angle of each electric motor 64), and sends the calculated command to the RAM 84. The second calculator 92 reads the joint angle displacement command from the RAM 84 and an actual measurement value of a joint angle detected on the basis of an output signal of the encoder 65 to calculate a manipulated variable required for driving each joint and outputs the calculated manipulated variable to the electric motor 64 for driving each joint through the intermediary of the D/A converter 96 and a servo amplifier 64a.

FIG. 3 is a block diagram providing a general view of the functional construction of a control device of a leg-type mobile robot according to an embodiment in the present description. A portion enclosed by the dashed line in this FIG. 3 is constituted of the processing functions (primarily the functions of the first calculator 90 and the second calculator 92) implemented by the control unit 60. In the following explanation, the symbols R and L will be omitted as long as it is not particularly necessary to discriminate right and left of the legs 2 and the arms 5.

The following will explain the functional construction of the control unit 60, which is comprised of a gait generator 100, an object reaction force balance controller 102, a leg main controller 104, and an arm main controller 106. In the embodiment in this description, the processing by the object reaction force balance controller 102, the leg main controller 104, and the arm main controller 106, excluding the gait generator 100, is the same as the one previously proposed by the present applicant in Japanese Laid-Open Patent Application Publication No. H10-230485. Hence, in the following explanation of the present embodiment, the explanation will center around the gait generator 100, while the explanation of the object reaction force balance controller 102, the leg main controller 104, and the arm main controller 106 will be simply a schematic explanation.

The gait generator 100 generates a desired gait of the robot 1 freely and in real time and outputs the generated desired gait. A desired gait output by the gait generator 100 is composed of a desired body position/posture trajectory (a desired position and desired posture trajectory of the body 3), a desired foot position/posture trajectory (a desired position and desired posture trajectory of each foot 22), a desired hand position/posture trajectory (a desired position and desired posture trajectory of the hand 44 of each arm 5), a desired total floor reaction force central point trajectory (the trajectory of a desired position of a total floor reaction force central point), a desired total floor reaction force trajectory, and a desired object reaction force trajectory. If a portion that can be moved relative to the body 3 is provided in addition to the legs 2 and the arms 5, then a desired position/posture trajectory of the movable portion is added to a desired gait. In the following explanation, "desired" will be frequently omitted unless there is a danger of misunderstanding.

Here, the meanings and definitions of terms related to desired gaits generated by the gait generator 100 will be explained. The "trajectory" in a gait means a temporal change pattern (time series pattern).

The "position" of each portion of the robot 1, such as a foot position or a body position, means the position of a certain representative point fixedly set on the portion. For example, in the present embodiment, the representative point of each foot 22 is the point at which a perpendicular line extended from the center of the ankle joint of the leg 2 provided with the foot 22 down to the bottom surface of the foot 22 intersects with the bottom surface, and the position of the representative point is the foot position. Further, a "posture" means a spatial orientation. Specifically, for example, a body posture is represented by an inclination angle of the body 3 in the roll direction (about the X-axis) relative to the Z-axis (vertical axis), an inclination angle of the body 3 in the pitch direction (about the Y-axis), and a rotational angle (yaw angle) of the body 3 in the yaw direction (about the Z-axis), and a foot posture is represented by means of a two-axis spatial azimuth fixedly set on each foot 22.

Components of a gait other than the components related to a floor reaction force and an object reaction force, i.e., a gait related to a motion of the robot 1, such as foot position/posture or body position/posture, will be generically referred to as "motion." A motion trajectory may be fixed (temporally unchanged) or substantially constant. For instance, if the robot 1 is maintained in a state wherein both feet 22 and 22 thereof have been landed and remain stationary, then the foot position/posture trajectory will be fixed.

An object reaction force in a gait means a reaction force of a force applied to an object from the robot 1 (a force acting on the robot 1 from an object) when making the robot 1 move the object. In an embodiment in the present description, an explanation will be given by taking a case where the robot 1 carries out an operation of pushing an object 120 while walking with the hands 44R, 44L of both arms 5, 5 engaged with predetermined portions of the object 120 (a carriage in the illustrated example) as an example, as shown in, for instance, FIG. 4. A force received by the robot 1 from the object 120 is an object reaction force. The object reaction force is generally composed of a translational force component and a moment component. However, in the embodiment in the present description, the object reaction force means a translational force acting on the robot 1 from the object 120, and a moment about a certain point acting on the robot 1 due to the translational force is referred to as an object reaction force moment. Supplementally, an object reaction force is obtained by reversing the sign (direction) of a force to be applied to the object 120 from the robot 1, so that an action force from the robot 1 to the object 120 may be used in place of an object reaction force.

In the present description, regarding a motion of the object 120, a position of the object 120 means a position of a representative point fixedly set on the object 120, as with a foot position or the like of the robot 1. Further, a posture of the object 120 means a spatial orientation of the object 120, as with a foot posture or the like of the robot 1. And, a position and a posture of the object 120 are generically referred to as object motion in some cases.

Further, a floor reaction force (a floor reaction force composed of a translational force and a moment) acting on each foot 22 is referred to as "the floor reaction force of each foot" and a resultant force of "the floor reaction force of each foot" of all (two) feet 22R and 22L of the robot 1 is referred to as "the total floor reaction force." In the following explanation, however, the floor reaction force of each foot will be hardly referred so that "the floor reaction force" will be handled as synonymous with "the total floor reaction force" unless otherwise specified.

A desired floor reaction force is generally expressed by a point of action and a translational force and a moment acting on the point. The point of action may be set at any point, so that there are countless conceivable expressions for the same desire floor reaction force. If a desired floor reaction force is expressed by taking a desired floor reaction force central point (a desired position of the central point of a total floor reaction force), in particular, as the point of action, then the moment component of the desired floor reaction force will be zero, excluding a vertical component (the moment about the vertical axis (Z-axis)). In other words, a horizontal component (the moment about the horizontal axis (the X-axis and a Y-axis)) of the moment of the desired floor reaction force about the desired floor reaction force central point will be zero. Hence, in the embodiment in the present description, the gait generator 100 performs generation by taking the desired floor reaction force central point as the point of action of the desired total floor reaction force. Incidentally, the desired floor reaction force central point has the meaning as the point of action of the desired total floor reaction force, so that it may be said to be a component of the desired total floor reaction force in the basic sense. In the embodiment in the present description, however, a desired floor reaction force central point in a desired floor reaction force is closely related to the operational control of the robot 1. In FIG. 3, therefore, the desired floor reaction force central point, which is the point of action in the desired total floor reaction force, is shown separately from the desired total floor reaction force.

In the present description, ZMP (zero moment point) is used to mean a point at which the moment acting about the point due to a resultant force (or a floor reaction force that balances out the resultant force) of an inertial force produced by a motion of the robot and the gravity and an object reaction force acting on the robot is zero, excluding the vertical component thereof. In a gait that satisfies a dynamic balance condition, the ZMP calculated from a desired motion trajectory of the robot, the gravity, and a desired object reaction force agrees with a desired floor reaction force central point. In the present description, a desired ZMP will be used instead of a desired floor reaction force central point in many cases.

Further, in the present description, a desired gait will means a set of a desired motion, a desired floor reaction force (including a desired ZMP), and a desired object reaction force for a predetermined period. Especially, in the present embodiment, a desired gait (including a case where the desired gait is referred to simply as a gait) will mean a set of a desired motion, a desired floor reaction force (including a desired ZMP), and a desired object reaction force for the period of one step of the robot 1 unless otherwise specified. In this case, "one step" of a desired gait will be used to mean the period from the instant when one leg 2 of the robot 1 lands to the instant when the other leg 2 lands. A series of gaits is formed of several gaits in connection (gaits for a predetermined period). In the explanation given hereinafter, a desired gait for one-step period may be referred to as a unit gait.

A two-leg supporting period in a gait refers to a period during which the robot 1 supports its own weight by both legs 2, 2 (a period during which both legs 2, 2 are supporting legs), and a one-leg supporting period refers to a period during which the robot 1 supports its own weight only by one leg 2 (a period during which only one leg 2 is a supporting leg). In other words, a desired gait (unit gait) in the present embodiment is a desired gait for a period from the instant when a two-leg supporting period begins to the instant when the following one-leg supporting period ends. The leg 2 that supports the self-weight of the robot 1 is called a supporting leg. Both legs 2, 2 become supporting legs in the two-leg supporting period, while one leg 2 becomes a supporting leg in the one-leg supporting period. Further, in the one-leg supporting period, the leg 2 not supporting the self-weight of the robot 1 (the leg 2 that is not a supporting leg) is called a free leg. In the explanation to be given hereinafter, a supporting leg in a desired gait will mean the leg 2 that lands at the beginning of the two-leg supporting period (the leg 2 that becomes a supporting leg in the one-leg supporting period following the two-leg supporting period) unless otherwise specified. Further, the foot 22 of the leg 2 on the supporting leg side and the foot 22 of the leg 2 on the free leg side will be referred to as the supporting leg foot 22 and the free leg foot 22, respectively.

Further, a desired gait (unit gait) to be newly generated by the gait generator 100 or a desired gait (unit gait) that is being generated will be called a current time gait, a desired gait that is one step before the current time gait will be called a last time gait, a desired gait that is one step following the current time gait will be called a next time gait, and a desired gait that is yet another step following the current time gait will be called the next but one time gait.

A desired gait will be described by means of a supporting leg coordinate system as a global coordinate system. In the present embodiment, the supporting leg coordinate system is a global coordinate system (a coordinate system fixed to a floor) in which the point at which a perpendicular line extended to a floor surface from the center of the ankle joints 18 and 20 of the supporting leg intersects with the floor surface in a state wherein substantially the entire bottom surface of the supporting leg foot 22 is in contact (close contact) with the floor surface (this point agreeing with the representative point of the foot 22 in a state wherein substantially the entire bottom surface of the supporting leg foot 22 is in contact with the floor surface in an example of the present embodiment in the present description) while the supporting leg foot 22 is in a horizontal posture (more generally, a posture parallel to the floor surface) is defined as the origin, and a horizontal plane that passes the origin is defined as an XY plane. In this case, the X-axis direction and the Y-axis direction indicate the longitudinal direction and the lateral direction, respectively, of the supporting leg foot 22. In the following explanation, the X-axis, the Y-axis, and the Z-axis will mean three axes of the supporting leg coordinate system unless otherwise specified. The origin of the supporting leg coordinate system does not necessarily have to agree with the representative point of the foot 22 in the state wherein substantially the entire bottom surface of the supporting leg foot 22 is in contact with the floor surface, and it may alternatively be set at a point on the floor surface that is different from the representative point.

The following will explain in detail a gait generator 100 according to a first embodiment of the present invention. FIG. 5 to FIG. 7 are flowcharts showing the processing by the gait generator 100. The gait generator 100 sequentially carries out the processing shown in the flowcharts of FIG. 5 to FIG. 7 at a predetermined calculation processing cycle.

First, in S01, a moving plan for an object 120 is determined. The moving plan to be determined here includes at least a moving plan for the object 120 for a predetermined future period (for a plurality of steps of the robot 1) from the current time. The moving plan is decided basically according to moving requirements of the object 120 (a design requirement on a method and timing for moving the object 120), and it is constituted of a position/posture trajectory (a time series of position and posture) of the object 120 or a parameter or a function expression or the like that defines the trajectory. For instance, if a moving requirement for the object 120 is a requirement to move the object 120 at a constant velocity in the X-axis direction at certain time t0, then the moving plan is decided as illustrated by a graph g1 of FIG. 8. The graph g1 shows time-dependent changes of an object position (a position in the X-axis direction) in the moving plan. In this case, for instance, the time series of the position of the object 120 at each time (time at each certain time interval) after the current time may be decided as the moving plan, or time t0 and the inclination of the graph g1 (moving velocity of the object 120) may be decided as the elements (the parameters) that define the moving plan, or a function expression of the graph g1 may be decided as the element (the parameter) that defines the moving plan. Incidentally, the request for moving is supplied to the gait generator 100 from outside, as necessary, or stored and retained in a storage means, which is not shown, of the control unit 60 beforehand.

Supplementally, the moving plan decided in S01 is not necessarily decided according to a moving requirement; it is corrected as appropriate when necessary, which will be discussed hereinafter.

The procedure then proceeds to S03 wherein a desired object motion trajectory (a desired object position/posture trajectory) and a desired object reaction force trajectory are provisionally determined using an object dynamic model on the basis of the moving plan decided in S01 as described above.

Now, the processing in this S03 and the object dynamic model used in the processing will be explained with reference to the block diagram of FIG. 9. FIG. 9 is the block diagram showing the calculation processing for determining a desired object position trajectory and a desired object reaction force trajectory of a desired object motion trajectory in S03. The portion enclosed by the dashed line in the block diagram provides the object dynamic model showing a relationship between forces acting on the object 120 and motions of the object 120. In the present embodiment, for the convenience of understanding, the explanation will be given by taking, as an example, a case where the object 120 is moved on a substantially horizontal floor.

The object dynamic model shown in FIG. 9 is a dynamic model (forward dynamic model) that receives a force (more specifically, a translational force in the horizontal direction) to be applied to the object 120 as an input, and outputs a position of the object 120. To be more specific, the object dynamic model determines a motional acceleration of the object 120 by multiplying an input value of a translational force in the horizontal direction to be applied to the object 120 (the value determined by an adder 204, which will be discussed later) by a reciprocal 1/M of a mass M of the object 120 by a multiplier 206, then the obtained result is sequentially integrated (double-integrated) by integrators 208 and 210 thereby to output a position of the object 120 (a position on the object dynamic model). In other words, in the present embodiment, the object dynamic model shown in FIG. 9 is constructed on the basis of a dynamic equation that a translational force acting on the object 120 is equal to a product of an acceleration and a mass of the object 120. An output of the integrator 208 means a moving velocity of the object 120 on the object dynamic model and this will be hereinafter referred to as an object model velocity.

The calculation processing in S03 that uses such an object dynamic model will be specifically explained with reference to FIG. 9. First, a desired object velocity, which is a desired velocity at each instant (at each time) of the object 120 based on a moving plan determined in S01 described above, and the object model velocity previously determined by the integrator 208 are input to a subtracter 200, which determines a difference therebetween (=the desired object velocity−the object model velocity). Here, the desired object velocity is a value obtained as a first-order differential value of a position trajectory of the object 120 in the moving plan or a component of the moving plan. In the example of the moving plan shown in FIG. 8 described above, the inclination of the graph g1 may be directly used as the desired object velocity, and in this case, the desired object velocity will continually take a constant value. Then, the time series of the desired object velocity for a future predetermined period (for a plurality of steps of the robot 1) from the current time is sequentially input to the subtracter 200. The object model velocity input to the subtracter 200 is the value output from the integrator 208 when a desired object velocity immediately preceding the desired object velocity to be newly input is supplied to the subtracter 200.

Subsequently, the difference is multiplied by a predetermined gain Kv by a multiplier 202 to determine a required value of a translational force that should be applied to the object 120 from the robot 1. This means that, in the present embodiment, the required value of the translational force is determined by a feed-back control law such that the difference between the object desired velocity in the moving plan and the object model velocity converges to zero (such that the object model velocity follows the object desired velocity). As the feed-back control law, a proportional control law is used in this example. Then, a time series of the result obtained by reversing the sign of the determined required value of the translational force is output as a desired object reaction force trajectory.

Further, the determined required value of the translational force and an estimated disturbance force, which is an estimated value of a disturbance force applied to the actual object 120 from a source other than the robot 1 (e.g., a frictional force acting on the object 120 from a floor), are supplied to the adder 204, and the sum of the required value of the translational force and the estimated disturbance force is determined by the adder 204 as an input value of the translational force for the object dynamic model. Here, the estimated disturbance force is determined by the processing in S35, which will be described later, for each calculation processing cycle of the gait generator 100. As an estimated disturbance force to be input to the adder 120, the value determined at the previous calculation processing cycle of the gait generator 100 (last time value) is used. Then, the input value of the translational force determined as described above is supplied to the object dynamic model so as to determine the position of the object 120 as described above, and the time series of the determined position is output from the integrator 210 as a desired object position trajectory.

An initial value of an output of the integrator 208 of the object dynamic model is set to a value at time associated with a previous calculation processing cycle in the time series of an object model velocity determined by carrying out the processing in S03 at the previous calculation processing cycle of the gait generator 100. Further, an initial value of an output of the integrator 210 is set to a value at time associated with a previous calculation processing cycle in the time series of a desired object position determined by carrying out the processing in S03 at the previous calculation processing cycle of the gait generator 100.

A desired object posture trajectory in a desired object motion trajectory is determined such that it substantially agrees with, for example, the direction of a desired object velocity.

Supplementally, as long as a moving plan and an estimated disturbance force are maintained to be constant, a desired object motion trajectory and a desired object reaction force trajectory remain constant; therefore, the processing in S03 does not necessarily have to be implemented at each calculation processing cycle of the gait generator 100. Hence, for example, the processing in S03 may be carried out at each step of the robot 1 or at each more than one calculation processing cycle of the gait generator 100, or when a moving plan has been changed in S01, or if an estimated disturbance force has incurred a relatively significant change.

By the processing in S03 explained above, a desired object motion trajectory and a desired object reaction force trajectory for a future predetermined period from the current time are provisionally determined.

The processing in S03 corresponds to the future object motion provisionally determining means in the first invention of the present invention, and a desired object motion trajectory determined thereby corresponds to a first provisional desired motion trajectory.

Subsequently, the procedure proceeds to S05 wherein predicted landing positions/postures and predicted landing time of the free leg foot 22 of the robot 1 are provisionally determined on the basis of the desired object motion trajectory provisionally determined as described above. The predicted landing positions/postures and the predicted landing time provisionally determined here are the predicted landing positions/postures and the predicted landing time of the free leg foot 22 for a plurality of steps (for at least two steps) of the robot 1, including the predicted landing position/posture and the predicted landing time of the free leg foot 22 in the current time gait, which is the desired gait to be created now. In other words, the predicted landing position/posture and the predicted landing time to be provisionally determined include at least the predicted landing position/posture and the predicted landing time of the free leg foot 22 for the current time gait and the predicted landing position/posture and the predicted landing time of the free leg foot 22 for the next time gait. In this case, the predicted landing time of the free leg foot 22 is determined on the basis of a gait cycle (a set value of the time of the period of a unit gait). For example, the predicted landing time of the free leg foot 22 of the current time gait is determined to be the time obtained by adding a gait cycle to the start time of the current time gait. Further, the predicted landing position/posture of the free leg foot 22 is provisionally determined such that the position/posture relationship between the robot 1 and the object 120 during the period from the predicted landing time to the next predicted landing time of the free leg foot 22 (that is, in the period of one step after the free leg foot 22 is landed) satisfies a predetermined requirement. This requirement corresponds to a predetermined requirement in the present invention.

Here, in the period of each unit gait, the position/posture relationship between the robot 1 and the object 120 is required to, for example, maintain a proper interval between the object 120 and the body 3 of the robot 1 and to prevent the arms 5, 5 that engage the hands 44 with the object 120 from being fully stretched and to prevent the body 3 of the robot 1 from approaching too close to the object 120. Meanwhile, in the period of each unit gait, the body 3 is positioned substantially right above the supporting leg foot 22 when the time that is about half a gait cycle (i.e., the time that is substantially half a step) has elapsed from the start thereof. The position of the supporting leg foot 22 in the period of the unit gait is determined on the basis of the landing position of the free leg foot 22 in an immediately preceding gait.

Accordingly, in the present embodiment, the aforesaid requirement is regarded as a requirement that defines the relative position/posture relationship between the predicted landing position/posture of the free leg foot 22 and the position/posture of the object 120 at the time at which the time equivalent to half the gait cycle (the time for a half step) has elapsed from the above predicted landing time, and the predicted landing position/posture of the free leg foot 22 is determined in S05 such that the aforesaid requirement (hereinafter referred to as "the between-object-and-robot position/posture requirement") is satisfied.

In the present embodiment, the between-object-and-robot position/posture requirement includes a permissible range of the relative landing position/posture of the free leg foot 22 with respect to the position/posture of the object 120 at the time at which the period of the half step has elapsed from the predicted landing time of the free leg foot 22, and the predicted landing positions/postures of the free leg foot 22 for a plurality of steps, including the current time gait and the next time gait, are provisionally determined within the permissible range. For example, the predicted landing posture of the free leg foot 22 is determined such that the predicted landing position of the free leg foot 22 is the position that is away from a predetermined portion of the object 120 (e.g., from the portion with which the hands 10 hands 44 engage) by a predetermined distance back from the object 120 in the longitudinal direction of the object 120 at the time when the period of half a step has elapsed from the predicted landing time, and that the longitudinal direction of the free leg foot 22 agrees with the longitudinal direction of the object 120 or the direction of a velocity vector of the object 120 at the time when the period of half a step has elapsed from the predicted landing time. In this case, the predicted landing position of the free leg foot 22 in the width direction of the object 120 is determined such that the predicted landing position when the free leg foot 22 is the right foot 22R and the predicted landing position when the free leg foot 22 is the left foot 22L will have predetermined offsets on the right side and the left side, respectively, from the center of the object 120 in the width direction. Alternatively, however, an arrangement may be made such that the predicted landing positions of the object 120 in the width direction are the same (e.g., the predicted landing positions may agree with the position of the center of the object 120 in the width direction) regardless of whether the free leg foot 22 is the right foot 22R or the left foot 22L.

The predicted landing position of the free leg foot 22 is determined according to the between-object-and-robot position/posture requirement by the processing in S05 in the period during which the hands 44 of the robot 1 should be engaged with the object 120 and the object 120 should be moved by the robot 1. The predicted landing position/posture of the free leg foot 22 in any other period are determined according to another requirement different from the between-object-and-robot position/posture requirement. For instance, if the robot 1 is moved toward the object 120 from a position apart from the object 120 so as to start moving the object 120 thereafter, then the predicted landing position/posture and the predicted landing time of the free leg foot 22 of the robot 1 are determined such that the robot 1 is moved to a position before the object 120 (a position for the hands 44 of the robot 1 to engage with the object 120) by the time at which the movement of the object 120 should be started.

Supplementally, the predicted landing position/posture of the free leg foot 22 are, more specifically, the position/posture of the free leg foot 22 in a state wherein substantially the entire bottom surface of the free leg foot 22 has been brought into contact with the surface of a floor by rotating the free leg foot 22 in the pitch direction without slippage after the heel of the free leg foot 22 lands while the free leg foot 22 remaining in contact with the floor. Therefore, in the present embodiment, the predicted landing position/posture of the free leg foot 22R or 22L define the position/posture of a supporting leg coordinate system in a unit gait from the instant of the aforesaid landing to the next landing of the free leg foot 22L or 22R. Determining the predicted landing position/posture of the free leg foot 22 determines the position/posture of the supporting leg coordinate system in each unit gait according to the aforesaid method for setting a supporting leg coordinate system on the basis thereof. To be more specific, the supporting leg coordinate system in each unit gait will be a coordinate system having, as its origin, the point at which a perpendicular line extended from the center of the ankle joint of the leg 2 having the foot 22 down to a floor surface intersects with the floor surface in a state wherein the free leg foot 22 of a unit gait immediately preceding the aforesaid unit gait is matched to the predicted landing position/posture.

The predicted landing position/posture of the free leg foot 22 provisionally determined by the processing in S05 correspond to the first provisional predicted landing position/posture in the present invention.

Subsequently, the procedure proceeds to S07 wherein a ZMP trajectory parameter that defines a desired ZMP trajectory of the current time gait is provisionally determined. The ZMP trajectory parameter provisionally determined here is determined such that the desired ZMP (hereinafter referred to as the provisional desired ZMP) of the current time gait defined thereby exists substantially around the center of a ground contact plane of the supporting leg foot 22 in the current time gait (a so-called supporting polygon that includes the ground contact plane of both feet 22 in a two-leg supporting period) that is determined by the predicted landing position/posture and the predicted landing time provisionally determined in S05 and that it does not suddenly change. In other words, the ZMP trajectory parameter is determined such that the provisional desired ZMP in the current time gait exists at a position where the stability allowance of the robot 1 is maximized within the ground contact plane (or within the supporting polygon) of the robot 1 and that it does not suddenly change. The provisional desired ZMP determined according to such guidelines exhibits, for example, a pattern as shown in FIG. 10(a). FIG. 10(a) shows the pattern of the position of the provisional desired ZMP in the X-axis direction. In the case of this example, the position and the time of each break point in the provisional desired ZMP pattern (trajectory) are provisionally determined as ZMP trajectory parameters.

Subsequently, the procedure proceeds to S09 wherein the trajectory of an object reaction force moment (the time series of instantaneous values of an object reaction force moment) about the provisional desired ZMP determined by the currently provisionally determined ZMP trajectory parameters is calculated on the basis of the desired object motion trajectory and the desired object reaction force trajectory that are currently provisionally determined. More specifically, first, the motion trajectories (position/posture trajectories) of portions of the object 120 with which the hands 44R, 44L of the two arms 5, 5 of the robot 1 are to engage are determined on the basis of the desired object motion trajectory. The positions/postures of the portions are to have a predetermined position/posture relationship relative to the position/posture of the object 120. Then, the hand position/posture trajectories of the robot 1 (defining the trajectory of the point of action of an object reaction force relative to the robot 1) are determined such that they match the motion trajectories (position/posture trajectories) of the portions. Subsequently, the object reaction force moment about the provisional desired ZMP at each time (time at each certain time interval) is calculated from the determined hand position/posture trajectories, the desired object reaction force trajectory, and the provisional desired ZMP trajectory. And, the time series of the calculated object reaction force moment is obtained as the object reaction force moment trajectory. In a case where the robot 1 is moved to the vicinity of the object 120 from a location that is apart from the object 120 and then the hands 44R, 44L are engaged with the object 120 to start the operation of pushing the object 120, the object reaction force trajectory and, by extension, the object reaction force moment trajectory until the time at which the hands 44R, 44L are engaged with the object 120 (the time being decided as appropriate) will be zero.

Subsequently, the procedure proceeds to S11 wherein a gait parameter of a normal turning gait as a cyclic gait following the current time gait is determined. The gait parameter includes a foot trajectory parameter, which defines a foot position/posture trajectory in a normal turning gait, a ZMP trajectory parameter, which defines a desired ZMP trajectory, and an object reaction force trajectory parameter, which defines a desired object reaction force moment trajectory.

Before specifically explaining these gait parameters, an overview of a normal turning gait will be explained. In the following explanation, "start" and "end" of a gait means the start time and the end time, respectively, of each gait or an instantaneous gait at the start time or the end time.

A normal turning gait means a cyclic gait that does not cause discontinuity in a motion state (a state, such as foot position/posture or body position/posture) of the robot 1 at a boundary of a gait (a boundary of a gait for each step in the present embodiment) when the gait is repeated.

In the present embodiment, a normal turning gait, which is a cyclic gait, is a gait which repeats a one-cycle gait, the one-cycle gait of the normal turning gait being composed of a gait for two steps of the robot, that is, a gait composed of a first turning gait following a current time gait and a second turning gait following the first turning gait. Here, the term "turning" is used, because setting a turning rate to zero means moving straight, so that moving straight can be also included in turning in a broad sense. Hereinafter, a normal turning gait may be abbreviated to a normal gait.

To supplement the explanation of a normal gait, in a bipedal mobile robot as the robot 1, a normal gait for one cycle is composed of gaits for at least two steps (two successive unit gaits). It is also possible to set a complicated normal gait that has gaits for three steps or more defined as the gaits for one cycle. However, as will be discussed hereinafter, a normal gait is used only to determine a divergent component at the end of the current time gait (the details thereof will be discussed later). For this reason, using the normal gait having the gaits for three steps or more as one cycle would provide low effect, while the processing for generating the gaits would be complicated. Thus, the gaits for one cycle of normal gaits in the present embodiment are composed of gaits for two steps (first and second turning gaits). In the following explanation of the normal gaits, for the convenience of explanation, the normal gaits composed of gaits for two steps will be regarded as the gaits for one step. The normal gaits are virtual gaits temporarily assumed (in the calculation processing by the gait generator 100) to determine a divergent component at the end of the current time gait by the gait generator 100, and they are not directly output from the gait generator 100.

The term "divergence" means that the horizontal position of the body 3 of the bipedal mobile robot 1 significantly shifts to a position apart from the positions of both feet 22, 22. A value of a divergent component is a numeral value that indicates the degree of distance of the horizontal position of the body 3 of the bipedal mobile robot 1 apart from the positions of both feet 22, 22 (more specifically, the origin of a supporting leg coordinate system set on the ground contact plane of the supporting leg foot 22).

In the present embodiment, gaits are generated using divergent components as indicators such that desired gaits are continuously generated without developing the divergence. More specifically, a divergent component at the start of a normal gait following a current time gait is determined, and then the current time gait is generated (a gait parameter that defines the current time gait is determined) such that a divergent component at the end of the current time gait matches the divergent component at the start of the normal gait (more generally, the body position/posture of the current time gait converge to the body position/posture of the normal gait). Then, the divergent component at the start of the normal gait is determined on the basis of the gait parameter determined in S11 such that a condition of a normal gait in which a motion state of the robot 1 at the start of the normal gait (the start of the first turning gait) agrees with that at the end thereof (the end of the second turning gait) (this will be hereinafter referred to as a boundary condition of a normal gait) is satisfied on a dynamic model of the robot 1. The basic guideline for generating gaits described above is the same as that previously proposed in PCT international publication WO/02/40224A1 by the present applicant. Therefore, in the following explanation regarding the normal gaits, technical matters that are different from the matters described in PCT international publication WO/02/40224A1 will be mainly explained, and detailed explanation of similar technical matters may be omitted.

Returning to the explanation of S11, the foot trajectory parameter of the gait parameter of the normal gait is composed of the positions/postures of the supporting leg foot 22 and the free leg foot 22, respectively, at the start and the end of the first turning gait and the second turning gait, respectively, the gait cycle of each turning gait, and the like, and it is determined such that the foot position/posture trajectory is connected in the order of the current time gait, the first turning gait, and the second turning gait. The following will explain a specific setting method with reference to FIG. 11.

The free leg foot position/posture at the start of a first turning gait are the supporting leg foot position/posture at the end of the current time gait observed from the next time's gait supporting leg coordinate system (XY coordinate system). The supporting leg foot position/posture at the end of the current time gait are the position/posture of the supporting leg foot 22 obtained when the supporting leg foot 22 at the start of the current time gait is rotated in the pitch direction until substantially the entire bottom surface of the supporting leg foot 22 is brought in contact with a floor without slippage while the supporting leg foot 22 at the start of the current time gait is held in contact with the floor (they agree with the predicted landing position/posture of the free leg foot 22 of the last time gait). The position/posture on a next time's gait supporting leg coordinate system are determined on the basis of the predicted landing position/posture of the free leg foot 22 of the current time gait, as shown in FIG. 11.

The supporting leg foot position/posture at the start of the first turning gait are the free leg foot position/posture at the end of the current time gait observed from the next time's gait supporting leg coordinate system. The free leg foot position/posture at the end of the current time gait are determined to be the position/posture based on the predicted landing position/posture of the free leg foot 22 of the current time gait (or the next time's gait supporting leg coordinate system determined based thereon). Specifically, the free leg foot position/posture at the end of the current time gait are determined such that the position/posture obtained when the free leg foot 22 of the current time gait is rotated by a predetermined angle in the pitch direction without slippage from the free leg foot position/posture at the end of the current time gait while it is held in contact with a floor provide the predicted landing position/posture of the free leg foot 22 of the current time gait.

The free leg foot position/posture at the end of the first turning gait are the free leg foot position/posture at the end of the next time gait observed from the next time's gait supporting leg coordinate system. The free leg foot position/posture at the end of the next time gait are determined to be the position/posture based on the predicted landing position/posture of the free leg foot 22 of the next time gait (or the next but one time's gait supporting leg coordinate system, X"Y" coordinate system, determined based thereon) in the same manner as the method for determining the free leg foot position/posture at the end of the current time gait.

The supporting leg foot position/posture at the end of the first turning gait are the position/posture of the supporting leg foot 22 obtained when the supporting leg foot 22 whose position/posture have been matched with the next time's gait supporting leg coordinate system is rotated in the pitch direction until substantially the entire bottom surface of the supporting leg foot 22 is brought in contact with a floor without slippage while the supporting leg foot 22 is held in contact with the floor (the position/posture agree with the predicted landing position/posture of the free leg foot 22 of the current time gait).

The free leg foot position/posture at the start of the second turning gait are the supporting leg foot position/posture at the end of the first turning gait observed from the next but one time's gait supporting leg coordinate system. The supporting leg foot position/posture at the start of the second turning gait are the free leg foot position/posture at the end of the first turning gait observed from the next but one time's gait supporting leg coordinate system.

The free leg foot position/posture at the end of the second turning gait is determined such that the position/posture thereof observed from the next but one time's gait supporting leg coordinate system agree with the free leg foot position/posture at the end of the current time gait observed from the current time's gait supporting leg coordinate system. The supporting leg foot position/posture at the end of the second turning gait are determined such that the position/posture thereof observed from the next but one time's gait supporting leg coordinate system agree with the supporting leg foot position/posture at the end of the current time gait observed from the current time's gait supporting leg coordinate system.

The gait cycles of the first turning gait and the second turning gait are set to be the same as the next time gait cycle (this being the difference between the predicted landing time of the free leg foot 22 of the current time gait and the predicted landing time of the free leg foot 22 of the next time gait). The gait cycles of the first turning gait and the second turning gait do not necessarily have to be the same with each other; however both cycles are preferably decided on the basis of at least the next time gait cycle. Motion parameters (including time parameters, such as a two-leg supporting period time) of the current time gait, the first turning gait, and the second turning gait other than those described above are appropriately determined on the basis of the aforesaid determined parameters such that a gait condition (e.g., whether the velocity of an actuator falls within a permissible range, whether a movable angle is exceeded, or whether there is interference with a floor or the like) is satisfied.

A ZMP trajectory parameter of the gait parameter of a normal gait is determined such that the ZMP trajectory defined by the ZMP trajectory parameter provides an increased stability allowance of the robot 1 and the ZMP trajectory does not incur a sudden change, as in the case where a desired ZMP trajectory parameter has been provisionally determined in S07 described above.

Further, an object reaction force moment trajectory parameter of a normal gait is determined on the basis of the object reaction force moment trajectory calculated in S09 such that a cyclic condition is satisfied. For example, it is assumed that an object reaction force moment trajectory associated with a current time gait, a next time gait, and a next but one time gait is as shown in FIG. 12($a$). Here, the object reaction force moment trajectory of the current time gait is the trajectory determined in S09. The object reaction force moment trajectory of the next time gait is the trajectory calculated in the same manner as that in S09 on the basis of the object reaction force trajectory and the desired object motion trajectory of the next time gait determined in S03 and the ZMP trajectory defined by the ZMP trajectory parameter of a normal turning gait. The object reaction force moment trajectory of the next but one time gait is the trajectory calculated in the same manner as that in S09 on the basis of the object reaction force trajectory and the desired object motion trajectory of the next but one time gait determined in S03 and the ZMP trajectory defined by the ZMP trajectory parameter of a normal turning gait.

At this time, the object reaction force moment trajectory parameter of the normal turning gait is determined such that the object reaction force moment trajectory of the normal turning gait will be, for example, the trajectory shown in FIG. 12($b$). In this example, the object reaction force moment trajectory from the start to the end of the first turning gait of the normal turning gait is determined such that it continues to the object reaction force moment trajectory of the current time gait and agrees with the object reaction force moment trajectory of the next time gait. Further, the object reaction force moment trajectory of the second turning gait of the normal turning gait is determined such that it continues to the object reaction force moment trajectory of the first turning gait and agrees with the object reaction force moment trajectory of the next but one time gait from the start of the second turning gait up to time tx immediately before the end thereof, while it continually changes to the same value as the value at the start of the first turning gait (the start of the normal turning gait) from the value at time tx from time tx to the end thereof. Time tx corresponds to, for example, the time at a break point of the ZMP trajectory of the normal turning gait.

If the difference between the value of an object reaction force moment at the start of the next time gait and the value of an object reaction force moment of the next but one time gait is not very large, then the value of the object reaction force moment at the start of the normal turning gait and the value of the object reaction force moment at the end thereof do not necessarily have to be the same.

Subsequently, the procedure proceeds to S13 wherein a divergent component at the start of the normal turning gait is determined. In this case, since the normal turning gait is a cyclic gait, the divergent component at the start of the normal turning gait is determined such that the initial state (including the divergent component at the start) of a motion of the first turning gait and the terminal state (including the divergent component at the end) of a motion of the second turning gait agree with each other on a predetermined dynamic model of the robot 1.

Before explaining in detail the processing in this S13, the dynamic model of the robot 1 used for the processing in this S13 and the dynamic calculation for determining a desired body position by using the dynamic model will be explained. The dynamic model, which is used for the processing in S13 and also used for determining a current time gait by the processing up to S37, which will be discussed later, is a dynamic model that expresses simplified (approximate) dynamic behaviors of the robot 1 (a relationship between forces acting on the robot 1 and motions). Hereinafter, the dynamic model will be referred to as the robot simplified model. The basic structure of this robot simplified model is the same as that in PCT international publication WO/02/40224A1, but it differs from the one in the application in that an object reaction force moment is taken into account.

FIG. 13 shows the structure of the robot simplified model. As illustrated, the robot simplified model is a three-mass-point model and constructed such that the dynamics of the legs 2 and the dynamics of the body 3 do not interfere with each other, and the dynamics of the entire robot 1 is indicated by linear connections thereof.

The robot simplified model is constructed of an inverted pendulum A and two leg mass points 2m, 2m (a supporting leg mass point and a free leg mass point). Each leg mass point 2m is a mass point associated with each leg 2. Each of these leg mass points 2m is a fixed point in a local coordinate system arbitrarily set fixedly on the foot 22 of each corresponding leg 2, and the position thereof is uniquely determined on the basis of the position/posture of each foot. For example, each foot mass point 2m is set at the point that is shifted toward the center of the ankle joint from a representative point of the bottom surface of the foot 22 to the ankle joint side by a predetermined distance.

The inverted pendulum A is constituted of a free supporting point "a", which horizontally moves, a mass point b, and a mass-free, length-variable link c that connects the supporting point a and the mass point b. In this case, it is assumed that even if the link c inclines, the link c expands or contracts so as to maintain a height h of the mass point b observed from the supporting point a at a constant value.

The mass point b of the inverted pendulum A (hereinafter referred to simply as the inverted pendulum mass point b) corresponds to a mass point of the body 3 of the robot 1, and therefore, the inverted pendulum mass point b may be hereinafter referred to as the body mass point b. A position of the inverted pendulum mass point b will be hereinafter abbreviated to an inverted pendulum position. The mass of the body mass point b includes the mass of the body 3 and the masses of the arms 5, 5 and the head 4.

The horizontal position of the body 3 of the robot 1 is geometrically determined from the horizontal position of the inverted pendulum mass point b. Specifically, for example, the horizontal position (XY coordinates observed in the supporting leg coordinate system) of the representative point of the body 3, i.e., the horizontal component of the body position, agrees with the horizontal position of the inverted pendulum mass point b. In other words, as shown in FIG. 13, the representative point of the body 3 and the inverted pendulum mass point b are on the same vertical line.

The ZMP of the inverted pendulum A is located at the position of the free supporting point a (no moment is generated about the supporting point a); therefore, the position of the supporting point a of the inverted pendulum A will be hereinafter referred to as the inverted pendulum ZMP and denoted by ZMPpend.

To represent the robot simplified model by mathematical expressions, the variables and parameters related to the model will be defined as follows.

msup: Mass of supporting leg mass point 2m; mswg: Mass of free leg mass point 2m; mb: Mass of inverted pendulum mass point b; mtotal: Total mass of the robot 1 (=msup+mswg+mb); mfeet: Total mass of both legs 2, 2 (=msup+mswg); xsup: Position of supporting leg mass point 2m; xswg: Position of free leg mass point 2m; xb: Position of inverted pendulum (Position of the body mass point b); and h: Height of inverted pendulum (Height from the supporting point a to the inverted pendulum mass point b of the inverted pendulum A).

Hereinafter, xb, xsup, and xswg will be expressed by three-dimensional vectors (XYZ coordinate vectors) unless otherwise specified. When X takes an arbitrary variable, dX/dt denotes a first-order differential of X and d2X/dt2 denotes a second-order differential of X. "g" denotes a gravitational acceleration constant. G denotes a gravitational acceleration vector whose X component, Y component, and Z component are 0, 0, and −g, respectively.

In the robot simplified model shown in FIG. 13, the moment acting about a certain point of action P due to a total inertial force of both leg mass points 2m, 2m (a resultant force of the inertial force due to the motions of both leg mass points 2m, 2m and gravity) is defined as a leg total inertial force moment about point P, and a coordinate (position) of the point of action P is denoted by xp.

Expression 01 given below is a dynamic definitional equation of the leg total inertial force moment about the point P.

Leg total inertial force moment about point $P = msup(xsup-xp)*G - msup(xsup-xp)*d2xsup/dt2 + mswg(xswg-xp)*G - mswg(xswg-xp)*d2xswg/dt2$  Expression 01

The leg ZMP is denoted by ZMPfeet and defined by Expression 02. However, the height of the leg ZMP (Z component of ZMPfeet) is the same as the height of the point P. This leg ZMP is a value that is associated, in a quasi manner, with the resultant force of the inertial force generated by motions of the two legs 2, 2 and gravity.

Leg total inertial force moment about point $P = mfeet*(ZMPfeet-xp)*G$  Expression 02

The point of action P is set such that the approximation accuracy of the robot simplified model is enhanced. For example, the point of action P related to the current time gait is set such that it linearly moves at constant velocity from the origin of the supporting leg coordinate system of the last time gait to the origin of the supporting leg coordinate system of a current time gait during a two-leg supporting period and that it is maintained at the origin of the current time's gait supporting leg coordinate system during a one-leg supporting period following the two-leg supporting period. The same applies to the point of action P related to the first turning gait and the second turning gait of a normal turning gait.

Further, the result obtained by dividing an object reaction force moment about a desired ZMP by the total mass mtotal of the robot 1 is defined as the object reaction force ZMP, and this is denoted as ZMPobj. More specifically, ZMPobj is defined by the following Expression 03.

ZMPobj=Object reaction force moment about desired ZMP/mtotal          Expression 03

At this time, a linear relationship of the following Expression 04 approximately holds among the desired ZMP, the leg ZMP (ZMPfeet), the inverted pendulum ZMP (ZMPpend), and the object reaction force ZMP.

ZMPpend=mtotal/mb*desired ZMP−mfeet/mb*ZMPfeet−mtotal/mb*ZMPobj          Expression 04

Expression 04 is a relational expression on a sagittal plane (XZ plane), and on a lateral plane (YZ plane), the sign of a third term of the right side in Expression 03 is reversed from "−" to "+".

Further, a differential equation denoting a behavior of the inverted pendulum A is represented by the following Expression 05.

Horizontal component of $d2xb/dt2=g/h$*(horizontal component of xb−horizontal component of ZMPpend)          Expression 05

Expressions 01 to 05 given above are the expressions that describe the dynamics of the robot simplified model shown in FIG. 13.

Using the robot simplified model makes it possible to determine a desired body position from desired foot position/posture, an object reaction force moment about a desired ZMP, the desired ZMP, and a desired body posture by the following dynamic calculation.

The dynamic calculation will be explained with reference to the block diagram of FIG. 14. FIG. 14 is the block diagram showing the dynamic calculation. The leg ZMP (ZMPfeet) is calculated according to Expressions 01 and 02 given above by a leg ZMP calculator 220 from the trajectories of desired positions/postures of both feet (desired positions/postures of the supporting leg foot 22 and the free leg foot 22) and the point of action P set as described above.

Further, the object reaction force moment about the desired ZMP is multiplied by 1/mtotal by a multiplier 222 to calculate the object reaction force ZMP (ZMPobj). Then, the result obtained by multiplying the calculated ZMPfeet by mfeet/mtotal by a multiplier 224 and the ZMPobj are subtracted from the desired ZMP by a subtracter 226, and a multiplier 228 multiplies the result of the subtraction by mtotal/mb, thereby carrying out the calculation of the right side of Expression 04 mentioned above. Thus, the inverted pendulum ZMP(ZMPpend) is calculated. Incidentally, ZMPpend determined according to the aforesaid calculation processing is on the sagittal plane. To calculate ZMPpend on the lateral plane, the calculation result of the multiplier 222 with the sign thereof reversed may be input to the subtracter 226.

By supplying the ZMPpend calculated as described above to the inverted pendulum A, the inverted pendulum horizontal position xb is calculated according to Expression 05 given above. Further, based on the inverted pendulum horizontal position xb and the desired body posture, a desired body position is determined by a body position determiner 230. In this case, the body position determiner 230 defines the inverted pendulum horizontal position xb as the desired body horizontal position. Further, a desired body vertical position is determined on the basis of a desired body posture or the like by the body height determining method previously proposed by the present applicant in, for example, Japanese Laid-Open Patent Application Publication H10-86080. Incidentally, in the present embodiment, the desired body posture of the robot 1 is, for example, a vertical posture.

Returning to the explanation of FIG. 5, the processing in S13 will be explained in detail below.

The processing in S13 determines the divergent component at the start of a normal gait on the basis of the aforesaid robot simplified model. If the divergent component in the gait is denoted by q and the horizontal velocity of the mass point b of the inverted pendulum A (or the body horizontal velocity) is denoted by vb, then q is defined by the following Expression 06 in the present embodiment.

$q=xb+vb/\omega 0$          Expression 06 where $\omega 0$ denotes a natural frequency of the inverted pendulum A, that is, a square root of g/h.

The technical meaning of the divergent component defined as described above has been explained in detail in PCT international publication WO/02/40224A1, so that the explanation thereof will be omitted herein.

When the divergent component q is defined as described above, if the dynamic equation of the inverted pendulum A (the above Expression 05) is broken up, a solution is given to q, and the above Expression 04 is applied to the solution result, then the following Expression 07 is obtained. The desired ZMP is denoted as ZMPtotal.

$q[k]=\exp(\omega 0k\Delta t)*q[0]+\exp(\omega 0k\Delta t)*(\exp(-\omega 0\Delta t)-1)*$
$\Sigma(\exp(-i\omega 0\Delta t)*mtotal/mb*ZMPtotal\ [i])-\exp$
$(\omega 0k\Delta t)*(\exp(-\omega 0\Delta t)-1)*\Sigma(\exp(-i\omega 0\Delta t)*mfeet/$
$mb*ZMPfeet[i])-\exp(\omega 0k\Delta t)*(\exp(-\omega 0\Delta t)-1)*$
$\Sigma(\exp(-i\omega 0\Delta t)*mtotal/mb*ZMPobj[i])$          Expression 07 where exp( ) means an exponential function of the base e of a natural logarithm. Further, $\Delta t$ denotes time interval of a discrete system, and k denotes the number of steps (k$\Delta t$ means time). Further, $\Sigma(\ )$ of Expression 07 means cumulative adding calculation from i=0 to i=k−1.

Expression 07 is an expression that describes the divergent component q on the sagittal plane, and the expression that describes the divergent component q on the lateral plane is an expression obtained by reversing all signs of a fourth term of the right side of Expression 07 from "−" to "+".

Here, attention will be focused on a divergent component at the start of a normal turning gait (the start of the first turning gait) (hereinafter referred to as the initial divergent component) and a divergent component at the end (the end of the second turning gait) (hereinafter referred to as the terminal divergent component); q[0](a divergent component at time 0) denotes the initial divergent component, and q[k](a divergent component at time k$\Delta t$) denotes a terminal divergent component.

At this time, a first term of the right side of Expression 07 denotes the terminal divergent component generated by the initial divergent component. A second term of the right side denotes the terminal divergent component generated by a desired ZMP pattern. A third term of the right side denotes the terminal divergent component generated by motions of both legs 2, 2 (motions of both leg mass points 2m, 2m). A fourth term of the right side denotes the terminal divergent component generated by an object reaction force moment pattern. Hereinafter, the second term of the right side will be denoted by Wzmptotal, the third term of the right side will be denoted by Wfeet, and the fourth term of the right side will be denoted by Wobj. More specifically, Wzmptotal, Wfeet, and Wobj are defined by the following expressions 08a, 08b, and 08c.

$Wzmptotal=\exp(\omega 0k\Delta t)*(\exp(-\omega 0\Delta t)-1)*$
$\Sigma(\exp(-i\omega 0\Delta t)*mtotal/mb*ZMPtotal[i])$          Expression 08a $Wfeet=-\exp(\omega 0k\Delta t)*(\exp(-\omega 0\Delta t)-1)*$
$\Sigma(\exp(-i\omega 0\Delta t)*mfeet/mb*ZMPfeet[i])$          Expression 08b $$Wobj=-\exp(\omega 0k\Delta t)*(\exp(-\omega 0\Delta t)-1)*\Sigma(\exp(-i\omega 0\Delta t)* \\ m\text{total}/mb*ZMPobj[i])$$ Expression 08c Incidentally, Expression 08c is an expression that defines Wobj on the sagittal plane, and Wobj on the lateral plane is obtained by reversing the sign of the right side of Expression 08c.

Rewriting the above Expression 07 by using these Wzmptotal, Wfeet, and Wobj provides the following Expression 09.

$$q[k]=\exp(\omega 0k\Delta t)*q[0]+W\text{zmptotal}+W\text{feet}+Wobj$$ Expression 09

In the present embodiment, the initial divergent component that satisfies a boundary condition of a normal turning gait is analytically determined according to the above Expressions 08a, 08b, 08c, and 09 such that the initial divergent component observed in the supporting leg coordinate system of the normal turning gait following a current time gait (the next time's gait supporting leg coordinate system (X'Y' coordinate system) shown in FIG. 11) agrees with the terminal divergent component of the normal turning gait (the normal turning gait following the current time gait) observed from the supporting leg coordinate system of the gait following the normal turning gait (the next but two time's gait supporting leg coordinate system (X'''Y''' coordinate system) shown in FIG. 11).

Here, if the terminal divergent component of the normal turning gait observed from the supporting leg coordinate system of the gait following the normal turning gait (the next but two time's gait supporting leg coordinate system (X'''Y''' coordinate system) shown in FIG. 11) is denoted by q'[k], then the following Expression 10 must hold to satisfy the boundary condition of the normal turning gait.

$$q[0]=q'[k]$$ Expression 10

Further, if a rotating matrix for coordinate-converting a value described by the supporting leg coordinate system of the gait following the normal turning gait (the next but two time's gait supporting leg coordinate system (X'''Y''' coordinate system) shown in FIG. 11) into a value described by the supporting leg coordinate system of the normal turning gait (the next time's gait supporting leg coordinate system (X'Y' coordinate system) shown in FIG. 11) is denoted by M, and a parallel movement vector of a coordinate origin is denoted by B, then the following Expression 11 is obtained.

$$q[k]=Mq'[k]+B$$ Expression 11

Thus, the following Expression 12 is derived from these Expressions 10 and 11.

$$q[k]=Mq[0]+B$$ Expression 12

This Expression 12 indicates the condition to be satisfied by the initial divergent component q[0] and the terminal divergent component q[k] in order to satisfy the boundary condition of the normal gait.

And, the following Expression 13 is derived from this Expression 12 and the above Expressions 08a to 08c and 09.

$$q[0]=inv(M-\exp(\omega 0k\Delta t)I)(W\text{zmptotal}+W\text{feet}+ \\ Wobj-B)$$ Expression 13

In Expression 13, inv( ) indicates an inverted matrix of the matrix in the parenthesis, and I denotes a unit matrix.

In the present embodiment, based on this Expression 13, the initial divergent component q[0] that satisfies the boundary condition of the normal turning gait is determined.

Specifically, based on the ZMP trajectory parameter of the normal turning gait determined in S11 described above, ZMPtotal[i](i=0, 1, ..., k−1), which denotes an instantaneous value of a desired ZMP at each time i$\Delta$t (i=0, 1 ... k−1) of a normal turning gait, is determined, and the determined value is used to carry out the calculation of the right side of Expression 08a mentioned above, thereby calculating Wzmptotal. Incidentally, Wzmptotal may be calculated by algorithm that utilizes the fact that a desired ZMP trajectory is a kinked-line trajectory, as explained in the PCT international publication WO/02/40224A1.

Further, based on the foot trajectory parameter of the normal turning gait determined in the above S11, the instantaneous values of the foot position/posture at each time i$\Delta$t (i=0, 1 ..., k−1) of a normal turning gait are determined, and the determined values are applied to an expression that represents the above Expressions 01 and 02 in terms of discrete systems, thereby determining ZMPfeet[i]. Incidentally, the foot position/posture are calculated for each foot 22 by using the finite-duration setting filter proposed by the present applicant in, for example, U.S. Pat. No. 3,233,450. In this case, the foot position/posture trajectory to be calculated will be a trajectory in which the free leg foot 22 in each of the first turning gait and the second turning gait of a normal turning gait rises at the start time of a one-leg supporting period and moves toward a predicted landing position of the free leg foot 22, and the free leg foot 22 lands at the heel thereof at a position corresponding to the predicted landing position at predicted landing time of the free leg foot 22. Then, the right side of the above Expression 08b is calculated using the ZMPfeet1[i] determined as described above, thereby calculating Wfeet. Supplementally, if the predicted landing position/posture of the free leg foot 22 are the same as the landing position/posture of the supporting leg foot 22 in the preceding gait, then the foot position/posture trajectory will be a trajectory in which the landing position/posture are maintained to be constant. Alternatively, however, a foot position/posture trajectory in which the free leg foot 22 is raised once and then put back to its original landing position/posture may be generated.

Further, based on an object reaction force moment trajectory parameter of the normal turning gait determined in the above S11, an object reaction force moment about a desired ZMP at each time i$\Delta$t (i=0, 1 ..., k−1) of a normal turning gait is determined, and the result is divided by mtotal to determine ZMPobj[i]. The determined ZMPobj[i] is used to calculate the right side of the above Expression 08c, thereby calculating Wobj.

The interval time $\Delta$t used in the calculation of Wzmptotal, Wfeet, and Wobj is preferably the same as the calculation processing cycle of the gait generator 100; however, it may be set to be longer than that to shorten the calculation processing time.

Then, from Wzmptotal, Wfeet, and Wobj determined as described above, the right side of the above Expression 12 is calculated so as to calculate the initial divergent component q[0] that satisfies the boundary condition of the normal turning gait.

The above has given the details of the processing in S13 in the present embodiment.

In the present embodiment, the initial divergent component q[0] has been analytically determined; alternatively, however, an initial divergent component of the normal turning gait that substantially agrees with a terminal divergent component of the normal turning gait observed from the supporting leg coordinate system of the gait that follows a normal turning gait following a current time gait may be determined by an exploratory method, as explained in, for example, the second embodiment in PCT international publication WO/02/40224A1.

Returning to the explanation of the flowchart of FIG. 5, after the processing in S13 is carried out as described above, the procedure proceeds to S15 wherein a gait parameter of a current time gait is provisionally determined. The gait parameter includes a foot trajectory parameter that defines the foot position/posture trajectory in the current time gait, a ZMP trajectory parameter that defines a desired ZMP trajectory, and an object reaction force trajectory parameter that defines a desired object reaction force moment trajectory.

The foot trajectory parameter of the gait parameter of the current time gait is composed primarily of the positions/postures of the supporting leg foot 22 and the free leg foot 22, respectively, at the start and the end of the current time gait and a gait cycle of the current time gait. In this case, the free leg foot position/posture at the start of the current time gait are the free leg foot position/posture of the current time gait at the end of the last time gait (the supporting leg foot position/posture of the last time gait) observed from the current time's gait supporting leg coordinate system. The supporting leg foot position/posture at the start of the current time gait are the supporting leg foot position/posture of the current time gait at the end of the last time gait (the free leg foot position/posture of the last time gait) observed from the current time's gait supporting leg coordinate system. The free leg foot position/posture at the end of the current time gait are determined on the basis of the predicted landing position/posture of the free leg foot 22 of the current time gait. Specifically, the free leg foot position/posture at the end of the current time gait are determined such that the position/posture obtained when the free leg foot 22 of the current time gait is rotated by a predetermined angle in the pitch direction without slippage from the free leg foot position/posture at the end of the current time gait while it is held in contact with a floor provide the predicted landing position/posture of the current time gait. The supporting leg foot position/posture at the end of the current time gait are the position/posture of the supporting leg foot 22 obtained when the supporting leg foot 22 is rotated in the pitch direction until substantially the entire bottom surface thereof is brought in contact with a floor without slippage while the supporting leg foot 22, whose position/posture have been matched with the current time's gait supporting leg coordinate system, is held in contact with the floor (the position/posture agree with the predicted landing position/posture of the free leg foot 22 of the last time gait).

In the present embodiment, the supporting leg foot 22 at the end of the current time gait has a posture that is substantially parallel to a floor surface; however, there is no need to always stick to this posture. For example, the heel of the supporting leg foot 22 may be off the floor surface at the end of a gait.

The ZMP trajectory parameter of the gait parameter of the current time gait is set to be the same as the ZMP trajectory parameter provisionally determined in S07. Hence, a desired ZMP trajectory defined by this ZMP trajectory parameter has a pattern as shown in, for example, FIG. 10(a) mentioned above.

Further, the object reaction force moment trajectory parameter of the gait parameter of the current time gait is determined such that the object reaction force moment trajectory defined thereby agrees with the trajectory associated with the current time gait of the object reaction force moment trajectory calculated in S09 mentioned above.

Subsequently, the procedure proceeds to S17 wherein the ZMP trajectory parameter of the gait parameter provisionally determined in S15 is corrected such that the current time gait converges to a normal turning gait. To be more specific, the ZMP trajectory parameter is corrected such that the terminal divergent component of the current time gait substantially agrees with the initial divergent component of the normal turning gait.

In the present embodiment, the provisional desired ZMP is corrected by adding the ZMP correction amount shown in FIG. 10(b) to the provisional desired ZMP so as to cause the terminal divergent component of the current time gait to agree with the initial divergent component of the normal turning gait. Thus, the desired ZMP as shown in FIG. 10(c) is obtained.

In this case, the basic guideline of the processing for correcting the provisional desired ZMP is the same as that in PCT international publication WO/02/40224A1, but it differs from the one in the application in that an object reaction force moment is taken into account. The following will specifically explain the processing in S17, focusing mainly on the different aspect. Among the variables and symbols used in this processing, regarding the variables having the meanings similar to those explained in relation to the processing for determining the initial divergent component of a normal gait (S13), the same variables and symbols previously defined in relation to a normal gait will be used in the explanation of the processing in S17. In the following explanation, for the convenience of understanding, a correction of a component of a ZMP in the X-axis direction will be explained.

In the present embodiment, the ZMP correction amount has a trapezoidal shape, as shown in FIG. 10(b), the height thereof being denoted by a. The time of the break points of the trapezoid is set to match the time of the break points of the provisional desired ZMP trajectory, as illustrated. In the present embodiment, the ZMP correction amount is generated in a one-leg supporting period of a current time gait. Further, a result obtained by coordinate-converting the initial divergent component determined in S13 described above into the value observed from the current time's gait supporting leg coordinate system is denoted by q". In other words, the initial divergent component of the normal turning gait observed in the current time's gait supporting leg coordinate system is denoted by q". Further, the terminal divergent component of the current time gait generated due to the provisional desired ZMP trajectory is denoted by Wzmptmp and the terminal divergent component of the current time gait generated due to the ZMP correction amount pattern when a=1 is denoted by Wtrim.

At this time, if the terminal divergent component generated according to the desired ZMP trajectory that has been corrected is denoted by Wzmptotal, then the following Expression 14 is approximately obtained.

$$Wzmptotal = Wzmptmp + a*Wtrim \qquad \text{Expression 14}$$

Accordingly, the terminal divergent component q" of the current time gait after the desired ZMP has been corrected is represented by the following Expression 15 similar to the aforesaid Expression 09 explained in relation to the normal gait.

$$q'' = \exp(\omega 0 k\Delta t)*q[0] + Wzmptmp + a*Wtrim + Wfeet + Wobj \qquad \text{Expression 15}$$

In Expression 15, kΔt denotes the time of the end of a current time gait, q[0] denotes the initial divergent component of the current time gait, Wfeet denotes the terminal divergent component generated by motions of both legs 2, 2 of the current time gait, and Wobj denotes a terminal divergent component generated according to the object reaction force moment trajectory of the current time gait.

From this Expression 15, the following Expression 16 for determining the height a of the trapezoid of the ZMP correction amount is obtained.

$$a = (q'' - \exp(\omega 0 k\Delta t)*q[0] - Wzmptmp - Wfeet - Wobj) / Wtrim \qquad \text{Expression 16}$$

Thus, in the present embodiment, the height a of the trapezoid of the ZMP correction amount is determined according to Expression 16. In this case, the initial divergent component q[0] is calculated according to the aforesaid Expression 06 from the position of the inverted pendulum (or the body position) at the start of the current time gait and the changing velocity thereof. Further, Wzmptmp is determined in the same manner as that for determining Wzmptotal related to a normal turning gait from the provisional desired ZMP trajectory defined by the ZMP trajectory parameter provisionally determined in S15. Wtrim is determined in the same manner as that for determining Wzmptotal related to a normal turning gait from the ZMP correction amount pattern determined by setting the height a of the trapezoid to 1. Wfeet is determined according to the aforesaid Expression 08b in the same manner as that for determining Wfeet related to a normal turning gait from the foot trajectory parameter provisionally determined in S15. Wobj is determined according to the aforesaid Expression 08c in the same manner as that for determining Wobj related to a normal turning gait from the object reaction force moment trajectory parameter provisionally determined in S15.

In S17, the ZMP correction amount determined on the basis of the height a of the trapezoid determined as described above is added to a provisional desired ZMP trajectory so as to correct the ZMP trajectory parameter.

In the present embodiment, the ZMP correction amount has been analytically determined; alternatively, however, it may be determined in an exploratory manner. In this case, processing is repeated in which a current time gait is provisionally created using a desired ZMP trajectory obtained by correcting a provisional desired ZMP by a ZMP correction amount in which the value of the trapezoid height a has been set to an appropriate value, and then based on, for example, the difference between the terminal divergent component of the provisionally created current time gait and the initial divergent component of a normal gait, the value of the trapezoid height a is corrected such that the difference is reduced. And, lastly, the ZMP correction amount may be determined on the basis of the value of the trapezoid height a obtained when the terminal divergent component of the provisionally created current time gait and the initial divergent component of a normal gait substantially agree with each other.

After the processing in S17, the procedure proceeds to S19 wherein it is determined whether the desired ZMP determined on the basis of the corrected ZMP trajectory parameter is appropriate. Specifically, if the corrected desired ZMP does not deviate from the ground contact plane of the supporting leg foot 22 of the current time gait or deflect toward the vicinity of a boundary of the ground contact plane, that is, if a stability allowance of the robot 1 can be secured, then it is determined that the desired ZMP is appropriate, and if not, then it is determined that the desired ZMP is inappropriate.

If the determination result of S19 is NO, then the procedure proceeds to S21 wherein an element related to a parameter other than the ZMP trajectory parameter of the current time gait parameter, e.g., a desired object reaction force trajectory related to an object reaction force moment trajectory parameter, is corrected. In this case, the desired object reaction force trajectory is corrected such that a ZMP correction amount is minimized as much as possible (smaller than at least the ZMP correction amount determined before the desired object reaction force trajectory is corrected) when the processing in S09 to S17 is carried out again after the correction.

An example of correcting a desired object reaction force trajectory will be explained below. For instance, it is assumed that a desired object motion trajectory (position trajectory) based on a moving plan is a trajectory in which the object 120 is decelerated in the X-axis direction from time t1 and stopped at time t3, as shown by a graph g2 of FIG. 15(*a*). A graph g3 of FIG. 15(*a*) is an example of a desired body position trajectory determined on the basis of the desired object motion trajectory. At this time, if deceleration or acceleration of the object 120 from time t1 is relatively large, then the ZMP correction amount related to the current time gait at certain current time t2 after the time t1 may become excessive in the positive direction of the X axis, leading to deviation from the ground contact plane of the supporting leg foot 22 (in this case, a determination result of S19 is NO). And, if a desired gait were continued to be generated as it is, then a desired gait in which the body 3 of the robot 1 bumps against the object 120 at certain time t4 would be undesirably generated, as illustrated in the figure.

Therefore, in such a case, the desired object reaction force trajectory is corrected such that the desired object reaction force is increased in the negative direction of the X axis during a certain period ΔT1 after the current time t2, as shown in FIG. 15(*b*), in relation to the desired object reaction force trajectory provisionally determined in S03, as described above. In other words, the desired object reaction force is corrected such that an acting force to be applied to the object 120 from the robot 1 (a force obtained by reversing the sign of the desired object reaction force) is increased in the positive direction of the X axis. In this case, the magnitude of the period ΔT1 during which the desired object reaction force is increased or an increment ΔF1 thereof is determined such that the ZMP correction amount determined by the processing in the aforesaid S09 to S17 on the basis of a corrected desired object reaction force is minimized as much as possible and a determination result of S19 is YES. Such ΔT1 or ΔF1 can be determined in an analytical manner or an exploratory manner.

By correcting the desired object reaction force trajectory as described above, the object reaction force moment trajectory parameter of the current time gait parameter is determined in S15 such that a motion of the body 3 that makes the robot 1 positively push the object 120 is effected. As a result, the desired gait generated on the basis of the current time gait parameter will be a gait that prevents the body 3 of the robot 1 from bumping against the object 120 while securing a stability allowance.

Supplementally, in S21, instead of correcting the desired object reaction force trajectory or in addition to a correction thereof, the predicted landing position/posture or the predicted landing time of the free leg foot 22 for a plurality of steps, including a current time gait and a next time gait, may be corrected within a range that satisfies the aforesaid between-object-robot position/posture requirement. In this case, after the processing in S21, the processing from S07 may be carried out.

After carrying out the processing in S21, the processing in S09 to S17 is executed again as mentioned above. At this time, the determination result in S19 following S17 will be YES, and in this case, the procedure will then proceed to S23 in FIG. 6.

In S23, determination processing for determining whether motions of the legs 2, 2 that satisfy a predetermined necessary requirement are possible or not is carried out. This determination processing corresponds to the determining means in the present invention.

Here, the aforesaid necessary requirement is constituted of, for example, a condition in which the predicted landing position/posture of the free leg foot 22 of a second step in the future (the predicted landing position/posture of the free leg foot 22 in the next time gait) satisfy the aforesaid betweenobject-and-robot position/posture requirement at the time at which the period of a half step has elapsed from the predicted landing time thereof, and a condition in which the predicted landing position of the free leg foot 22 of the robot 1 in each gait up to the second step lies within a predetermined permissible range with respect to the supporting leg foot 22. The latter condition corresponds to a restrictive condition in the present invention.

To supplement the explanation of the latter condition, a motion of the free leg foot 22 of the robot 1 is subject to restrictions, such as a leg 2 on the free leg side not interfering with a leg 2 on the supporting leg side, a displacement amount or a displacement velocity of each joint of each leg 2 not exceeding a predetermined permissible range, and the ZMP of the robot 1 while the free leg foot 22 is in motion not deviating from an area of a ground contact plane (in a supporting polygon) of the robot 1 within which a stability allowance of the robot 1 can be secured. And, taking these restrictions into account, the permissible range of the predicted landing position/posture of the free leg foot 22 (the permissible range relative to the supporting leg foot 22) in each unit gait is set in advance. This permissible range is an area having an approximately elliptical shape (an elliptical shape that is longer in a direction parallel to the x-axis of a supporting leg coordinate system. Hereinafter, this permissible range will be referred to as the free leg foot landing position/posture permissible range.

The following will specifically explain the determination processing in S23 by referring to, as appropriate, FIG. 16 and FIG. 17. The determination processing is carried out according to the following steps of a procedure (1) to (5).

(1): First, based on the predicted landing time of the free leg foot 22 of a current time gait (a first step), the predicted landing time of the free leg foot 22 of a next time gait (a second step), and a present desired object motion trajectory, the position/posture of the object 120 at the time when the time equivalent to a half step from the aforesaid predicted landing time (the time equivalent to half a gait cycle) has elapsed are determined. In this case, the predicted landing positions/postures of the free leg foot 22 of the current time gait and the next time gait have been determined, as explained in relation to the processing in S05 described above, so that the positions/postures of the object 120 to be determined satisfy the aforesaid between-object-and-robot position/posture requirement in the predicted landing positions/postures of the free leg foot 22 in the unit gaits up to the second step.

FIG. 16 illustrates the position/posture of the object 120 at the current time and the position/posture of the object 120 determined by the processing of (1) above. In this example, the path of an object motion trajectory is a path that turns clockwise as indicated by the dashed-line curve in the figure. In FIG. 16, points C0, C1, and C2 respectively denote the position of the object 120 (the position of a representative point of the object 120) at the current time, the position of the object 120 at time when the time equivalent to a half step has elapsed from the predicted landing time of the free leg foot 22 of the current time gait (the first step), and the position of the object 120 at time when the time equivalent to the half step has elapsed from the predicted landing time of the free leg foot 22 of the next time gait (the second step).

Incidentally, in the example shown in FIG. 16, the supporting leg foot 22 of the current time gait is the foot 22L of the left leg 2L, the free leg foot 22 of the first step is the foot 22R of the right leg 2R, and the free leg foot 22 of the second step is the foot 22L of the left leg 2L. In this case, the free leg foot 22R at the current time, which is indicated by the dashed-line rectangle in FIG. 16 is in the air.

(2): Subsequently, movement distances L01 and L12 as shown in FIG. 16 are calculated from an actual object position, which is the actual position (the position in the current time's gait supporting leg coordinate system) of the object 120 at the current time, and the position of the object 120 determined by the processing in (1) described above. The movement distance L01 is the length of a movement vector V01 from the actual object position (the position of point C0) at the current time to the position of the object 120 (the position of point C1) at time when the time equivalent to a half step has elapsed from the predicted landing time of the free leg foot 22 of the current time gait, and the movement distance L12 is the length of a movement vector V12 from the position of the object 120 (the position of point C1) at the time when the time equivalent to a half step has elapsed from the predicted landing time of the free leg foot 22 of the current time gait to the position (the position of point C2) of the object 120 at time when the time equivalent to a half step has elapsed from the predicted landing time of the free leg foot 22 of the next time gait. The actual object position is determined on the basis of a position of a hand 44 (the position of a portion in engagement between the robot 1 and the object 120) determined by geometric calculation of a detection value (or a desired value) of a displacement amount of each joint of the robot 1 at the current time. The movement distances L01 and L12 are used in the processing in S29, which will be discussed later, and they may alternatively be determined by the processing in S29.

Supplementally, the moving path of the object 120 indicated by the moving vectors V01 and V12 corresponds to a first predicted moving path in the present invention.

(3): Subsequently, the predicted landing position/posture of the free leg foot 22 of the current time gait (hereinafter referred to as the predicted current time free leg landing position/posture) and the predicted landing position/posture of the free leg foot 22 of the next time gait (hereinafter referred to as the predicted next time free leg landing position/posture) are respectively restricted by the aforesaid free leg foot landing position/posture permissible range of the free leg foot 22, thereby determining first restricted predicted free leg landing position/posture. The first restricted predicted free leg landing position/posture are determined as described below.

If the current provisionally determined values of the current time predicted free leg landing position/posture (the values at a start of the processing in S23) exist within the aforesaid free leg landing position/posture permissible range in the current time's gait supporting leg coordinate system, then the current provisionally determined values of the above current time predicted free leg landing position/posture are directly determined as the first restricted predicted free leg landing position/posture of the current time gait (hereinafter referred to as the current time first restricted predicted free leg landing position/posture). On the other hand, if the current provisionally determined values of the current time predicted free leg landing position/posture deviate from the free leg landing position/posture permissible range, then landing position/posture of the free leg foot 22 that will be closest to the current provisionally determined values of the current time predicted free leg landing position/posture in the permissible range are determined as the current time first restricted predicted free leg landing position/posture.

Further, if the current provisionally determined values of the next time predicted free leg landing position/posture (the values at the start of the processing in S23) exist within the aforesaid free leg landing position/posture permissible range in a next time's gait supporting leg coordinate system determined on the basis of the current time first restricted predicted free leg landing position/posture, then the current provisionally determined values of the above predicted next time free leg landing position/posture are directly determined as the first restricted predicted free leg landing position/posture of the next time gait (hereinafter referred to as the next time first restricted predicted landing position/posture). On the other hand, if the current provisionally determined values of the next time predicted free leg landing position/posture deviate from the free leg landing position/posture permissible range in a next time's gait supporting leg coordinate system defined on the basis of the current time first restricted predicted free leg landing position/posture, then the landing position/posture of the free leg foot 22 that will be closest to the current provisionally determined values of the next time predicted free leg landing position/posture in the permissible range are determined as the next time first restricted predicted free leg landing position/posture.

Supplementally, the current time first restricted predicted free leg landing position/posture and the next time predicted free leg landing position/posture correspond to the second provisional predicted landing position/posture in the present invention.

(4) Subsequently, it is determined whether the next time first restricted predicted free leg landing position/posture agree with the current provisionally determined values of the next time predicted free leg foot position/posture, or whether the next time first restricted predicted free leg landing position/posture satisfy the between-object-and-robot position/posture requirement with respect to the position/posture of the object 120 at the predicted landing time of the free leg foot 22 of the next time gait (in other words, whether the next time first restricted predicted free leg landing position/posture substantially agree with the current provisionally determined values of the next time predicted free leg foot position/posture).

(4a) If the determination result in the aforesaid (4) is negative, then a difference between the current provisionally determined values of the next time predicted free leg landing position/posture and the next time first restricted predicted free leg landing position/posture is added to the current time first restricted predicted free leg landing position/posture so as to correct the current time first restricted predicted free leg landing position/posture. Then, the current time first restricted predicted free leg landing position/posture after the correction are restricted again by the aforesaid free leg landing position/posture permissible range to determine the current time second restricted predicted free leg landing position/posture. More specifically, if the current time first restricted predicted free leg landing position/posture after the correction lie within the free leg landing position/posture permissible range in the current time's gait supporting leg coordinate system, then the current time first restricted predicted free leg landing position/posture after the correction are directly determined as the current time second restricted predicted free leg landing position/posture. Further, if the current time first restricted predicted free leg landing position/posture after the correction deviate from the free leg landing position/posture permissible range in the current time's gait supporting leg coordinate system, then the landing position/posture of the free leg foot 22 that will be closest to the aforesaid current time first restricted predicted free leg landing position/posture after the correction within the permissible range are determined as the current time second restricted predicted free leg landing position/posture.

(4b): If the determination result in (4) above is affirmative, then the current time first restricted predicted free leg landing position/posture determined by the processing in the above (3) are directly determined as the current time second restricted predicted free leg landing position/posture.

In the example shown in FIG. 16, the current time second restricted predicted free leg landing position/posture are determined, for example, as indicated by the hatched free leg foot 22R in FIG. 17. In this example, due to the restriction by the free leg landing position/posture permissible range, the current time second restricted predicted free leg landing position/posture take position/posture which have different current provisionally determined values from those of the current time predicted free leg landing position/posture.

(5): Subsequently, after the processing in (4a) or (4b) described above, it is determined whether the current values of the next time predicted free leg landing position/posture lie within the free leg landing position/posture permissible range in the next time's gait supporting leg coordinate system defined on the basis of the current time second restricted predicted landing position/posture, or whether it is possible to set the predicted landing position/posture of the free leg foot 22 of the next time gait (these agree or substantially agree with the current values of the next time predicted free leg landing position/posture) which can satisfy the free leg landing position/posture permissible range in the next time's gait supporting leg coordinate system determined on the basis of the current time second restricted predicted landing position/posture and also satisfy the between-object-and-robot position/posture requirement with respect to the position/posture of the object 120 at the predicted landing time of the free leg foot 22 of the next time gait.

(5a) If the determination result in (5) described above is affirmative, then it means that it is possible to determine the predicted landing positions/postures of the free leg foot 22 of the current time gait and the next time gait such that the aforesaid necessary requirement is satisfied. In this case, therefore, the result of the determination processing in S23 is YES, and the procedure proceeds to the processing in S25, which will be described later.

(5b): Meanwhile, if the determination result in (5) described above is negative, then it means that the predicted landing positions/postures of the free leg foot 22 of the current time gait and the next time gait that can satisfy the aforesaid necessary requirement cannot be determined in the current moving plan of the object 120. In this case, therefore, the result of the determination processing in S23 is NO, and the procedure proceeds to the processing in S29, which will be described later.

This ends the detailed explanation of the determination processing in S23.

Returning to the explanation of the flowchart in FIG. 6, in the processing carried out in S25 if the determination result in S23 is YES (if the determination result is affirmative), it is determined whether the aforesaid current time second restricted predicted free leg landing position/posture determined by the processing in the aforesaid (4a) or (4b) in the determination processing of S23 described above agree with the current values of the current time predicted free leg landing position/posture.

If the determination result is YES, then it means that the current provisionally determined values of the current time predicted free leg landing position/posture and the current provisionally determined values of the next time predicted free leg landing position/posture can satisfy the aforesaid necessary requirement. In this case, therefore, the procedure proceeds to the processing in S31, which will be discussed later.

If the determination result of S25 is NO, then the procedure proceeds to S27 wherein the predicted landing positions/postures of the free leg foot 22 of the current time gait and the next time gait are provisionally determined again. In this case, the current time second restricted predicted free leg landing position/posture determined by the processing in (4a) or (4b) described above in the determination processing in the aforesaid S23 are set as the new provisionally determined values of the predicted landing position/posture of the free leg foot 22 of the current time gait.

Further, the current provisionally determined values of the aforesaid next time predicted free leg landing position/posture are set afresh as the new provisionally determined values of the predicted landing position/posture of the free leg foot 22 of the next time gait. Alternatively, the predicted landing position/posture of the free leg foot 22 of the next time gait which satisfy the free leg landing position/posture permissible range in the next time's gait supporting leg coordinate system determined on the basis of the current time second restricted predicted free leg landing position/posture and also satisfy the aforesaid between-object-and-robot position/posture requirement with respect to the position/posture of the object 120 at time when the time equivalent to a half step has elapsed from the predicted landing time of the free leg foot 22 of the next time gait may be determined anew, and the determined predicted landing position/posture may be set as the new provisionally determined values of the predicted landing position/posture of the free leg foot 22 of the next time gait.

Then, after the processing in S27, the processing from S07 in FIG. 5 described above is carried out again.

Supplementally, the next time predicted free leg landing position/posture of the current time predicted free leg landing position/posture and the next time predicted free leg landing position/posture, which are provisionally determined in S27, satisfy the aforesaid between-object-and-robot position/posture requirement with respect to the position/posture (the position/posture based on the current moving plan) of the object 120 at the time when the time equivalent to a half step has elapsed from the predicted landing time of the free leg foot 22 of the next time gait. In contrast thereto, the current time predicted free leg landing position/posture provisionally determined in S27 usually do not satisfy the aforesaid between-object-and-robot position/posture requirement with respect to the position/posture (the position/posture based on the current moving plan) of the object 120 at the time when the time equivalent to a half step has elapsed from the predicted landing time of the free leg foot 22 of the current time gait. This is because, unlike the case where the predicted landing positions/postures of the first step and the second step are determined in the aforesaid S05, the current time predicted free leg landing position/posture and the next time predicted free leg landing position/posture are provisionally determined in S27 such that a larger first step is made for the predicted landing position/posture of the free leg foot 22 so as to provide a larger movement amount of the object 120 in the current time gait than that in a moving plan and that the object 120 will match the position/posture based on the moving plan by the end of the next time gait (the predicted landing time of the free leg foot 22 of the next time gait) from the current time.

Meanwhile, in the processing in S29 carried out if the determination result of S23 is NO (if the determination result is negative), the processing for correcting a moving plan is carried out. This processing is executed in the following steps of a procedure, (6) to (11).

(6): First, predicted landing position/posture which satisfy the free leg landing position/posture permissible range in a next time's gait supporting leg coordinate system determined on the basis of the aforesaid current time second restricted predicted free leg landing position/posture (refer to FIG. 17) determined by the processing in (4a) or (4b) described above in the determination processing in S23, and which are closest to the current provisionally determined values of the next time predicted free leg landing position/posture are determined as the next time second restricted predicted free leg landing position/posture.

In the example shown in FIG. 17, the next time second restricted predicted free leg landing position/posture are determined as indicated by, for example, the hatched free leg foot 22L in the figure. In this example, due to the restriction by the free leg landing position/posture permissible range, the next time second restricted predicted free leg landing position/posture are position/posture that take different current provisionally determined values from those of the next time predicted free leg landing position/posture.

Supplementally, the next time second restricted predicted free leg landing position/posture determined here and the aforesaid current time second restricted predicted free leg landing position/posture correspond to a third provisional predicted landing position/posture in the present invention.

(7): Subsequently, optimum position/posture of the object 120 are determined for the supporting leg foot 22 (22L in the example shown in FIG. 17) of the current time gait. The optimum position/posture mean the optimum position/posture of the object 120 at the time when the time equivalent to a half step has elapsed from the start of the current time gait, and they are determined such that the aforesaid between-object-and-robot position/posture requirement is satisfied with respect to the position/posture of the supporting leg foot 22 at the start of the current time gait (i.e., the landing position/posture of the free leg foot 22 of the last time gait).

In the example shown in FIG. 17, the position/posture of the object 120 indicated by the dashed-line positioned at point C0a are determined as the optimum position/posture at the time at which the time equivalent to a half step has elapsed from the start of the current time gait (hereinafter referred to as the optimum position/posture within a current time gait of the object 120).

Further, the position/posture of the object 120 which satisfy the aforesaid between-object-and-robot position/posture requirement with respect to the aforesaid current time second restricted predicted free leg landing position/posture are determined as the current time after-landing optimum position/posture, which are the optimum position/posture of the object 120 at the time when the time equivalent to a half step has elapsed from the predicted landing time of the free leg foot 22 of the current time gait (first step). Similarly, the position/posture of the object 120 which satisfy the aforesaid between-object-and-robot position/posture requirement with respect to the aforesaid next time second restricted predicted free leg landing position/posture are determined as the next time after-landing optimum position/posture, which are the optimum position/posture of the object 120 at the time when the time equivalent to a half step has elapsed from the predicted landing time of the free leg foot 22 of the next time gait (second step).

In the example shown in FIG. 17, the position/posture of the object 120 indicated by the dashed line positioned at point C1a are determined as the current time after-landing optimum position/posture, and the position/posture of the object 120 indicated by the dashed line positioned at point C2a are determined as the next time after-landing optimum position/posture.

(8): Subsequently, based on the optimum position/posture in the current time gait, the current time after-landing optimum position/posture, and the next time after-landing optimum position/posture of the object 120 determined as described above, movement distances W01 and W12 (refer to FIG. 17) of the object 120 in a case where the predicted landing positions/postures of the free leg foot 22 of the current time gait and the next time gait are set to the aforesaid current time second restricted predicted free leg landing position/posture and the aforesaid next time second restricted predicted free leg landing position/posture, respectively, are calculated. As shown in FIG. 17, the movement distance W01 denotes the length of a movement vector V01$a$ from a position (the position of point C0$a$) in the optimum position/posture in the current time gait of the object 120 to a position (the position of point C1$a$) in the current time after-landing optimum position/posture, and the movement distance W12 denotes the length of a movement vector V12$a$ from a position (the position of point C1$a$) in the current time after-landing optimum position/posture of the object 120 to a position (the position of point C2$a$) in the next time after-landing optimum position/posture.

Supplementally, the moving path of the object 120 indicated by the movement vectors V01$a$ and V12$a$ corresponds to a first predicted moving path in the present invention. Further, the moving path of the object 120 indicated by the movement vectors V01 and V12 determined by the processing in the aforesaid (2) corresponds to a second predicted moving path in the present invention.

(9): Subsequently, based on the movement distance W01 determined as described above, the movement vector V01$a$, and the movement vector V01 determined by the processing in (2) in the determination processing in the aforesaid S23, a length W01$s$ of a vector obtained by projecting the movement vector V01$a$ in the direction of the movement vector V01 (a projection component of the movement distance W01 in the direction of the movement vector V01) is determined (refer to FIG. 18). More specifically, W01 is multiplied by the cosine value of an angle formed by the movement vector V01$a$ and the movement vector V01 to determine W01$s$. Similarly, based on the movement distance W12, the movement vector V12$a$, and the movement vector V12 determined by the processing in (2) in the determination processing in the aforesaid S23, a length W12$s$ of a vector obtained by projecting the movement vector V12$a$ in the direction of the movement vector V12 (a projection component of the movement distance W12 in the direction of the movement vector V12) is determined (refer to FIG. 18). More specifically, W12 is multiplied by the cosine value of an angle formed by the movement vector V12$a$ and the movement vector V12 to determine W12$s$.

Here, the current time second restricted predicted free leg landing position/posture and the next time second restricted predicted free leg landing position/posture determined as described above are determined such that the object 120 approaches a path of an object motion trajectory (the path indicated by the dashed line in FIG. 18) based on a current moving plan at least at the next time gait (the second step), so that if the path is a path causing the object 120 to turn (more generally, a path that changes the direction of a velocity vector of the object 120 as time passes), then generally, the directions of the movement vectors V01$a$ and V01 of the first step (the current time gait) are different from each other and the directions of the movement vectors V12$a$ and V12 of the second step (the next time gait) are different from each other. Further, if the predicted landing positions/postures of the free leg foot 22 of the current time gait and the next time gait of the robot 1 are determined to be the current time second restricted predicted free leg landing position/posture and the next time second restricted predicted free leg landing position/posture, respectively, to actually move the object 120, then the actual moving path of the object 120 tends to deflect toward the path of the object motion trajectory based on the current moving plan (the path indicated by the dashed line in FIG. 18) from an ideal position of the object 120 (the path passing points C1$a$ and C2$a$ in FIG. 18) for the aforesaid predicted landing positions/postures.

Hence, according to the present embodiment, the movement distances W01$s$ and W12$s$ are determined as described above thereby to estimate the effective movement distance of the object 120 from the time associated with the aforesaid optimum position/posture in the current time gait (the time at which the time equivalent to a half step has elapsed from the start of the current time gait) to the time associated with the aforesaid current time after-landing optimum position/posture (the time at which the time equivalent to a half step has elapsed from the start of the next time gait) and the effective movement distance of the object 120 from the time associated with the aforesaid current time after-landing optimum position/posture to the time associated with the next time after-landing optimum position/posture (the time at which the time equivalent to a half step has elapsed from the start of the next but one time gait) in a case where the predicted landing positions/postures of the free leg foot 22 of the current time gait and the next time gait of the robot 1 are determined to be the current time second restricted predicted free leg landing position/posture and the next time second restricted predicted free leg landing position/posture, respectively. In other words, the movement distances W01$s$ and W12$s$ determined as described above respectively mean the estimated values of the effective movement distances.

If a moving path based on the current moving plan of the object 120 is linear, then the directions of the movement vectors V01$a$, V01 and the directions of the movement vectors V12$a$, V12 substantially agree with each other. In this case, the movement distances W01$s$ and W12$s$ substantially agree with W01 and W02, respectively, so that the processing in the aforesaid (9) may be omitted. In this case, W01$s$=W01 and W02$s$=W02.

Supplementally, the period from the time associated with the aforesaid optimum position/posture in the current time gait to the time associated with the aforesaid next time after-landing optimum position/posture corresponds to a first predetermined period in the present invention.

(10): Subsequently, a ratio (=(W01$s$+W12$s$)/(L01+L12)) between the total sum of the movement distances W01$s$ and W12$s$ (=W01$s$+W12$s$) determined by the processing in (9) as described above and the total sum of the movement distances L01 and L12 (=L01+L12) determined by the processing in (2) in the processing of the aforesaid S23 is multiplied by a correction coefficient Kt determined according to the following expression 100 so as to determine a velocity command correction parameter Vel for correcting a desired moving velocity (a velocity command value) of the object 120 in the moving plan. In other words, V1 is determined according to expression 101.

$$Kt=(Trest+Tm+0.5*Tm)/(2*Tm) \quad \text{Expression 100}$$

$$Vel=Kt*(W01s+W12s)/(L01+L12) \quad \text{Expression 101}$$

where Trest in Expression 100 denotes remaining time from the current time to the end time of a current time gait, and Tm denotes the cycle of a unit gait. The correction coefficient Kt has an upper limit value thereof set to 1, and if a calculation result of the right side of Expression 100 exceeds 1, then Kt=1. Accordingly, Vel denotes a non-negative value of 1 or less.

Here, the denominator of Expression 100 means the time required to move the object 120 along a moving path of the object 120 based on the current moving plan for the time of a period from the time associated with the aforesaid optimum position/posture in the current time gait to the time of a period up to the time associated with the next time after-landing optimum position/posture (this being the time that is twice the gait cycle Tm), that is, by the movement distance of (W01$s$+ W12$s$). The numerator of Expression 100 means the time required to move the object 120 from the current position (the position of point C0) shown in FIG. 16 to FIG. 18 to the position of point C2, that is, the time required to move the object 120 along a future moving path of the object 120 based on the current moving plan by the movement distance of (L01+L12). In this case, the time required to move the object 120 from point C0 to point C1 shown in FIG. 17 is denoted by Trest+0.5*Tm, and the time required to move the object 120 from point C1 to point C2 is denoted by Tm. Supplementally, the period from the current time to the time associated with point C2 (the time at which the time equivalent to a half step from the start of a next but one time gait has elapsed) corresponds to a second predetermined period in the present invention.

Thus, the velocity command correction parameter Vel determined according to Expression 101 means a ratio between an average moving velocity of the object 120 when the object 120 is moved by the movement distance of (W01$s$+ W12$s$) and an average moving velocity of the object 120 when the object 120 is moved by the movement distance of (L01+L12). In other words, the ratio between an ideal average moving velocity of the object 120 to satisfy the aforesaid between-object-and-robot position/posture requirement and the aforesaid free leg foot landing position/posture permissible range and the average moving velocity of the object 120 based on the current moving plan is the velocity command correction parameter Vel.

(11) Therefore, according to the present embodiment, subsequently, a desired moving velocity of the object 120 based on the current moving plan (the time series of desired moving velocity in a period of a plurality of steps of the robot 1 from the current time) is multiplied by the velocity command correction parameter Vel determined by the processing in (10) as described above, thereby correcting the moving plan. In other words, the moving plan is corrected such that the desired moving velocity of the object 120 (the time series of desired moving velocity in the period of a plurality of steps of the robot 1 from the current time) based on the corrected moving plan takes the value obtained by multiplying the desired moving velocity based on the moving plan before the correction by Vel.

This ends the detailed explanation of the processing in S29.

Returning to the explanation of the flowcharts of FIG. 5 and FIG. 6, after the processing in S29, the processing from S03 in FIG. 5 is carried out again.

Further, if the processing explained above finally causes the determination result of the determination processing in S25 of FIG. 6 to be YES, then the processing from S31 in FIG. 7 is carried out.

Before carrying out the processing from S31, a desired body position/posture trajectory from the current time to the end of the aforesaid second turning gait may be tentatively created on the basis of a currently determined current time gait parameter and a normal gait parameter, and a desired hand position/posture trajectory may be tentatively determined on the basis of a current desired object motion trajectory, and then based thereon, it may be checked for the occurrence of, for example, full stretching of the arms 4 or for interference between the body 3 and the object 120. And, if the checking reveals the occurrence of the full stretching of the arms 4, the interference between the body 3 and the object 120, or the like, then the predicted landing positions/postures of the current time gait or the next time gait or the desired object motion trajectory, or the moving plan of the object 120 may further be corrected.

In the processing in S31 of FIG. 7, a current time gait instantaneous value at the current time, except hand position/posture instantaneous values is calculated on the basis of the current time gait parameter (the current time gait parameter finally determined by the processing from S01 to S29) such that a desired ZMP is satisfied.

The calculation processing is performed as described below. Based on a foot trajectory parameter of the current time gait parameter, the instantaneous values of desired foot position/posture are calculated. In the same manner as in the case explained in relation to the processing for calculating ZMPfeet[i] in the processing in S13 described above, this calculation processing is performed on each foot 22 by using the finite-duration setting filter proposed by the present applicant in U.S. Pat. No. 3,233,450. As in the case explained regarding a normal gait, if the predicted landing position/posture of the free leg foot 22 of the current time gait are the same as the landing position/posture of the supporting leg foot 22 of the last time gait, then the instantaneous values of the desired foot position/posture of the current time gait are maintained in an initial state of the current time gait. Alternatively, however, the instantaneous values of the foot position/posture trajectory of the free leg foot 22 of the current time gait may be generated such that the free leg foot 22 of the current time gait is raised once and then put back to its original landing position/posture.

Further, an instantaneous value of the desired ZMP is calculated on the basis of a ZMP trajectory parameter of the current time gait parameter, and an instantaneous value of a desired object reaction force moment is calculated on the basis of an object reaction force moment trajectory parameter.

Further, the instantaneous values of the desired body position/posture are calculated by the dynamic calculation in FIG. 14 described above from the instantaneous values of the desired foot position/posture, the instantaneous value of the desired ZMP, and the instantaneous value of the desired object reaction force moment calculated as described above. In the present embodiment, the desired body posture is, for example, a vertical posture. However, it is not required to maintain the desired body posture at the vertical posture, and the desired body posture may alternatively be changed. If the desired body posture is changed, the robot simplified model is desirably a dynamic model that takes into account an angular momentum change of the robot 1 involved in the change of the posture of the body 3. For example, a dynamic model proposed by the applicant of the present application in PCT international publication WO/03/057422A1, as shown in FIG. 10 of the publication, may be used.

By the processing in S31 described above, the instantaneous values of the desired foot position/posture and the desired body position/posture of a motion of the desired gait of the robot 1 are determined. In the robot 1 in the present embodiment, each leg 2 has six degrees of freedom, so that once the desired body position/posture and the desired foot position/posture are determined, the rotational angle of each joint of each leg 2 is uniquely determined. Supplementally, in the present embodiment, the desired body position/posture determined in S31 are further corrected by the processing in S39, which will be discussed later.

Subsequently, the procedure proceeds to S33 wherein an actual object position, which is an actual position (moving position) of the object 120 at the previous calculation processing cycle (the calculation processing cycle of the gait generator 100), is estimated on the basis of a last time value of a final corrected desired hand position (a value at the last time calculation processing cycle). Here, the final corrected desired hand position is determined by an arm main controller 106, which will be discussed later, and it corresponds to a command value of an actual hand position of the robot 1. Thus, for example, the last time value of the final corrected desired hand position is defined as the last time value of an actual hand position of the robot 1, and a position that has a predetermined relative positional relationship therewith is estimated as the actual object position. It is also possible to provide the object 120 with a gyro sensor or an acceleration sensor, and to estimate an actual object position from detection values thereof.

Subsequently, the procedure proceeds to S35 wherein an instantaneous value (current time value) of a desired object motion, an instantaneous value (current time value) of an estimated disturbance force, and an instantaneous value (current time value) of a desired object reaction force are calculated using an object dynamic model on the basis of a difference between the actual object position estimated as described above and the desired object position (hereinafter referred to as the object position difference) and the current desired object motion trajectory. The desired object position out of the actual object position and the desired object position that define the object position difference uses the value determined at the last time calculation processing cycle (the last time value).

Here, the object dynamic model used in the processing in S35 and the processing in S35 will be explained with reference to the block diagram of FIG. 19. FIG. 19 is a block diagram showing the calculation processing for determining a desired object position, a desired object reaction force, and an estimated disturbance force of a desired object motion in S03. The part indicated by a reference numeral 238 in the figure is an object dynamic model showing a relationship between forces acting on the object 120 and motions of the object 120. This object dynamic model partly differs in structure from that shown in FIG. 9 mentioned above, so that the object dynamic model in FIG. 19 will be referred to as an object dynamic model 2 in the following explanation to distinguish it from the object dynamic model shown in FIG. 9.

The basic structure of the object dynamic model 2 is the same as that of the object dynamic model in FIG. 9. A force acting on the object 120 (more specifically, a translational force in the horizontal direction) is taken as an input, and the input value (the value determined by a multiplier 242, which will be discussed later) is multiplied by an inverse number 1/M of a mass M of the object 120 by a multiplier 244 so as to determine a motional acceleration of the object 120, and then the determined motional acceleration is sequentially integrated (double-integrated) by integrators 246 and 250. However, the object dynamic model 2 differs from the object dynamic model in FIG. 9 in that the integrator 250 additionally receives a model velocity manipulated variable in addition to an output (an integral value of motional acceleration) of the integrator 246. This model velocity manipulated variable is a velocity manipulated variable determined by a model velocity manipulated variable determiner 252 and by a feedback control law such that a difference between an actual object position and a desired object position is approximated to zero, and it is determined according to the following expression 17 in the present embodiment.

Model velocity manipulated variable=$Ke1$*object position error+$\int (Ke2$*object position error)$dt$    Expression 17

In other words, the model velocity manipulated variable is determined from an object position error by a PI control law (a proportional integral control law). Incidentally, Ke1 and Ke2 of Expression 17 denote predetermined gains. A model velocity manipulated variable determiner 252 in FIG. 19 is a calculation processor that performs the calculation of the right side of Expression 17. More specifically, based on an actual object position (the current time value determined in S33 at the current calculation processing cycle) and a desired object position (a last time value determined in S35 at the last calculation processing cycle), the model velocity manipulated variable determiner 252 determines an object position error, which is the difference therebetween, by a subtracter 254. Then, a result obtained by multiplying the determined object position error by the gain Ke1 by a multiplier 256 (a proportional) and a result obtained by further integrating by an integrator 260 the result obtained by multiplying the object position error by the gain Ke2 by a multiplier 258 (an integral term) are added by an adder 262 to calculate a model velocity manipulated variable. The calculated model velocity manipulated variable is added to an output of the integrator 246 by an adder 248 provided at the input side of the integrator 250 of the object dynamic model 2, and then the result is supplied to the integrator 250. Supplementally, in the block diagram of FIG. 19, the model velocity manipulated variable is calculated and then the calculation result is additionally supplied to the object dynamic model 2; alternatively, however, the integrator 260 of the model velocity manipulated variable determiner 252 may be omitted and an output of the multiplier 258 may be additionally input to the integrator 246 and the sum of an output of the integrator 246 at this time and an output of the multiplier 256 may be input to the integrator 250 at the same time. This will also cause an output of the object dynamic model 2 (output of the integrator 250) to be the same as that in FIG. 19.

In the object dynamic model 2 described above, a result obtained by integrating an output of the adder 248 by the integrator 250 is obtained as an instantaneous value of a desired object position. Further, an output of the adder 248 is an object model velocity, which is a moving velocity of the object 120 on the object dynamic model 2.

A required value of a force (translational force) acting on the object 120, which is an input to the object dynamic model 2, is obtained by multiplying a difference (desired object velocity−object model velocity), which is determined by a subtracter 240 from a desired object velocity based on a current desired object motion trajectory (a desired object motion trajectory when a determination result of S27 is YES) and an object model velocity, by a predetermined gain Kv by the multiplier 242. In other words, the required value of a translational force input to the object dynamic model 2 is determined by a feedback control law (the proportional control law in this example) such that a difference between an object desired velocity and an object model velocity converges to zero, as that shown in FIG. 9. However, the object model velocity in this case is an output of the adder 248, as described above, so that it is different from that shown in FIG. 9 in that a model velocity manipulated variable has been taken into account. Further, a desired object velocity is obtained as a first-order differential value of a position trajectory of a current desired object motion trajectory.

And, a value obtained by reversing the sign of the required value of the translational force determined as described above is determined as an instantaneous value of a desired object reaction force. Further, the required value of the translational force is input to the multiplier 244 of the object dynamic model 2, and the model velocity manipulated variable is input to the adder 248, thereby outputting an instantaneous value of a desired object position from the integrator 250 of the object dynamic model 2. In other words, the object model velocity as a motion state amount of the object 120 on the object dynamic model 2 is corrected using a model velocity manipulated variable for bringing the difference between the desired object position and an actual object position close to zero, thereby sequentially determining desired object positions by the dynamic calculation of the object dynamic model 2.

Further, the part indicated by a reference numeral 264 in FIG. 19 is an estimated disturbance force determiner that carries out the processing for determining an estimated disturbance force. An object model velocity and the required value of the translational force are input to the estimated disturbance force determiner 264. The object model velocity is input to a converter 266 expressed by a transfer function in the form of $M \cdot s/(Tc \cdot s+1)$, and an estimated value of a translational force acting on the object 120 is calculated by the converter 266. The M in the transfer function of the converter 266 denotes the mass of the object 120 and Tc denotes a predetermined time constant. Hence, the converter 266 determines, as an estimated value of a translational force acting on the object 120, the value obtained by carrying out filtering processing that has the time constant Tc on the result obtained by multiplying a differential value (first-order differential value) of an object model velocity by the mass of the object 120 (this corresponds to the instantaneous value of the resultant force of all forces acting on the object 120). Further, an instantaneous value of an estimated disturbance force is calculated by subtracting the required value of a translational force, which is an output of the multiplier 242, from the estimated value of the translational force by the subtracter 268. The instantaneous value of the estimated disturbance force thus determined is used in the calculation processing in S02 (refer to FIG. 9), as described above.

Incidentally, an instantaneous value of a desired object posture of a desired object motion is determined such that, for example, it substantially agrees with the direction of a desired object velocity.

This ends the explanation of the calculation processing in S35. The estimated disturbance force determined by the calculation processing in this S35 is the actual disturbance force of a force acting on the actual object 120 that is estimated in real time, the actual disturbance force being applied from a source other than the robot 1. Hence, using the estimated disturbance force in the calculation processing in S02 described above (inputting the estimated disturbance force to the object dynamic model in FIG. 9) makes it possible to bring a behavior (motional state) of the object 120 on the aforesaid object dynamic model in FIG. 9 close to a behavior (motional state) of the actual object 120.

Subsequently, the procedure proceeds to S37 wherein the instantaneous values (the current time values) of desired hand position/posture are determined on the basis of the instantaneous value of the desired object motion determined in S35. The instantaneous values of the desired hand position/posture are determined in the same manner as that for determining the desired hand position/posture trajectory in S09.

Of the instantaneous values of the desired gait determined by the processing up to S37 described above, the desired body position/posture are determined using the aforesaid robot simplified model such that a desired ZMP is satisfied on the robot simplified model (such that the horizontal component of a moment generated about a desired ZMP by a resultant force of an inertial force attributable to a motion of the robot 1, the gravity, and an object reaction force moment is zero). Hence, the desired gait determined by the processing up to S37 is a gait in which a floor reaction force moment horizontal component about a desired ZMP is zero on the robot simplified model.

Here, the robot simplified model does not necessarily exhibit high dynamic accuracy although it is highly advantageous in that the calculation load of the gait generator 100 can be effectively reduced. For this reason, in the present embodiment, some constituent elements of a desired gait (specifically, the instantaneous values of desired body position/posture and the instantaneous value of a floor reaction force moment about a desired ZMP) are corrected by further using a robot dynamic model having higher dynamic accuracy (hereinafter referred to as "the full model"). This correction processing is called the full model correction, and this full model correction is performed in S39 that follows the processing in S37.

The full model correction is performed in exactly the same manner as that explained in, for example, Japanese Laid-Open Patent Application Publication No. 2002-326173 previously proposed by the applicant of the present application. Therefore, the explanation thereof will be omitted in the present description. The full model correction may alternatively be accomplished in the same manner as that explained in, for example, PCT international publication WO 03/057427 A1 by the applicant of the present application.

The desired body position/posture and the floor reaction force moment about the desired ZMP are corrected by the full model correction in S39. Thus, the instantaneous values of all constituent elements of the desired gait finally output by the gait generator 100 are obtained. Incidentally, the full model correction may be omitted.

The processing in S01 to S39 explained above is the processing carried out for each calculation processing cycle of the gait generator 100.

The processing for correcting a moving plan in S01, the explanation of which has been postponed, will now be explained below.

When the robot 1 is traveling while pushing the object 120, if a step (a convex portion on a floor) not expected in a current moving plan (e.g., a moving plan as per the aforesaid traveling request) is encountered or if an unexpected external force acts on the object 120 from something other than the robot 1, then a deviation of a real object motion trajectory (hereinafter referred to as the actual object motion trajectory) from a desired object motion trajectory based on a moving plan increases. Meanwhile, the gait generator 100 determines a gait parameter or the like on the basis of a desired object motion trajectory to generate a gait, so that if the deviation of an actual object motion trajectory from a desired object motion trajectory becomes excessive, then it is difficult to generate a gait that allows continual stability of the robot 1 to be secured. Hence, in S01 in the present embodiment, if the deviation increases to a certain degree (or if it is expected to increase), then the moving plan determined in S01 is corrected in real time.

The following will explain a specific example of the processing with reference to FIGS. 20(*a*) and (*b*). For instance, it is assumed that a current moving plan (before corrected) is a plan for moving the object 120 at a constant velocity in the positive direction of the X axis. At this time, a desired object position trajectory of a desired object motion trajectory (a time series of instantaneous values) calculated in S35 as described above on the basis of the moving plan before a correction (hereinafter referred to as the before-correction moving plan) will be approximately the trajectory as shown by a graph g6 in FIG. 20(a). Here, it is assumed that, at time t1, the actual object 120 is caught by a step (a convex portion) of a floor, which is not expected in the before-correction moving plan, thus causing the object 120 to stop. At this time, the trajectory of the actual object position (the time series of the actual object positions estimated in S33) will be a trajectory as shown by a graph g7 in FIG. 20(a). In this case, after time t1, the difference between the desired object position based on the before-correction moving plan and the actual object position will increase as time elapses.

Hence, in S01, the object position error (a difference between an actual object position and a desired object position) determined in S35 at, for example, a last calculation processing cycle, that is, the object position error determined by the subtracter 254 in FIG. 19, is compared with a predetermined value. Then, when the object position error increases to be larger than the predetermined value (time t2 in FIG. 20(a)), the before-correction moving plan is corrected so as to restrain the increase in the object position error, as indicated by a graph g8 in FIG. 20(a). The corrected moving plan will be hereinafter referred to as the after-correction moving plan. In the example shown in FIG. 20(a), the after-correction moving plan will be a moving plan in which the moving velocity of the object 120 is gradually decelerated after time t2 until the moving velocity reaches substantially zero. The after-correction moving plan is desirably determined such that a desired object motion defined thereby will smoothly continue without causing a sudden change relative to the before-correction moving plan.

Thus, correcting a moving plan as described above makes it possible to generate a gait that allows continual stability of the robot 1 to be secured without causing a desired object reaction force to become excessive.

Further, in the processing in S01 in the present embodiment, a moving plan is corrected so as to bring an after-correction moving plan close to a before-correction moving plan when an actual object position follows better a desired object position trajectory based on the after-correction moving plan after the moving plan has been corrected as described above, causing the difference between a desired object motion trajectory and an actual object motion trajectory to be reduced to a certain degree. The moving plan after the correction will be hereinafter referred to as an after-recorrection moving plan.

The following will explain by taking, as an example, a case where the after-correction moving plan has been determined as shown in FIG. 20(a). When the object 120 rides over a step (time t3 in FIG. 20(b)), the actual object position trajectory will approximate the desired object position trajectory g8 based on the after-correction moving plan, as indicated by the graph g7 in FIG. 20(b).

At this time, in S01, when the object position error reduces to be smaller than the predetermined value (time t4 in FIG. 20(b)), the after-correction moving plan is re-corrected such that the moving velocity of the object 120 approximates the moving velocity of the object 120 based on the original before-correction moving plan, as indicated by a graph g9 in FIG. 20(b), thus determining an after-recorrection moving plan. In the example of FIG. 20(b), the after-recorrection moving plan will be a moving plan in which the moving velocity of the object 120 is gradually increased after time t4 until the moving velocity of the object 120 substantially agrees with the moving velocity based on the original before-correction moving plan. The after-recorrection moving plan is desirably determined such that the desired object motion defined thereby smoothly continues without causing a sudden change relative to the after-correction moving plan.

In the example described above, the moving velocity of the object 120 based on the after-recorrection moving plan has been approximated to the moving velocity based on the before-correction moving plan; it is also possible, however, to bring the desired object position trajectory based on the after-recorrection moving plan close to the object position trajectory based on the before-correction moving plan.

Supplementally, a situation wherein the difference between an actual object motion trajectory and a desired object motion trajectory based on a moving plan increases occurs in a case where, of the forces that act on the actual object 120, a disturbance force other than a force applied from the robot 1 shows a relatively large change. Hence, instead of correcting a moving plan according to an object position error as described above, the moving plan may be corrected according to, for example, a change in the estimated disturbance force.

This ends the detailed explanation of the processing by the gait generator 100 in the present embodiment.

The following will explain processing other than that carried out by the gait generator 100 of the control unit 60. This processing is the same as that proposed in the first embodiment in Japanese Laid-Open Patent Application Publication H10-230485, as previously mentioned, so that only a schematic explanation thereof will be given.

A desired body position/posture trajectory, a desired ZMP trajectory, and a desired object reaction force trajectory of a desired gait generated by the gait generator 100 are input to an object reaction force balance controller 102. The object reaction force balance controller 102 calculates a compensating total floor reaction force for object reaction force balance control to correct a desired floor reaction force moment about a desired ZMP so as to cancel (bring close to zero) the difference between a desired object reaction force and an actual object reaction force, which is the reaction force received by the actual robot 1 from the object 120, and also determines corrected desired body position/posture obtained by correcting the desired body position/posture of a desired motion. The processing by the object reaction force balance controller 102 will be discussed later.

Further, a desired foot position/posture trajectory, a desired ZMP trajectory, and a desired total floor reaction force trajectory of a desired gait are supplied to the leg main controller 104. The leg main controller 104 further receives corrected desired body position/posture and a compensating total floor reaction force for object reaction force balance control from the object reaction force balance controller 102. The leg main controller 104 controls the joint actuators (electric motors) of the legs 2, 2 by compliance control processing such that a motion (excluding motions of the arms 5, 5) and a floor reaction force of a desired gait are followed. More specifically, in order to restore a detection value (actual body posture) of the posture sensor 54 to a corrected desired body posture, a restoring total floor reaction force to be generated at a desired ZMP is calculated, and desired foot position/posture are corrected such that an actual total floor reaction force moment component (this being determined from a detection value of the six-axis force sensor 50 of each of legs 2, 2) acting on the desired ZMP agrees with a moment component of a resultant force of the restoring total floor reaction force, the desired total floor reaction force, and the compensating total floor reaction force for object reaction force balance control. The desired foot position/posture that have been corrected are referred to as the corrected desired foot position/posture. Then, the leg main controller 104 controls the joint actuators of both legs 2, 2 (outputs a motor drive command of each leg 2 to each joint actuator) such that actual joint displacements follow the desired joint displacements of both legs 2, 2 determined from the corrected desired foot position/posture and the corrected desired body position/posture.

Further, a desired hand position/posture trajectory and a desired object reaction force trajectory of a desired gait are input to the arm main controller 106. The arm main controller 106 further receives corrected desired body position/posture from the object reaction force balance controller 102. The arm main controller 106 controls the joint actuators (electric motors) of the arms 5, 5 by the compliance control processing so as to follow the desired hand position/posture trajectory and the desired object reaction force trajectory. More specifically, the desired hand position/posture are corrected on the basis of a difference between a detection value of the six-axis force sensor 52 (actual object reaction force) and a desired object reaction force. The desired hand position/posture that have been corrected are referred to as the final corrected desired hand position/posture. Then, the arm main controller 106 controls the joint actuators of both arms 5, 5 (outputs a motor drive command for each arm 5 to each joint actuator) such that actual joint displacements follow the desired joint displacements of both arms 5, 5 determined from the final corrected desired hand position/posture and the corrected desired body position/posture.

The processing by the object reaction force balance controller 102 will be explained below more specifically. FIG. 21 is a block diagram functionally showing the processing by the object reaction force balance controller 102.

In the object reaction force balance controller 102, an object reaction force moment error, which is a difference between a desired object reaction force moment about a desired ZMP attributable to a desired object reaction force and an actual object reaction force moment about a desired ZMP attributable to an actual object reaction force, is first calculated by a moment error calculator 270. In this case, the desired object reaction force moment is calculated from a desired object reaction force and a desired ZMP output from the gait generator 100 and a final corrected desired hand position/posture (more specifically, the values at the last time control processing cycle) determined by the arm main controller 106. Further, the actual object reaction force moment is calculated from a detection value of the six-axis force sensor 52 (actual object reaction force), a desired ZMP, and final corrected desired hand position/posture (more specifically, the values at the last time control processing cycle).

Based on the above object reaction force moment error, a desired center-of-gravity position perturbation amount, which is a desired perturbation amount of a total center-of-gravity position of the robot 1, is calculated by a center-of-gravity position perturbation amount calculator 272. The desired center-of-gravity position perturbation amount has a meaning as a perturbation amount of the total center of gravity of the robot 1 to cancel, in the long term, an object reaction force moment error by the gravity acting on the robot 1, and it is determined to be, for example, a value that is proportional to an object reaction force moment. Subsequently, a difference between a total center-of-gravity position model perturbation amount, which is a perturbation amount of the total center of gravity of the robot 1 on the perturbation dynamic model, which is calculated using the perturbation dynamic model to be discussed later, and the aforesaid desired center-of-gravity position perturbation amount is calculated by the subtracter 274. Based on this difference, a compensating total floor reaction force moment for object reaction force balance control, which is a moment manipulated variable about a desired ZMP, for converting the difference to zero is calculated by a feedback control law 276, e.g., a PD control law. Further, the sum of compensating total floor reaction force moment for object reaction force balance control and the aforesaid object reaction force moment error is calculated by an adder 278. Then, an output of the adder 278 is input to a perturbation dynamic model 280 that indicates a relationship between a perturbation of the total center of gravity of the robot 1 and a perturbation of a moment about a desired ZMP and a relationship between the perturbation of the total center of gravity and the perturbation of body position/posture, and this perturbation dynamic model calculates a body position/posture perturbation amount.

In this case, the perturbation dynamic model is a model that describes the relationship (dynamic relationship) between a perturbation of the total center of gravity of the robot 1 and a perturbation of a moment about a desired ZMP according to the following expression 18.

$$m\text{total}*hG*d2\Delta xG/dt2 = \Delta xG*m\text{total}*g + \Delta Mx \quad \text{Expression 18}$$

where hG denotes the height from a desired ZMP to the total center of gravity; $\Delta xG$ denotes a horizontal perturbation amount of the total center of gravity; and $\Delta Mx$ denotes a moment horizontal component about the desired ZMP. Other variables are the same as those defined in relation to the aforesaid robot simplified model. Expression 18 is an expression on a sagittal plane, and a relational expression on a lateral plane may be obtained by reversing the sign of the second term of the right side of Expression 18.

This Expression 18 is an expression showing a dynamic behavior of an inverted pendulum having a mass point of the total mass mtotal of the robot 1, the horizontal component of a moment generated about a desired ZMP, which is a supporting point of the mass point, being denoted by $\Delta Mx$.

Further, the relationship between the perturbation amount $\Delta xG$ of a total center-of-gravity position of the robot 1 and the perturbation amount of a body position (hereinafter denoted as $\Delta xb$) is represented by Expression 19 given below.

$$\Delta xb = k*\Delta xG \quad \text{Expression 19}$$

where k denotes a proportionality constant. Therefore, $\Delta xb$ is proportional to $\Delta xG$. For a perturbational motion, Expression 19 may be considered to approximately hold.

Thus, in the perturbation dynamic model 280, an output of the adder 278 is used as $\Delta Mx$ of the right side of Expression 18 to calculate the perturbation amount $\Delta xG$ of the total center of gravity, and from the determined $\Delta xG$, a body position perturbation amount is determined according to Expression 19. In the present embodiment, a corrected desired body posture of corrected desired body position/posture agrees with a desired body posture, and the perturbation amount of the body posture is zero.

In the object reaction force balance controller 102, the corrected desired body position/posture are calculated by adding the body position perturbation amount output from the perturbation dynamic model 280, as described above, to the desired body position/posture (the output of the gait generator 100) by an adder 282.

This ends the explanation of the specific calculation processing by the object reaction force balance controller 102.

According to the processing by the gait generator 100 in the first embodiment explained above, the predicted landing position/posture of the free leg foot 22 up to the second step (up to the next time gait) in the future are determined within a range in which the aforesaid necessary requirement can be satisfied, and a current time gait is generated so as to allow the position/posture of the object 120 to reach the desired values of the position/posture based on a moving plan within the period of a unit gait (gait in which the free leg foot 22 switches to a supporting leg foot) after the free leg foot 22 of the future second step (the next time gait) lands. This makes it possible to generate a desired gait (a current time gait) that allows the object 120 to move according to a moving plan on a two-step basis without correcting the moving plan even in a situation wherein the restriction by the aforesaid free leg foot landing position/posture permissible range prevents the position/posture of the object 120 from reaching, for each step, the desired values of the position/posture based on the moving plan. As a result, it is possible to generate a desired gait (current time gait) which allows the object 120 to move according to the moving plan independently of the direction of a moving path of the object 120 (the direction with respect to the robot 1) based on the moving plan, with a reduced frequency of correcting the moving plan. In this case, the moving path of the object 120 may be, of course, a path that causes the object 120 to linearly move in the longitudinal direction of the robot 1 but it may also be a path that causes the object 120 to turn or a path that makes the robot 1 walk sideways to move the object 120 in the lateral direction of the robot 1.

Further, in a situation wherein it is impossible to determine predicted landing position/posture of the free leg foot 22 that can satisfy the necessary requirement because of the restriction by the aforesaid free leg foot landing position/posture permissible range, a moving plan is corrected by the processing in S29 described above, thus permitting the correction thereof to be properly accomplished.

In the aforesaid first embodiment, the forward dynamic model shown in FIG. 9 has been used as the object dynamic model used for the calculation processing in S03 (refer to FIG. 5); in place thereof, however, an inverse dynamic model may be used to carry out the calculation processing in S03. The following will explain one example in such a case as a second embodiment.

FIG. 22 is a block diagram showing the calculation processing in S03 according to the present embodiment. In the block diagram, the section enclosed by the dashed line corresponds to an object dynamic model. The object dynamic model is an inverse dynamic model that receives a desired object moving velocity as a desired motion state amount of an object 120 on the basis of a moving plan of the object 120 and outputs a force (translational force) to be applied to the object 120 and a position of the object 120. More specifically, the object dynamic model determines a motional acceleration of the object 120 by carrying out differentiation (first-order differentiation) of the desired object moving velocity (the input value) by a differentiator 300, and then multiplies the motional acceleration by a mass M of the object 120 by a multiplier 302 thereby to output a required value of the force (translational force) to be applied to the object 120. Here, the required value of the translational force output from the object dynamic model is the required value of the resultant force of all translational forces to be applied to the object 120 (the translational force in the moving direction of the object 120). Further, the object dynamic model integrates a desired object moving velocity by an integrator 304 thereby to output a desired object position, which is the desired value of a position of the object 120.

As in the first embodiment, the desired object velocity is calculated as a first-order differential value of a position trajectory of the object 120 in a moving plan or a moving velocity as a constituent element of the moving plan is directly determined as a desired object velocity in a gait generator 100.

The calculation processing in S03 that uses the aforesaid object dynamic model will be specifically explained with reference to FIG. 22. First, a desired object velocity at each instant (at each time) of the object 120 based on the moving plan is input to an object dynamic model to calculate the required value of a translational force acting on the object 120 and a desired object position in time series, as described above.

Subsequently, the estimated disturbance force determined in the aforesaid S35 (refer to FIG. 7) at the previous calculation processing cycle of the gait generator 100 is subtracted from the aforesaid required value of the translational force by a subtracter 306 so as to determine the desired value of a force (translational force) to be applied to the object 120 from a robot 1. Then, the time series obtained by reversing the sign of the desired value is determined as a desired object reaction force trajectory.

The initial value of an output of an integrator 304 of the object dynamic model is set to a value at the time, which corresponds to the previous calculation processing cycle, of the time series of the desired object position determined by carrying out the processing in S03 at the previous calculation processing cycle of the gait generator 100. Further, a desired object posture trajectory of a desired object motion trajectory is determined such that the desired object posture trajectory substantially agrees with, for example, the direction of a desired object velocity.

The processing in S03 explained above provisionally determines a desired object motion trajectory and a desired object reaction force trajectory for a predetermined period in the future from the current time. The rest other than this processing in S03 is the same as the aforesaid first embodiment.

The second embodiment described above is also capable of providing the same advantages as those of the aforesaid first embodiment.

In the embodiments explained above, the bipedal mobile robot has been taken as an example for the explanation; however, the present invention can be applied also to a legged mobile robot with more legs. Further, the aforesaid embodiments have shown the cases where the desired gaits of the robot 1 are generated in real time while operating the robot 1 to follow the desired gaits; however, the present invention can be applied also to a case where desired gaits are generated beforehand prior to the operation of the robot 1.

INDUSTRIAL APPLICABILITY

As described above, the present invention is useful in providing a gait creation device capable of generating a desired gait that is appropriate for making a leg-type mobile robot, such as a bipedal mobile robot, perform an operation of moving an object.

BRIEF DESCRIPTION OF THE DRAWINGS

FIG. 16 is a diagram for explaining the processing in S23 and S29 of FIG. 6.

FIG. 22 is a block diagram showing the processing in S03 (FIG. 5) in a second embodiment of the present invention.

Figure 1:
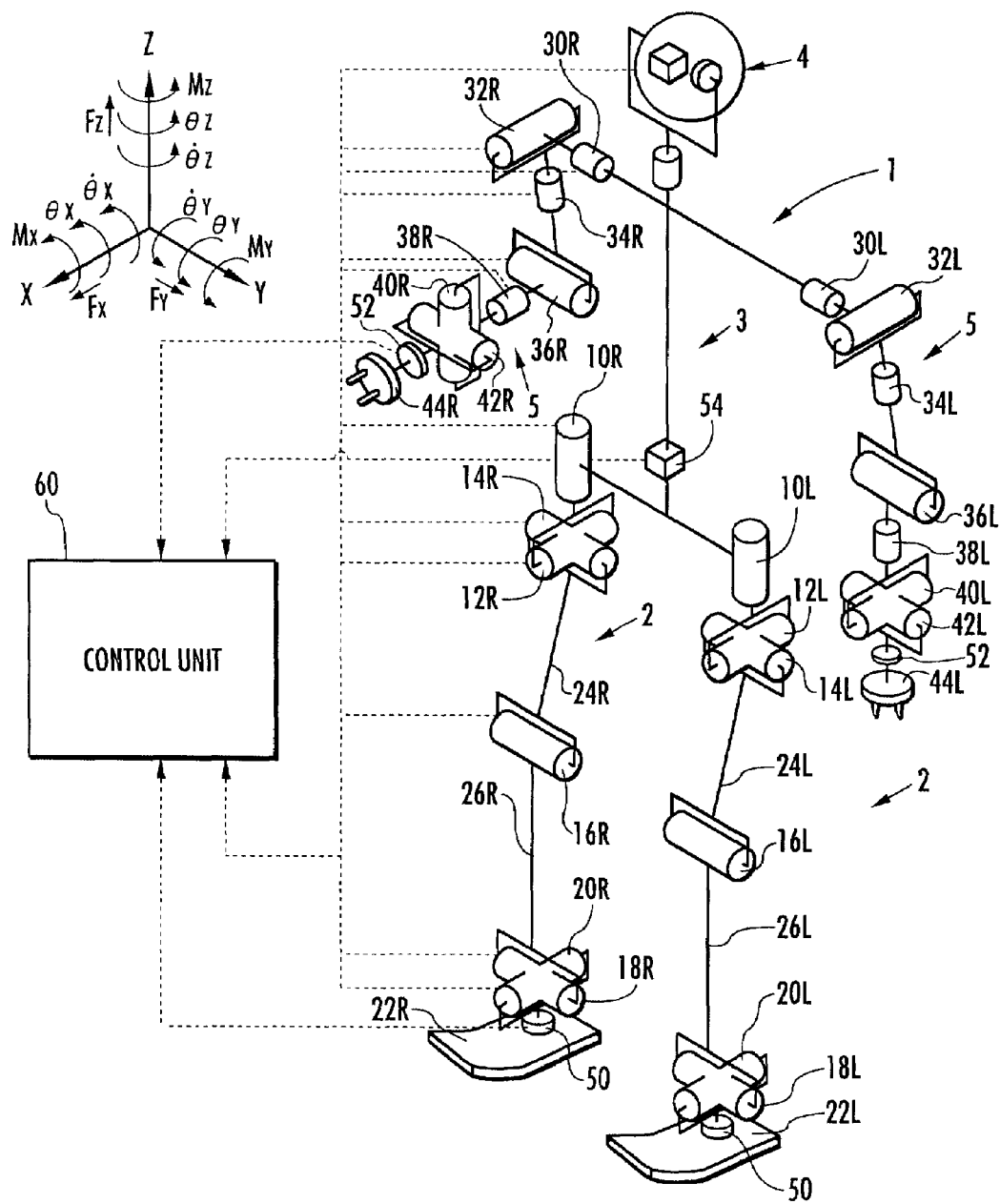
FIG. 1 is a diagram showing a schematic construction of a bipedal mobile robot as a leg-type mobile robot in embodiments of the present invention.
Figure 2:
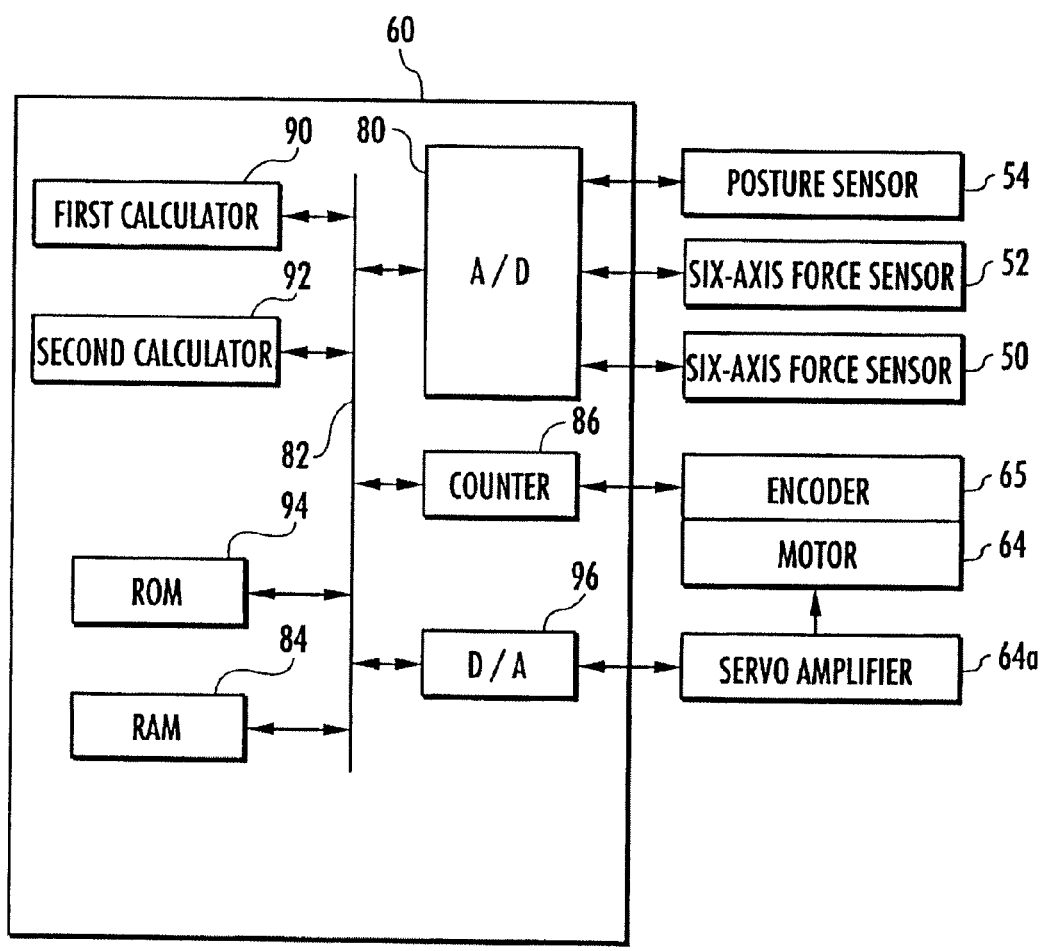
FIG. 2 is a block diagram showing a construction of a control unit provided in the robot shown in FIG. 1.
Figure 3:
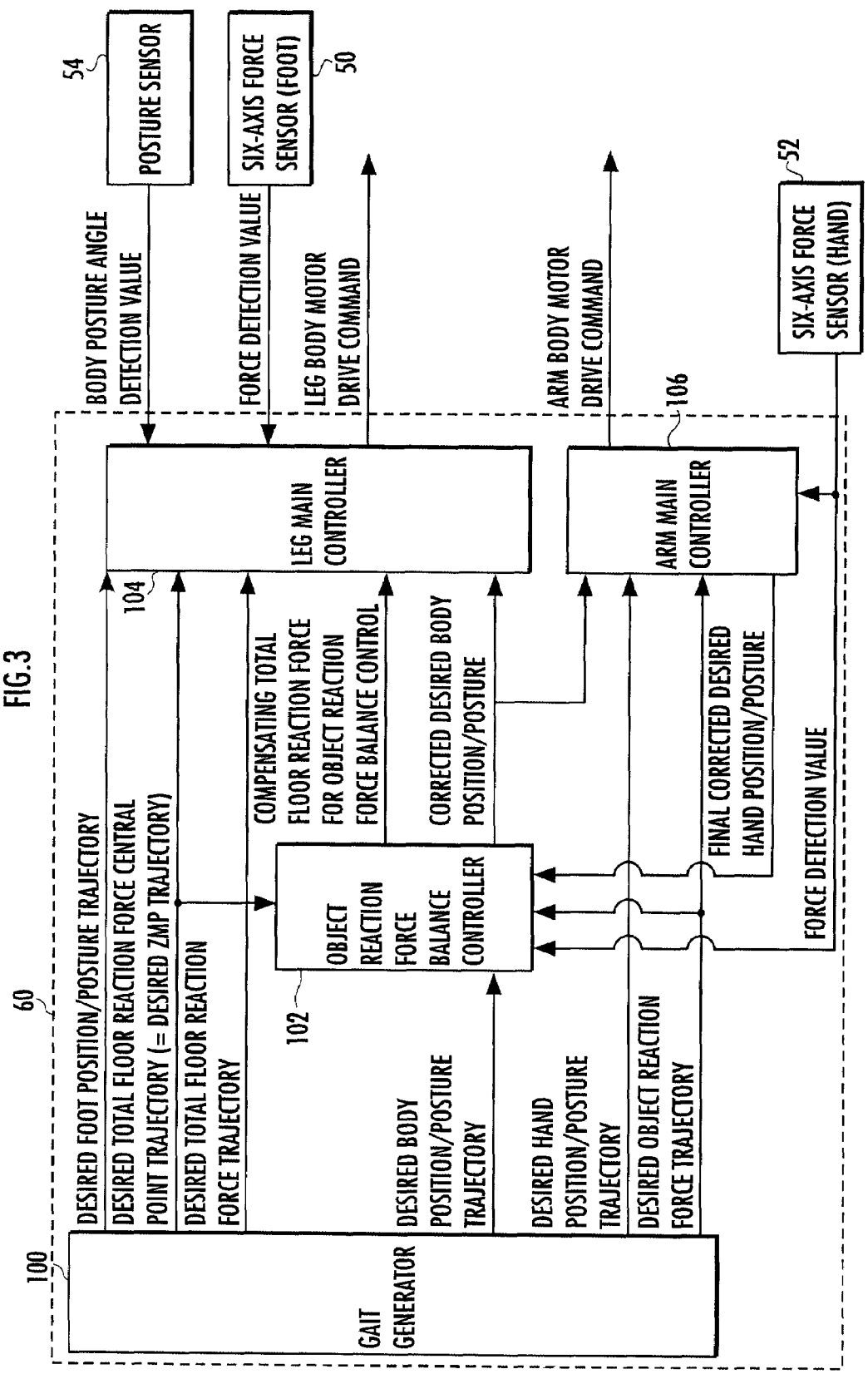
FIG. 3 is a block diagram showing a functional construction of an essential section of the control unit shown in FIG. 2.
Figure 4:
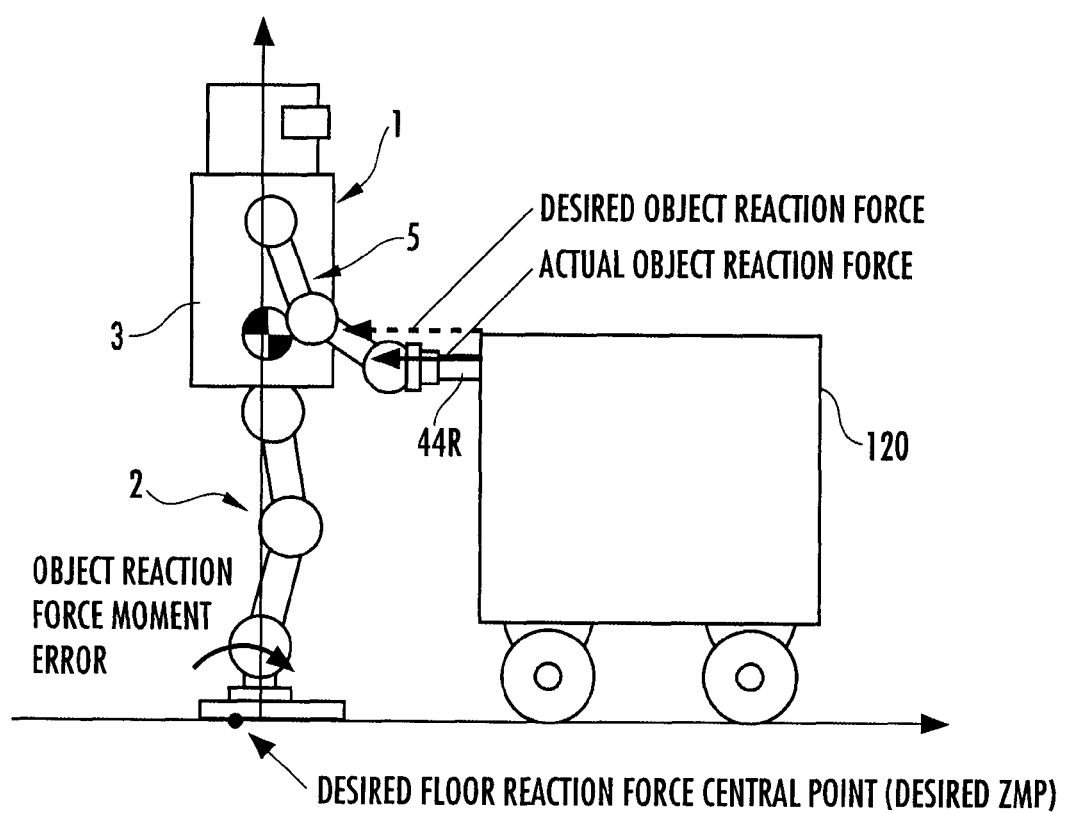
FIG. 4 is a diagram showing a relationship between the robot and an object in the embodiments.
Figure 5:
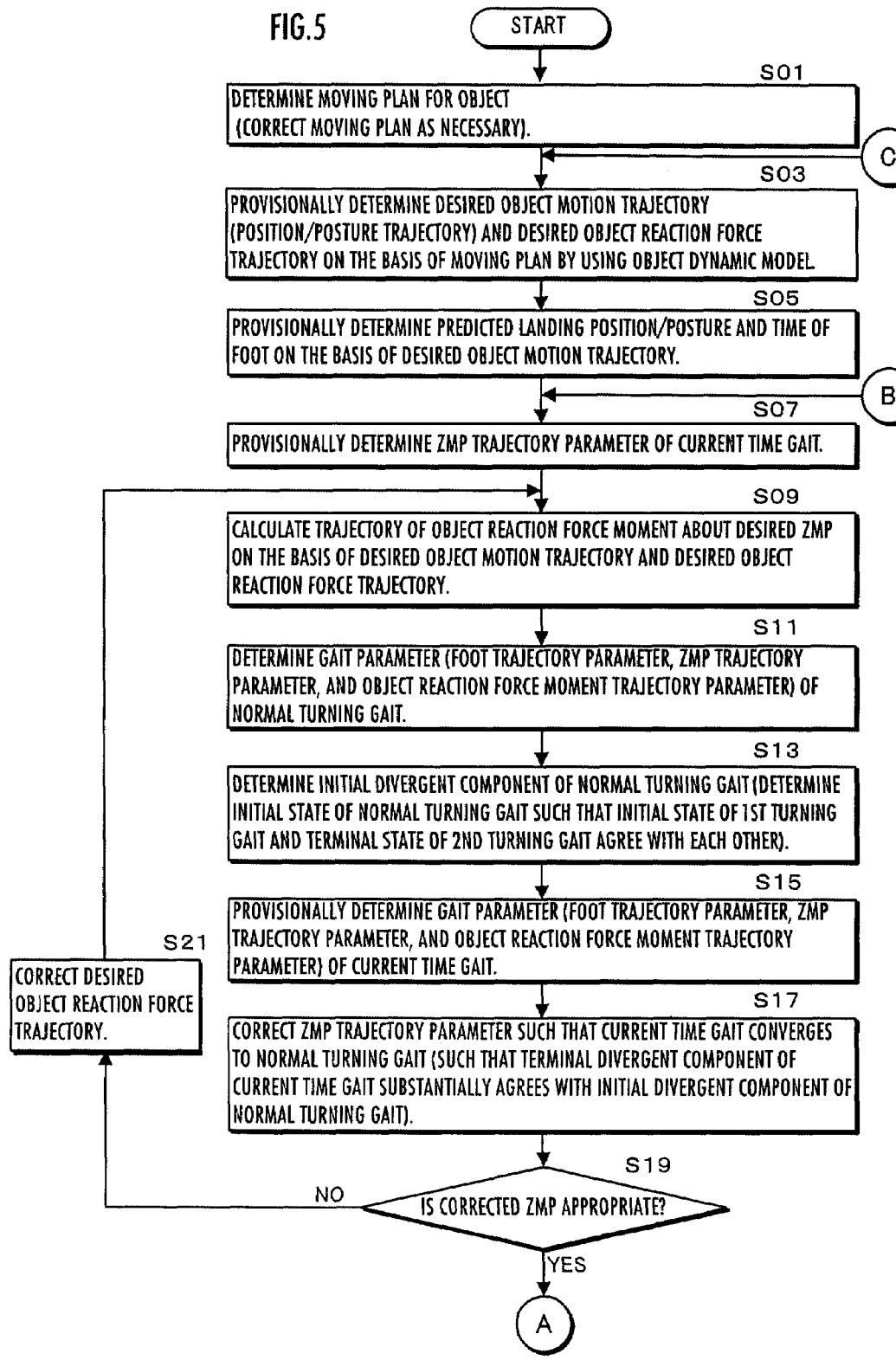
FIG. 5 is a flowchart showing the calculation processing of a gait generator in a first embodiment.
Figure 6:
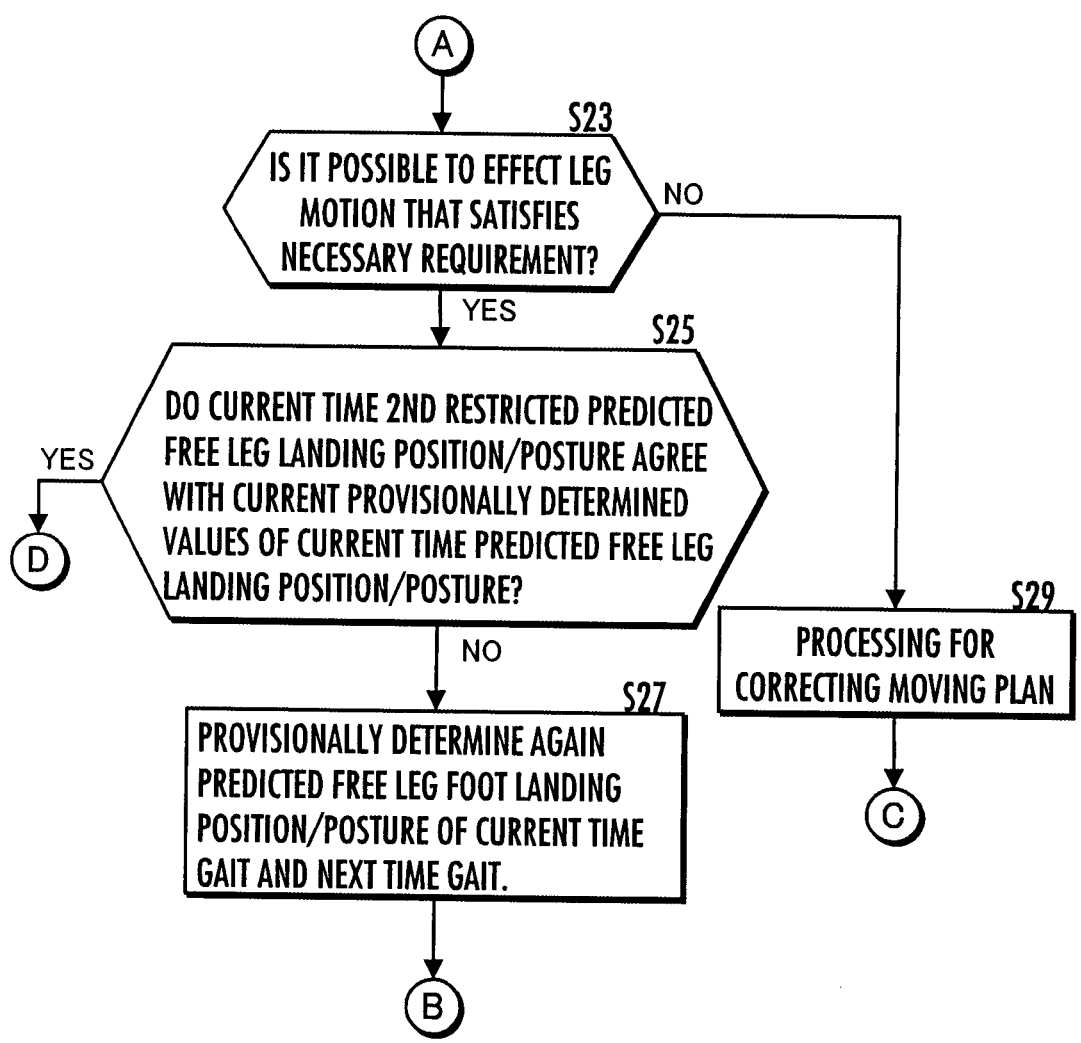
FIG. 6 is a flowchart showing the calculation processing of the gait generator in the first embodiment.
Figure 7:
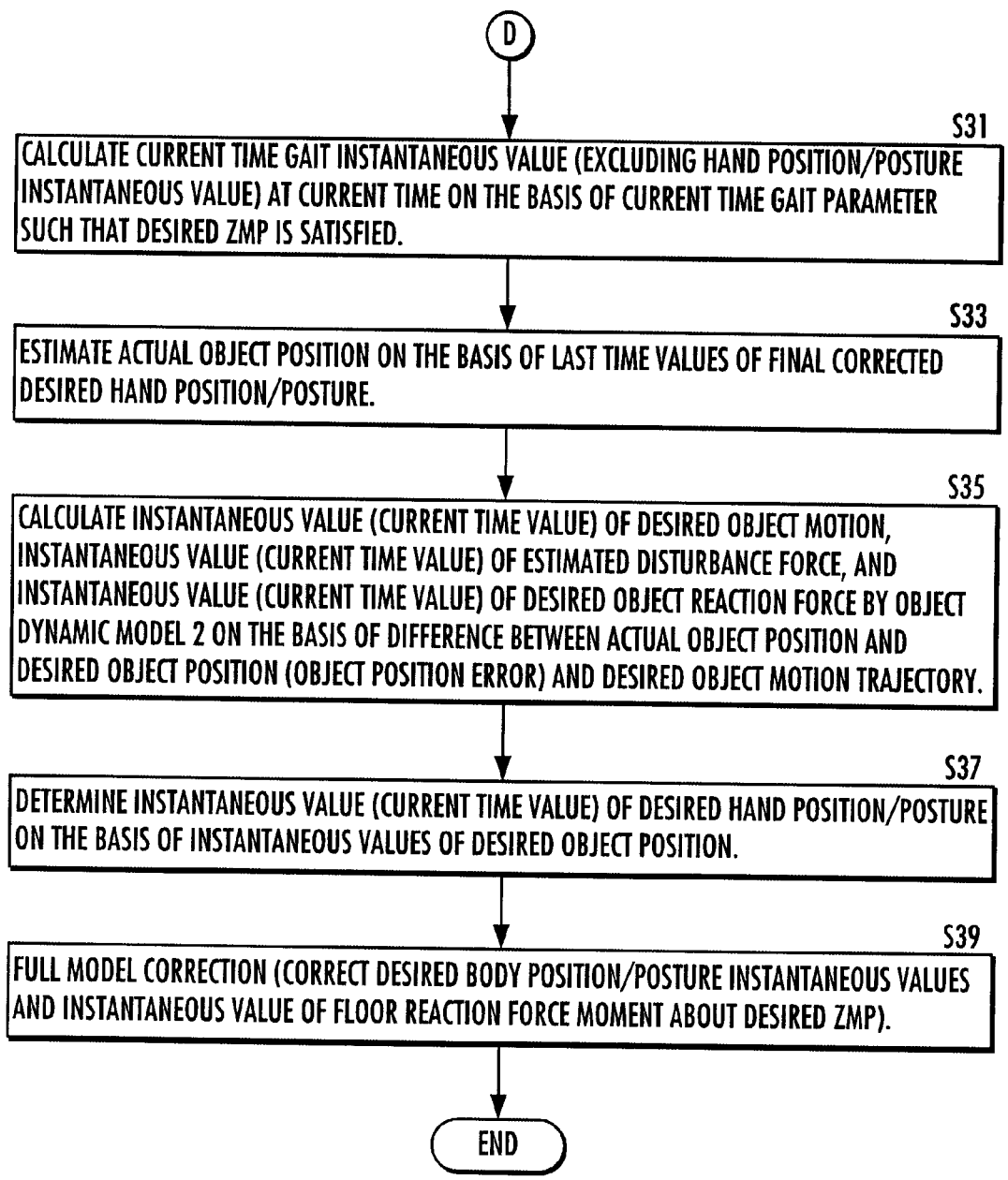
FIG. 7 is a flowchart showing the calculation processing of the gait generator in the first embodiment.
Figure 8:
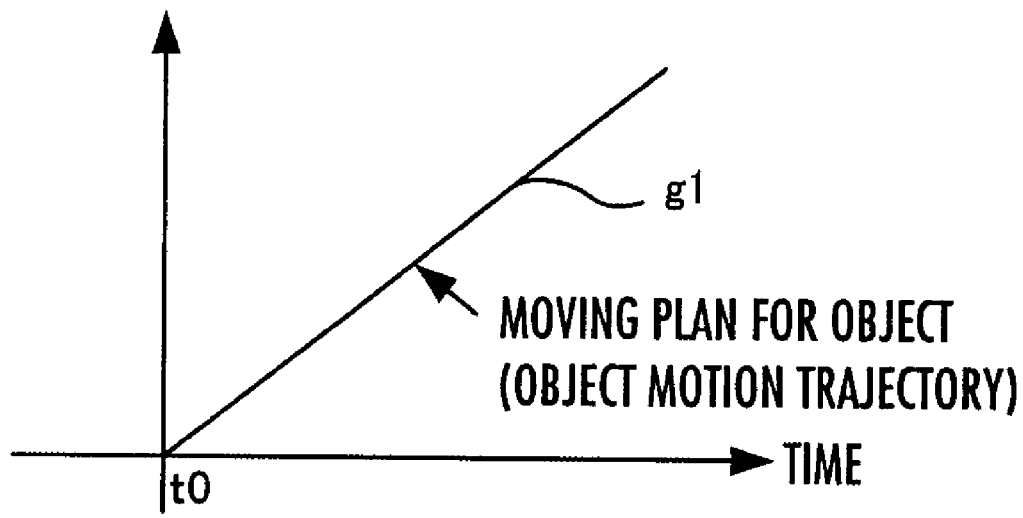
FIG. 8 is a diagram showing an example of a moving plan determined in S02 of FIG. 5.
Figure 9:
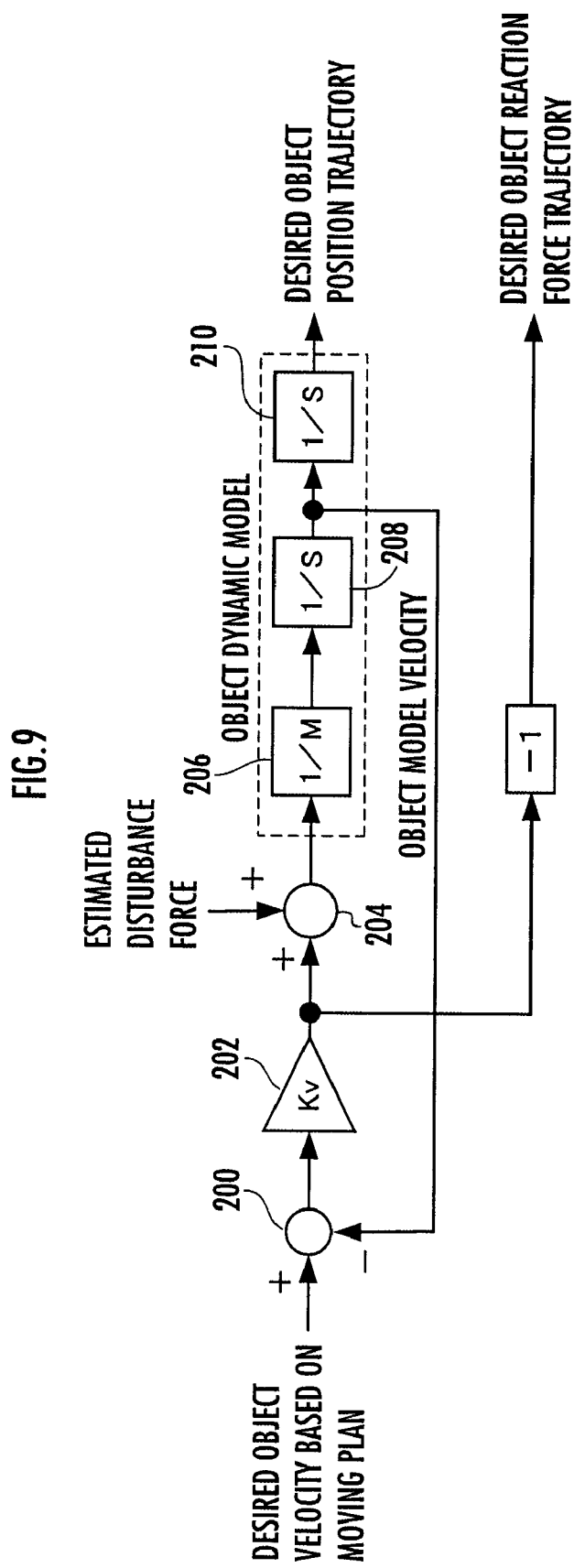
FIG. 9 is a block diagram showing the processing in S02 of FIG. 5.
Figure 10:
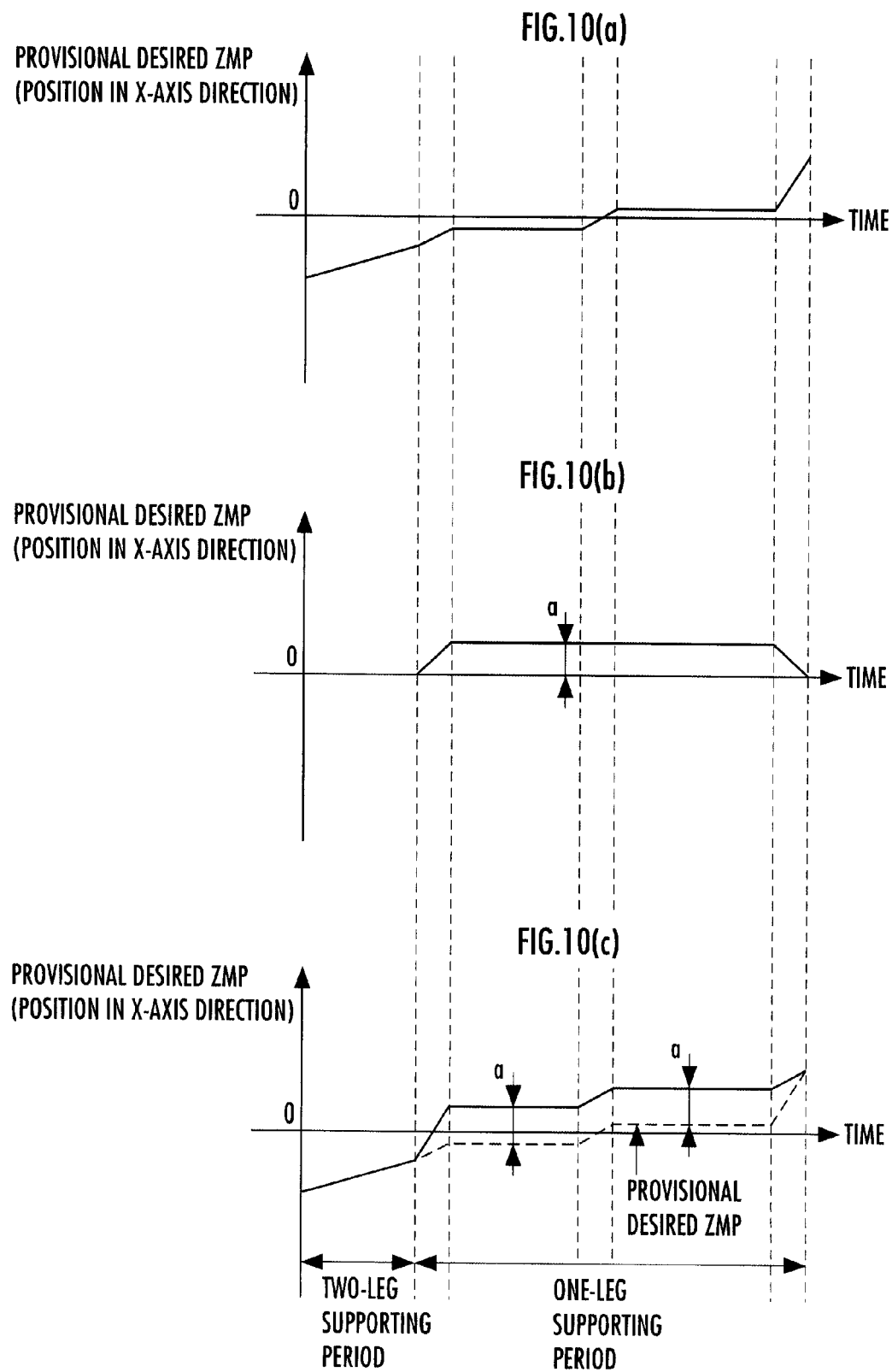
FIG. 10($a$) is a diagram showing an example of a provisional desired ZMP trajectory related to S07 of FIG. 5, FIG. 10($b$) is a diagram showing an example of a ZMP correction amount determined in S17 of FIG. 5, and FIG. 10($c$) is a diagram showing an example of a desired ZMP trajectory corrected in S17.
Figure 11:
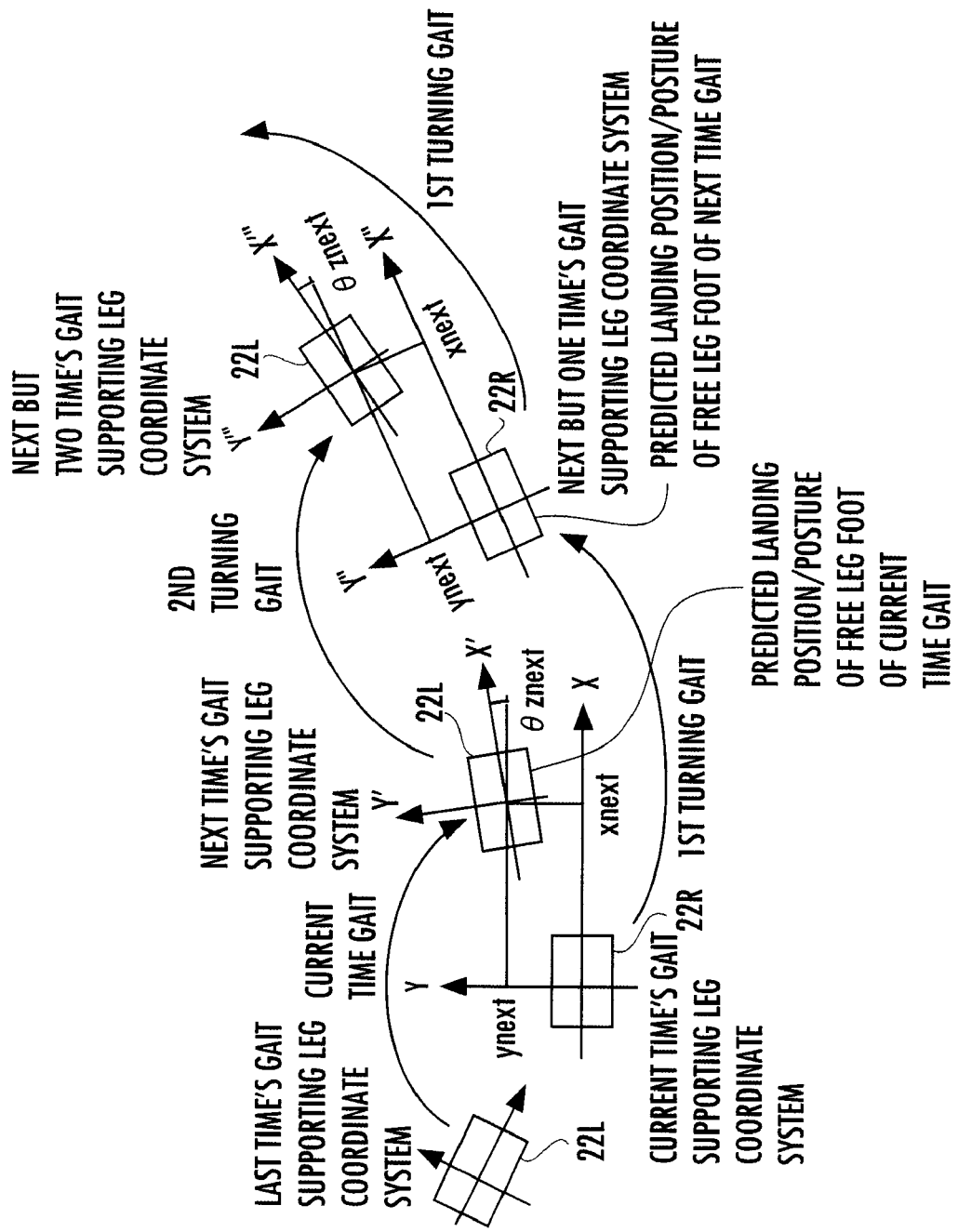
FIG. 11 is a diagram showing an example of a foot trajectory parameter determined in S11 of FIG. 5.
Figure 12A:
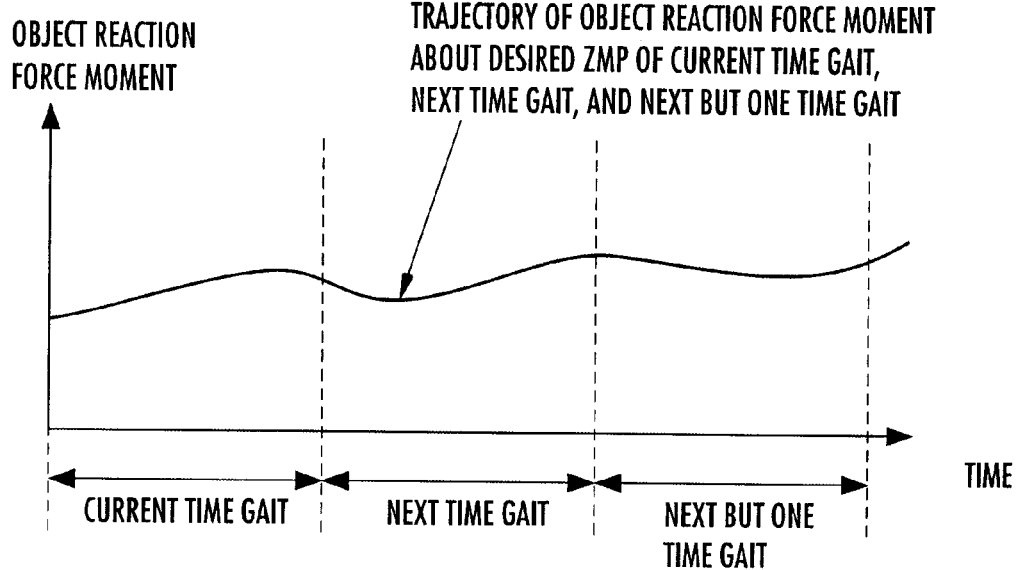
FIG. 12($a$) is a diagram showing an example of an object floor reaction force moment trajectory of a current time gait, and FIG. 12($b$) is a diagram showing an example of an object reaction force moment trajectory of a normal gait determined in S11 of FIG. 5.
Figure 12B:
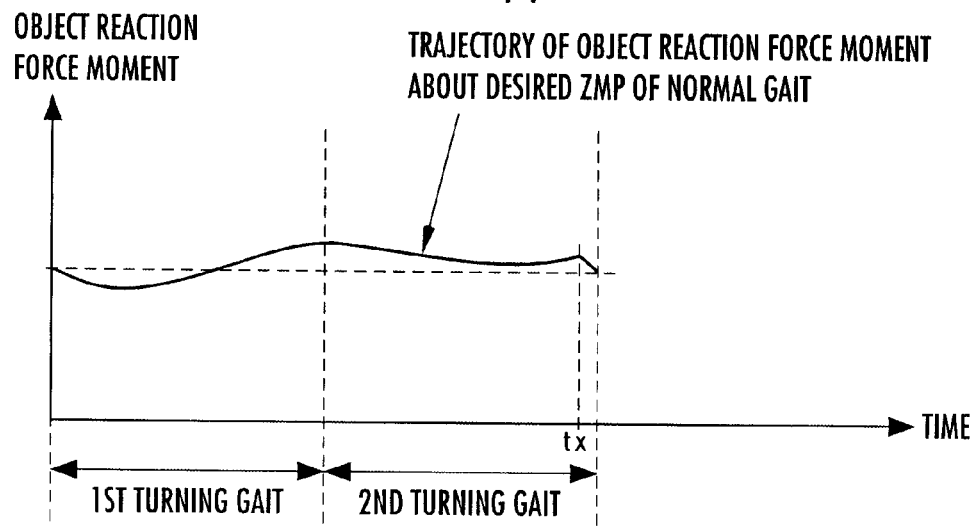
Figure 13:
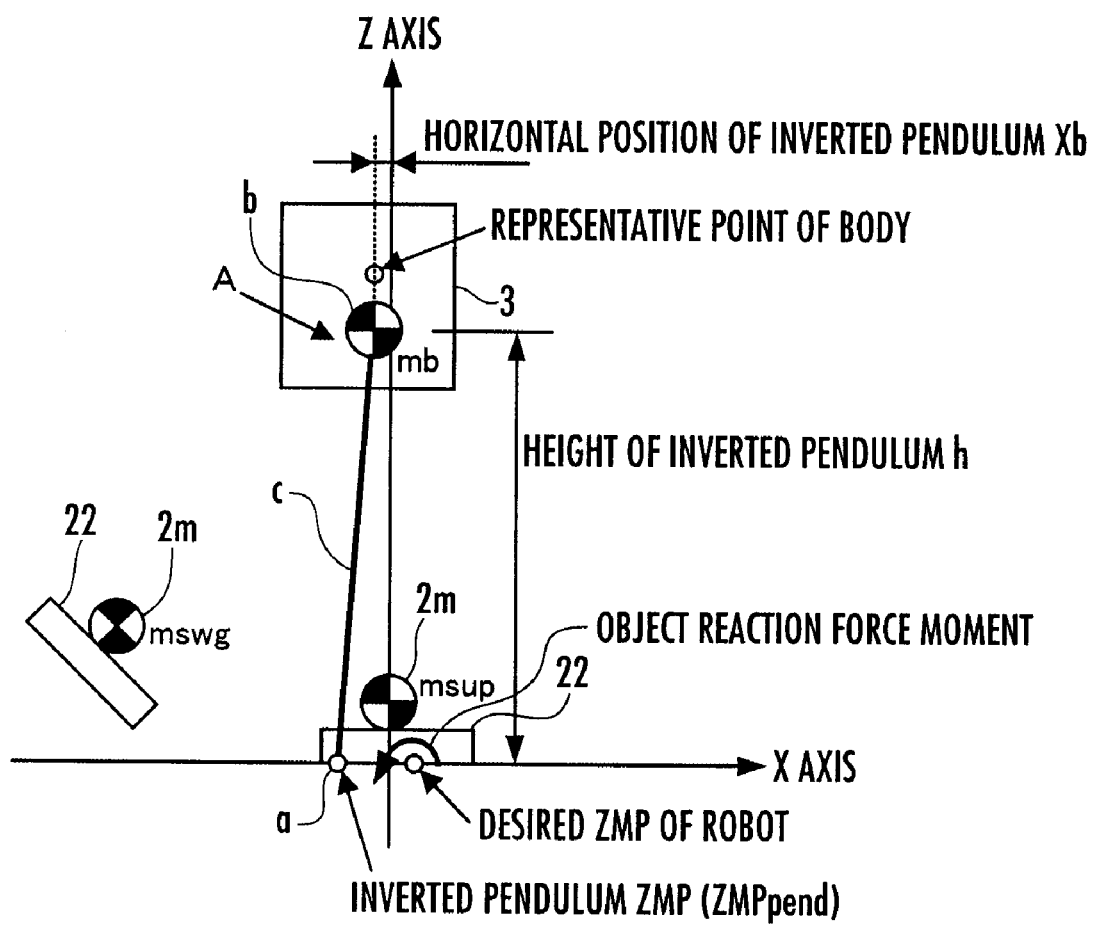
FIG. 13 is a diagram showing an example of a robot dynamic model used in the embodiments.
Figure 14:
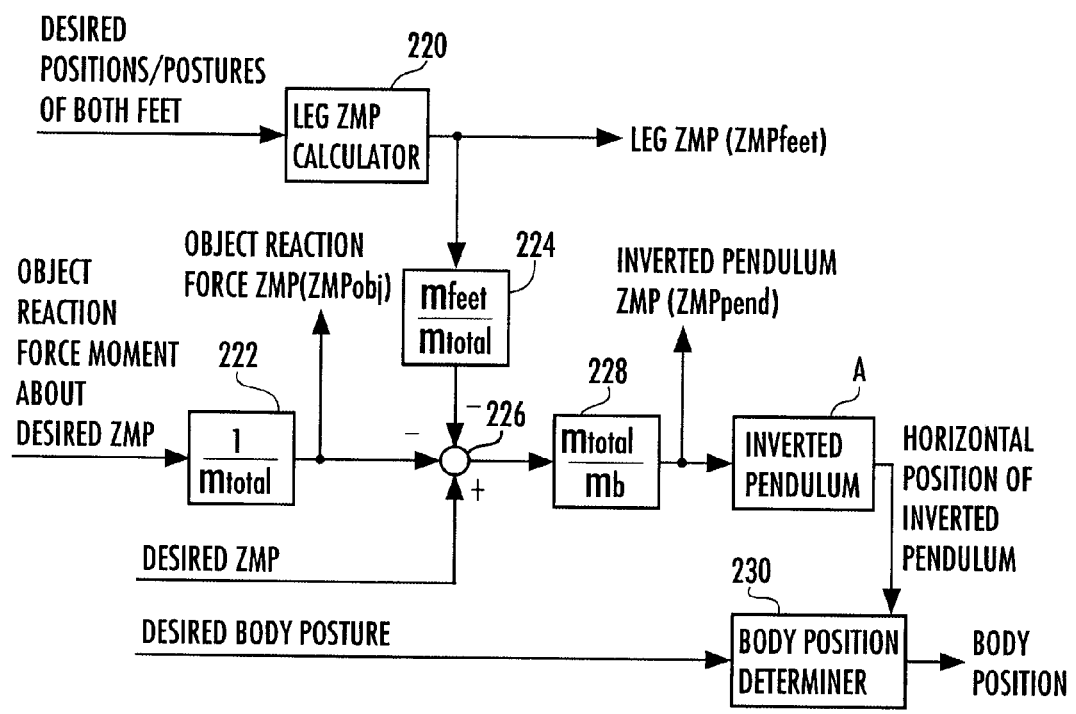
FIG. 14 is a block diagram showing the processing for determining a body position by using the robot dynamic model shown in FIG. 13.
Figure 15A:
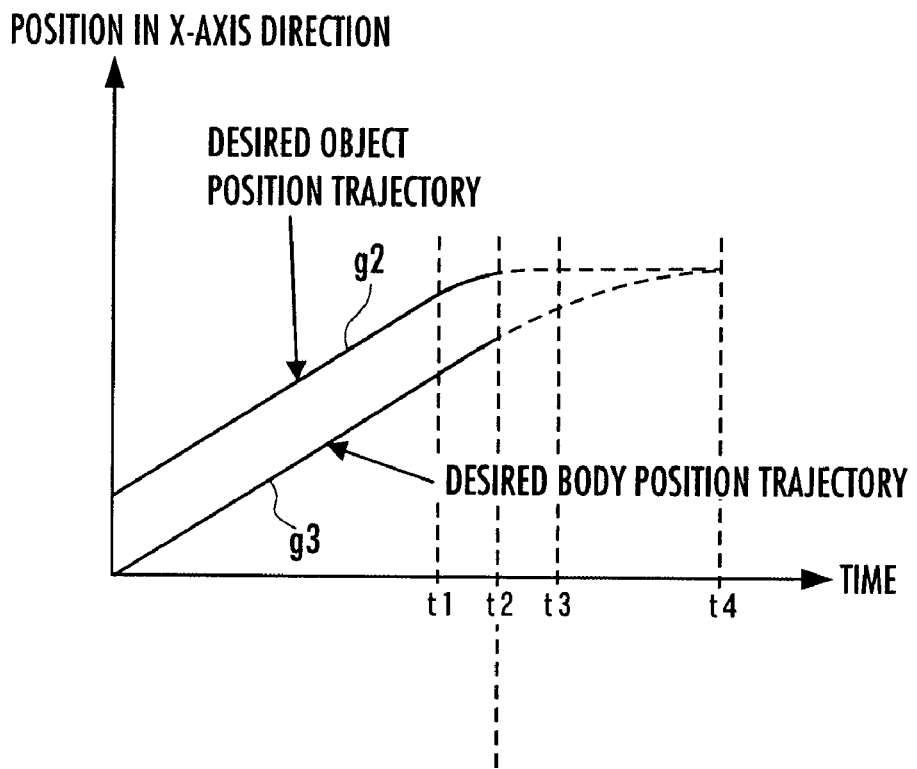
FIGS. 15($a$) and ($b$) are diagrams for explaining the processing in S21 of FIG. 5.
Figure 15B:
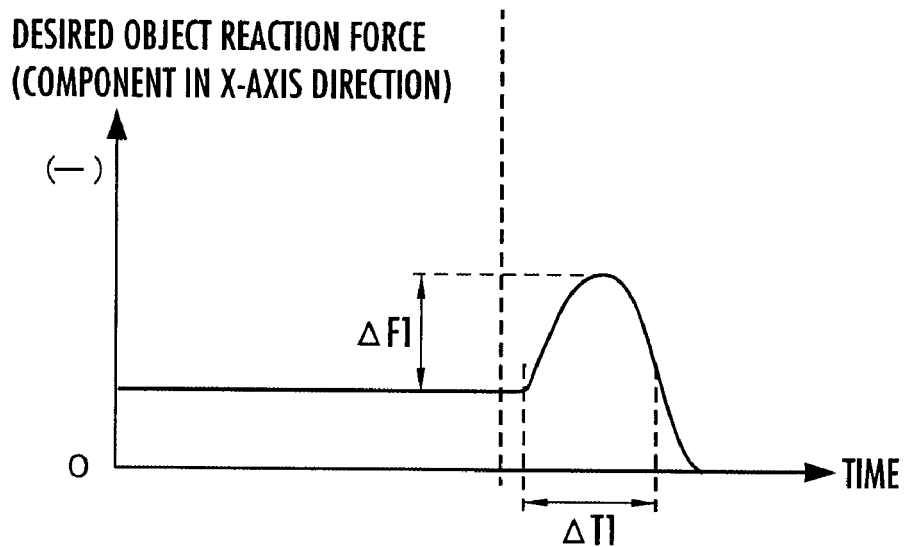
Figure 17:
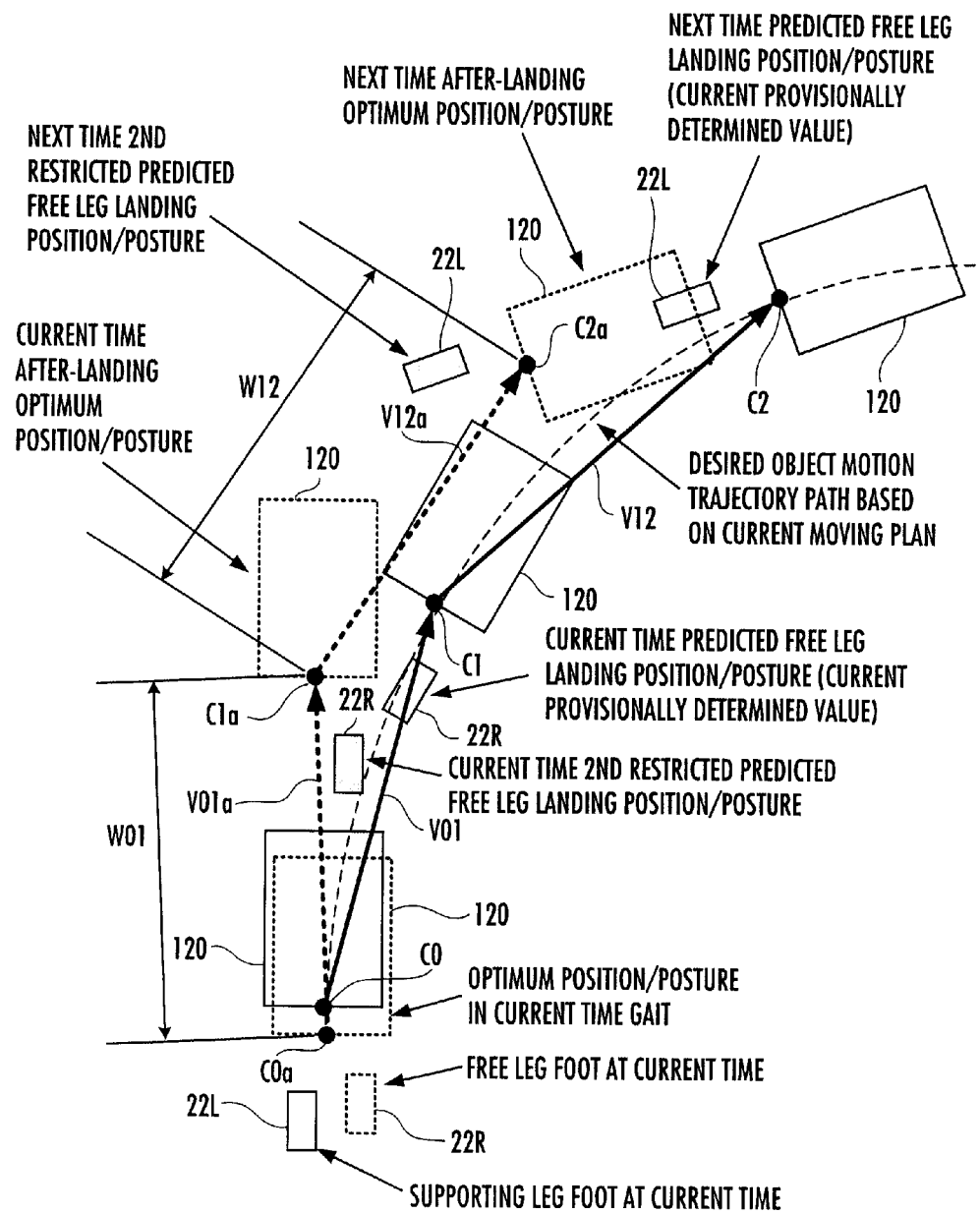
FIG. 17 is a diagram for explaining the processing in S23 and S29 of FIG. 6.
Figure 18:
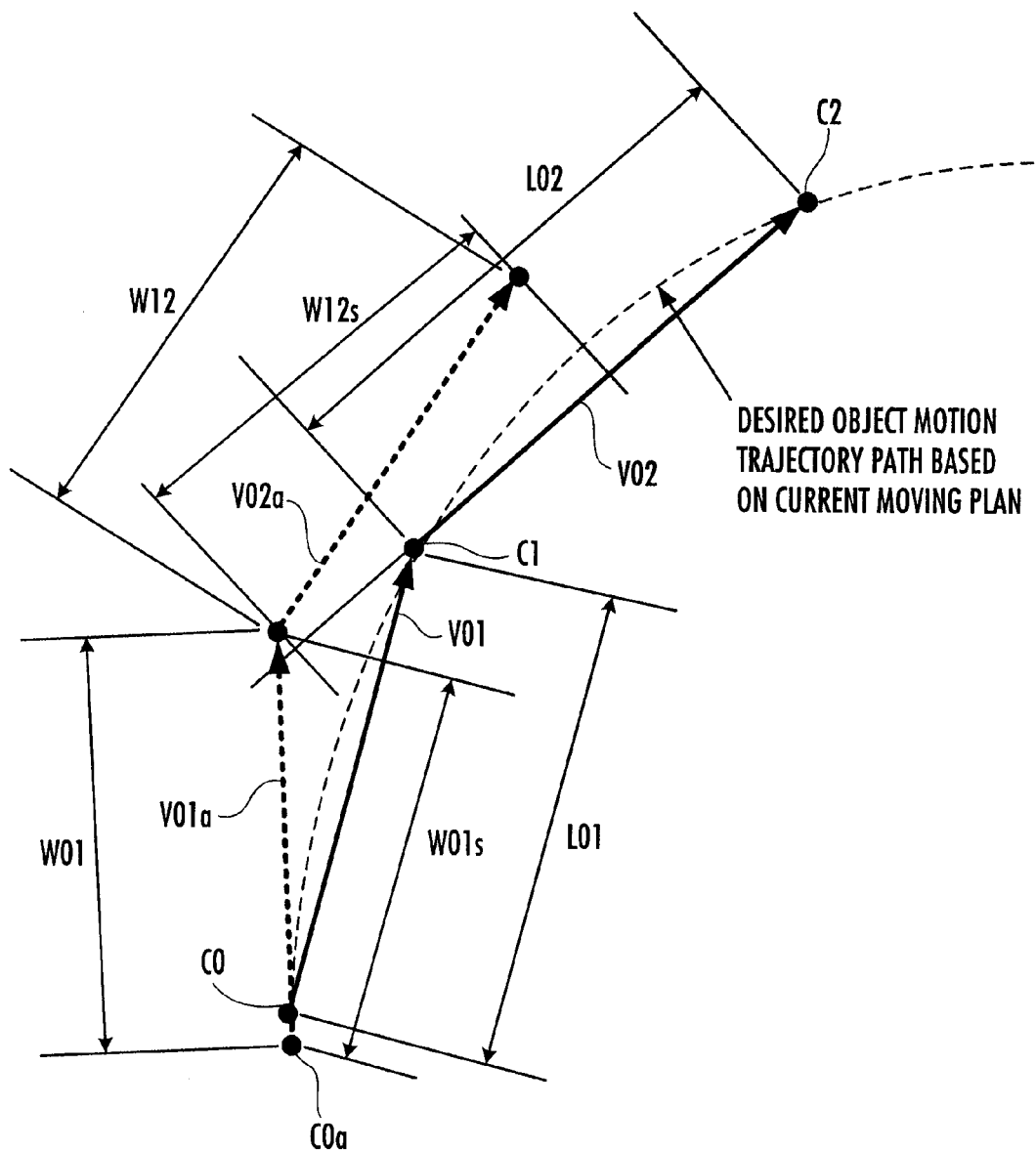
FIG. 18 is a diagram for explaining the processing in S23 and S29 of FIG. 6.
Figure 19:
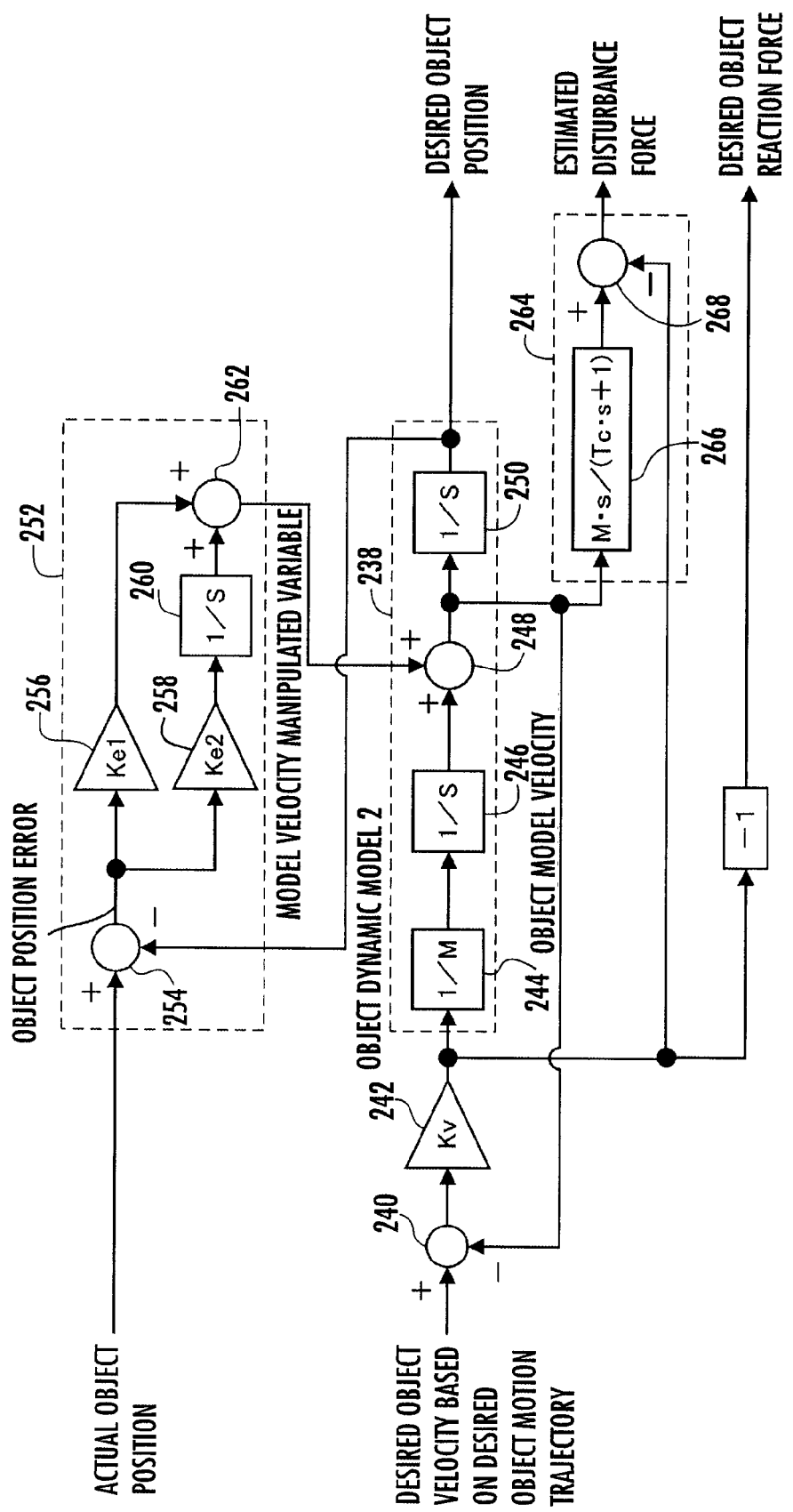
FIG. 19 is a block diagram showing the processing in S35 of FIG. 7.
Figure 20A:
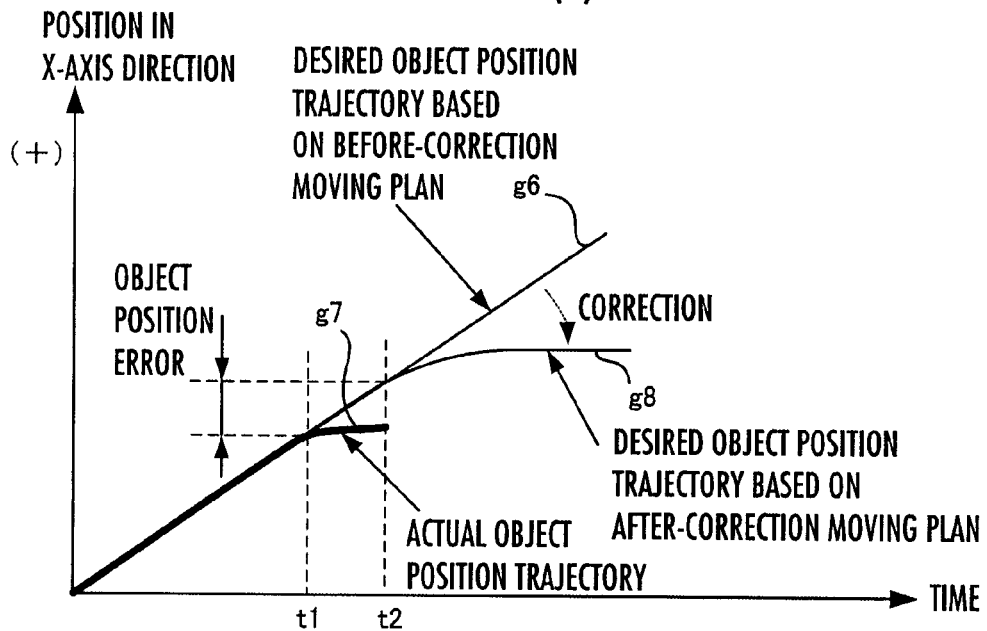
FIGS. 20($a$) and ($b$) are diagrams for explaining the processing for correcting a moving plan in S01 of FIG. 5.
Figure 20B:
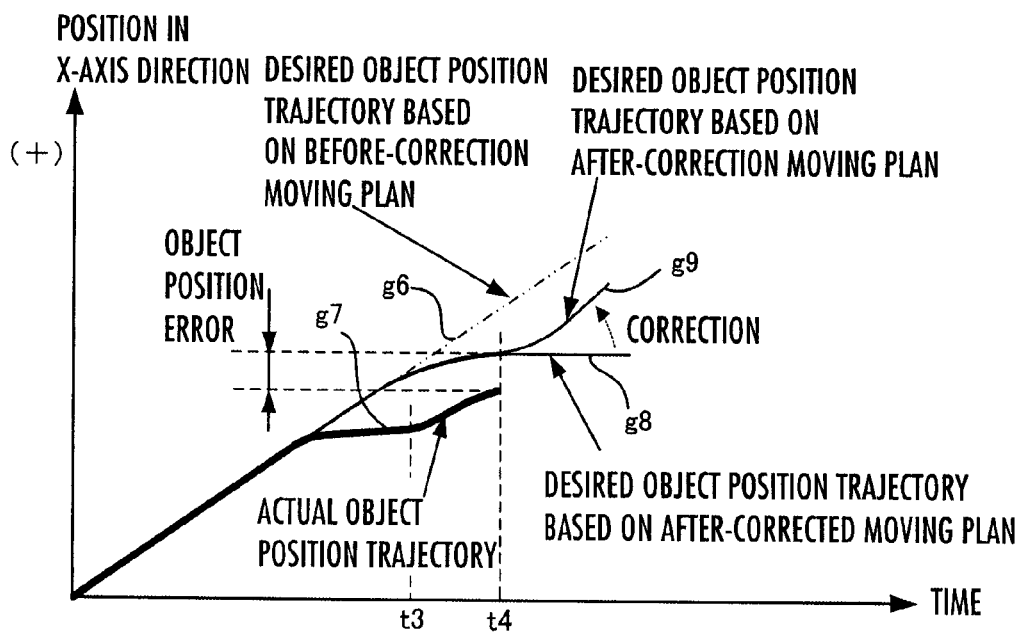
Figure 21:
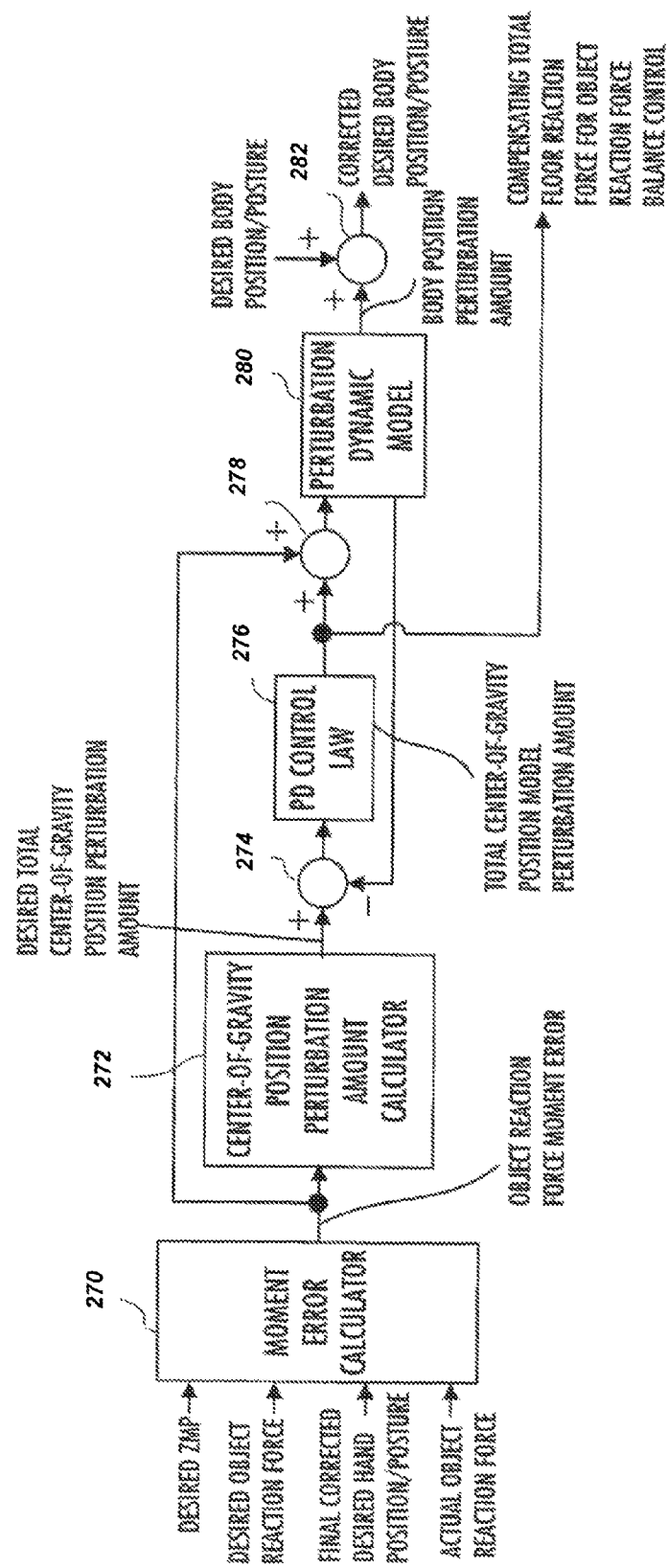
FIG. 21 is a block diagram showing the processing by an object reaction force balance controller shown in FIG. 3.

The invention claimed is:

1. A gait creation device of a leg-type mobile robot for generating a desired gait to make the leg-type mobile robot, which is equipped with a plurality of legs extended from a body thereof, perform an operation of moving an object, comprising:

a future object motion provisionally determining element configured to determine a first provisional desired motion trajectory of the object in a future predetermined period, which includes a period of a plurality of steps of the robot, based on at least a moving plan for the object when generating the desired gait anew for the robot to follow, wherein the moving plan for the object is decided to satisfy moving requirements for the object, said moving requirements including a requirement to move the object in a specified direction at a specified velocity at a specified time; and a possibility determining element configured to determine whether a motion of a leg of the robot that satisfies a necessary requirement is possible for the object, while the object moves according to the first provisional desired motion trajectory, based on at least the first provisional desired motion trajectory and the necessary requirement, the necessary requirement being such that a predetermined requirement related to a position/posture relationship between the object and the robot when the object is moved is satisfied at least at a step of a predetermined number of steps of two or more of the robot in the future period and a predetermined restrictive condition related to the motion of the leg of the robot is satisfied at each step up to the step of the predetermined number of steps, wherein, when a determination result of the possibility determining element is affirmative, the desired gait of the robot is generated such that the necessary requirement is satisfied with respect to the object and the object moves according to the first provisional desired motion trajectory, and when the determination result of the possibility determining element is negative, the moving plan is corrected, a second provisional desired motion trajectory of the object in the predetermined period is determined anew based on at least the corrected moving plan, and the desired gait of the robot is generated such that the necessary requirement is satisfied with respect to the object and the object moves according to the second provisional desired motion trajectory.

2. The gait creation device of a leg-type mobile robot according to claim 1, wherein the predetermined requirement includes a requirement that defines a position/posture relationship between a landing position/posture of a leg on a free leg side of the robot and the position/posture of the object, and the predetermined restrictive condition includes a restrictive condition that defines a relative landing position/posture of the leg on the free leg side of the robot with respect to a leg on a supporting leg side, and the possibility determining element is configured to: determine a first provisional predicted landing position/posture of the leg on the free leg side of the robot up to the step of the predetermined number of steps based on the determined first provisional desired motion trajectory of the object and the predetermined requirement such that the requirement is satisfied at each step up to the step of the predetermined number of steps; determine a second provisional predicted landing position/posture obtained by restricting the first provisional predicted landing position/posture at each step up to the step of the predetermined number of steps by the predetermined restrictive condition; determine whether the first provisional predicted landing position/posture and the second provisional predicted landing position/posture at the step of the predetermined number of steps agree with each other and in a case of disagreement, to correct the second provisional predicted landing position/posture at least at one step before the step of the predetermined number of steps based on a difference between the first provisional predicted landing position/posture and the second provisional predicted landing position/posture at the step of the predetermined number of steps within a range in which the predetermined restrictive condition is satisfied; and determine whether the motion of the leg of the robot that satisfies the necessary requirement is possible by determining whether the second provisional predicted landing position/posture at the step of the predetermined number of steps can be corrected to the position/posture that agree with the first provisional predicted landing position/posture at the step of the predetermined number of steps within the range, in which the predetermined restrictive condition is satisfied, by correcting the second provisional predicted landing position/posture at least at the one step.

3. The gait creation device of a leg-type mobile robot according to claim 2, comprising a predicted landing position/posture determining element configured to determine anew a predicted landing position/posture of the leg on a free leg side at the step of each number of steps up to the step of the predetermined number of steps such that the landing position/posture of the leg on the free leg side at least one step before the step of the predetermined number of steps is different from the first provisional predicted landing position/posture and that the necessary requirement is satisfied when the determination result of the predicted landing position/posture determining element is affirmative and the first provisional predicted landing position/posture and the second provisional predicted landing position/posture at the step of the predetermined number of steps do not agree with each other, wherein the desired gait of the robot is generated based on the predicted landing position/posture of the leg on the free leg side up to the newly determined step of the predetermined number of steps.

4. The gait creation device of a leg-type mobile robot according to claim 2, comprising:
   a third provisional predicted landing position/posture determining element configured to determine, when a determination result of the possibility determining element is negative, a third provisional predicted landing position/posture of the leg on the free leg side of the robot up to the step of the predetermined number of steps so as to bring the predicted landing position/posture of the leg on the free leg side of the robot at the step of the predetermined number of steps close to the first provisional predicted landing position/posture at the step of the predetermined number of steps within the range in which the predetermined restrictive condition is satisfied;
   a first predicted moving path estimating element configured to estimate a first predicted moving path of the object that satisfies the predetermined requirement with respect to the third provisional predicted landing position/posture;
   a second predicted moving path estimating element configured to estimate a second predicted moving path of the object that satisfies the predetermined requirement with respect to the first provisional predicted landing position/posture; and
   a correcting element configured to correct a velocity command value of the object in the moving plan based on a movement distance of the object in a first predetermined period when it is assumed that the object is moved according to the first predicted moving path, the time of the first predetermined period, a movement distance of the object in a second predetermined period when it is assumed that the object is moved according to the second predicted moving path, and the time of the second predetermined period.

5. The gait creation device of a leg-type mobile robot according to claim 4, wherein the correcting element is configured to use the movement distance of the object in the first predetermined period in a case, where it is assumed that the object is moved along a path obtained by projecting the first predicted moving path in the direction of the second predicted moving path, in place of the movement distance of the object in the first predetermined period when the direction of the first predicted moving path does not agree with the direction of the second predicted moving path.

6. The gait creation device of a leg-type mobile robot according to claim 3, comprising:
   a third provisional predicted landing position/posture determining element configured to determine, when a determination result of the possibility determining element is negative, a third provisional predicted landing position/posture of the leg on the free leg side of the robot up to the step of the predetermined number of steps so as to bring the predicted landing position/posture of the leg on the free leg side of the robot at the step of the predetermined number of steps close to the first provisional predicted landing position/posture at the step of the predetermined number of steps within the range in which the predetermined restrictive condition is satisfied;
   a first predicted moving path estimating element configured to estimate a first predicted moving path of the object that satisfies the predetermined requirement with respect to the determined third provisional predicted landing position/posture;
   a second predicted moving path estimating element configured to estimate a second predicted moving path of the object that satisfies the predetermined requirement with respect to the first provisional predicted landing position/posture; and
   a correcting element configured to correct a velocity command value of the object in the moving plan based on a movement distance of the object in a first predetermined period when it is assumed that the object is moved according to the first predicted moving path, the time of the first predetermined period, a movement distance of the object in a second predetermined period when it is assumed that the object is moved according to the second predicted moving path, and the time of the second predetermined period.

7. The gait creation device of a leg-type mobile robot according to claim 6, wherein the correcting element is configured to use the movement distance of the object in the first predetermined period in a case, where it is assumed that the object is moved along a path obtained by projecting the first predicted moving path in the direction of the second predicted moving path, in place of the movement distance of the object in the first predetermined period when the direction of the first predicted moving path does not agree with the direction of the second predicted moving path.

8. The gait creation device of a leg-type mobile robot according to claim 1, wherein the moving plan defines a path along which the object is to be moved.

9. The gait creation device of a leg-type mobile robot according to claim 8, wherein the first provisional desired motion trajectory of the object is determined such that the object moves according to the moving plan, and the second provisional desired motion trajectory of the object is determined such that the object moves according to the corrected moving plan.

10. The gait creation device of a leg-type mobile robot according to claim 1, wherein the first provisional desired motion trajectory of the object is determined such that the object moves according to the moving plan, and the second provisional desired motion trajectory of the object is determined such that the object moves according to the corrected moving plan.

11. The gait creation device of a leg-type mobile robot according to claim 1, wherein the determination result of the possibility determining element is affirmative when the motion of the leg of the robot that satisfies the necessary requirement is possible for the object, and is negative when the motion of the leg of the robot that satisfies the necessary requirement is not possible for the object.

* * * * *